United States Patent
Mencattelli et al.

(10) Patent No.: US 12,275,227 B2
(45) Date of Patent: Apr. 15, 2025

(54) COMPOSITE MATERIALS AND STRUCTURES

(71) Applicant: Helicoid Industries Inc., Indio, CA (US)

(72) Inventors: Lorenzo Mencattelli, London (GB); Chad Wasilenkoff, Indio, CA (US); Pascal Joubert des Ouches, Coublevie (FR)

(73) Assignee: Helicoid Industries, Inc., Indio, CA (US)

( * ) Notice: Subject to any disclaimer, the term of this patent is extended or adjusted under 35 U.S.C. 154(b) by 957 days.

(21) Appl. No.: 17/304,902

(22) Filed: Jun. 28, 2021

(65) Prior Publication Data
US 2021/0339499 A1 Nov. 4, 2021

Related U.S. Application Data

(63) Continuation-in-part of application No. 17/247,603, filed on Dec. 17, 2020, now Pat. No. 11,376,812.
(Continued)

(51) Int. Cl.
*B32B 7/03* (2019.01)
*B32B 3/12* (2006.01)
(Continued)

(52) U.S. Cl.
CPC .................. *B32B 7/03* (2019.01); *B32B 3/12* (2013.01); *B32B 5/024* (2013.01); *B32B 5/18* (2013.01);
(Continued)

(58) Field of Classification Search
CPC ....... B32B 15/14; B32B 27/304; B32B 27/12; B32B 2260/046; B32B 2260/023;
(Continued)

(56) References Cited

U.S. PATENT DOCUMENTS

| 5,437,450 A | 8/1995 | Akatsuka et al. |
| 6,641,893 B1 | 11/2003 | Suresh et al. |

(Continued)

FOREIGN PATENT DOCUMENTS

| CN | 101524903 A | 9/2009 |
| CN | 101633254 A | 1/2010 |

(Continued)

OTHER PUBLICATIONS

Chotikapanich, Danu, "Surfboard: The history and future of surfboard design", JEC Composites Magazine (Sports and Leisure Feature), Jan.-Feb. 2018, pp. 44-45, No. 118, Centre de documentation du verre textile et des plastiques renforces, France.
(Continued)

*Primary Examiner* — Camie S Thompson
(74) *Attorney, Agent, or Firm* — Alston & Bird LLP

(57) ABSTRACT

Described herein are details for designing and manufacturing enhanced shock and impact resistant helicoidal lay-ups by combining nanomaterials, variable pitch and partial spirals, Thin unidirectional fiber plies, hybrid materials, and/or curved fibers within a ply. The helicoidal structures created in the prescribed manners can be tuned and pitched to desired wavelengths to dampen propagating shock waves initiated by ballistics, strike forces or foreign material impacts and can arrest the propagation of fractures including catastrophic fractures. These enhancements open the helicoidal technology up for use in such applications as consumer products, protective armor, sporting equipment, crash protection devices, wind turbine blades, cryogenic tanks, pressure vessels, battery casings, automotive/aerospace components, construction materials, and other composite products.

29 Claims, 23 Drawing Sheets

Related U.S. Application Data

(60) Provisional application No. 63/033,835, filed on Jun. 3, 2020, provisional application No. 62/972,830, filed on Feb. 11, 2020.

(51) Int. Cl.

| | | |
|---|---|---|
| *B32B 5/02* | (2006.01) | |
| *B32B 5/18* | (2006.01) | |
| *B32B 5/24* | (2006.01) | |
| *B32B 5/26* | (2006.01) | |

(52) U.S. Cl.
CPC .............. *B32B 5/245* (2013.01); *B32B 5/263* (2021.05); *B32B 2250/40* (2013.01); *B32B 2262/101* (2013.01); *B32B 2262/106* (2013.01); *B32B 2266/0235* (2013.01); *B32B 2307/558* (2013.01); *B32B 2307/718* (2013.01); *B32B 2603/00* (2013.01); *B32B 2605/18* (2013.01)

(58) Field of Classification Search
CPC .......... B32B 2262/14; B32B 2262/105; B32B 2262/103; B32B 2262/101; B32B 2262/065; B32B 2262/0253; B32B 2264/107; B32B 2264/102; B32B 7/03; B32B 7/09; B32B 7/12; B32B 5/263; B32B 5/024; B32B 5/026; B32B 5/028; B32B 5/06; B32B 5/08; B32B 5/12; B32B 5/18; B32B 5/24; B32B 5/245; B32B 5/26; B32B 2605/18; B32B 2605/16; B32B 2605/00; B32B 2605/12; B32B 2597/00; B32B 2307/18; B32B 2307/558; B32B 2307/304; B29C 70/202
See application file for complete search history.

(56) References Cited

U.S. PATENT DOCUMENTS

| | | |
|---|---|---|
| 7,874,937 B2 | 1/2011 | Chao |
| 8,012,291 B2 | 9/2011 | Kisch et al. |
| 8,187,402 B2 | 5/2012 | Heinrich et al. |
| 8,192,853 B2 | 6/2012 | Hilmas et al. |
| 8,460,777 B2 | 6/2013 | Long |
| 8,728,263 B2 | 5/2014 | Velicki et al. |
| 8,986,810 B2 | 3/2015 | Grunden et al. |
| 9,114,588 B2 | 8/2015 | Oefner |
| 9,199,429 B2 | 12/2015 | Tsai |
| 9,296,174 B2 | 3/2016 | Tsai |
| 9,452,587 B2 | 9/2016 | Kisailus et al. |
| 9,643,734 B2 | 5/2017 | Burgess et al. |
| 9,822,228 B2 | 11/2017 | Arai et al. |
| 10,099,445 B2 | 10/2018 | Kismarton |
| 10,247,523 B2 | 4/2019 | Christoph et al. |
| 10,472,472 B2 | 11/2019 | Wilenski et al. |
| 10,576,335 B2 | 3/2020 | Greaney et al. |
| 10,589,474 B2 | 3/2020 | Tsai et al. |
| 10,603,873 B2 | 3/2020 | Garcia et al. |
| 10,604,226 B2 | 3/2020 | May et al. |
| 10,632,353 B2 | 4/2020 | Mordasini et al. |
| 10,786,977 B2 | 9/2020 | Dodworth |
| 2007/0181238 A1 | 8/2007 | Ternon et al. |
| 2007/0238379 A1 | 10/2007 | Bhatnagar et al. |
| 2008/0145647 A1 | 6/2008 | Ganguli et al. |
| 2009/0140098 A1 | 6/2009 | Lengsfeld et al. |
| 2010/0099513 A1 | 4/2010 | Chao et al. |
| 2010/0282404 A1 | 11/2010 | Ellis |
| 2010/0304145 A1 | 12/2010 | Yonemoto et al. |
| 2014/0033411 A1 | 2/2014 | Kisailus et al. |
| 2014/0099484 A1 | 4/2014 | Roberts, III et al. |
| 2014/0335300 A1 | 11/2014 | Tsai |
| 2015/0030805 A1 | 1/2015 | Tsai et al. |
| 2015/0314553 A1 | 11/2015 | Desjoyeaux et al. |
| 2016/0009368 A1 | 1/2016 | Kismarton |
| 2016/0031182 A1 | 2/2016 | Quinn et al. |
| 2016/0101592 A1 | 4/2016 | Sauer et al. |
| 2017/0028652 A1 | 2/2017 | Garcia et al. |
| 2018/0148154 A1 | 5/2018 | Rocher et al. |
| 2018/0162101 A1 | 6/2018 | Stickler et al. |
| 2019/0225764 A1 | 7/2019 | Harada et al. |
| 2019/0263532 A1 | 8/2019 | Wilenski et al. |
| 2019/0389516 A1 | 12/2019 | Kim et al. |
| 2021/0323651 A1 | 10/2021 | Alter et al. |

FOREIGN PATENT DOCUMENTS

| | | |
|---|---|---|
| CN | 102145553 A | 8/2011 |
| CN | 102336034 A | 2/2012 |
| CN | 103818606 A | 5/2014 |
| CN | 104943185 A | 9/2015 |
| CN | 104985902 A | 10/2015 |
| CN | 204845063 U | 12/2015 |
| CN | 105235295 A | 1/2016 |
| CN | 105667057 A | 6/2016 |
| CN | 205854774 U | 1/2017 |
| CN | 106739192 A | 5/2017 |
| CN | 106739237 A | 5/2017 |
| CN | 106832672 A | 6/2017 |
| CN | 107187124 A | 9/2017 |
| CN | 107187131 A | 9/2017 |
| CN | 107891631 A | 4/2018 |
| CN | 107946511 A | 4/2018 |
| CN | 110145984 A | 8/2019 |
| CN | 209700003 U | 11/2019 |
| DE | 202015004314 U1 | 9/2015 |
| EP | 0967071 A1 | 12/1999 |
| EP | 2110056 A1 | 10/2009 |
| JP | 2000-033662 A | 2/2000 |
| JP | 2004-160927 A | 6/2004 |
| JP | 2007-191658 A | 8/2007 |
| JP | 2008-514458 A | 5/2008 |
| JP | 2009-532231 A | 9/2009 |
| JP | 2019-218050 A | 12/2019 |
| JP | 2020-131528 | 8/2020 |
| WO | WO 2006/037083 A2 | 4/2006 |
| WO | WO 2007/083641 A1 | 7/2007 |
| WO | WO 2007/136755 A2 | 11/2007 |
| WO | WO 2008/018421 A1 | 2/2008 |
| WO | WO 2008/098771 A1 | 8/2008 |
| WO | WO 2008/098990 A1 | 8/2008 |
| WO | WO 2008/141687 A2 | 11/2008 |
| WO | WO 2009/058500 A1 | 5/2009 |
| WO | WO 2009/127852 A1 | 10/2009 |
| WO | WO 2010/058196 A1 | 5/2010 |
| WO | WO 2010/065330 A1 | 6/2010 |
| WO | WO 2010/144010 A1 | 12/2010 |
| WO | WO 2011/090396 A1 | 7/2011 |
| WO | WO 2011/107733 A2 | 9/2011 |
| WO | WO 2011/121340 A1 | 10/2011 |
| WO | WO 2011/128667 A1 | 10/2011 |
| WO | WO 2012/024023 A1 | 2/2012 |
| WO | WO 2012/060971 A1 | 5/2012 |
| WO | WO 2012/091897 A1 | 7/2012 |
| WO | WO 2012/096696 A1 | 7/2012 |
| WO | WO 2012/126897 A1 | 9/2012 |
| WO | WO 2013/004671 A1 | 1/2013 |
| WO | WO 2013/135515 A1 | 9/2013 |
| WO | WO 2013/162989 A1 | 10/2013 |
| WO | WO 2013/173035 A1 | 11/2013 |
| WO | WO 2014/009314 A1 | 1/2014 |
| WO | WO 2014/011293 A2 | 1/2014 |
| WO | WO 2014/026448 A1 | 2/2014 |
| WO | WO 2014/001652 A2 | 5/2014 |
| WO | WO 2014/071306 A1 | 5/2014 |
| WO | WO 2014/085802 A1 | 6/2014 |
| WO | WO 2014/088962 A1 | 6/2014 |
| WO | WO 2014/099149 A1 | 6/2014 |
| WO | WO 2014/151658 A1 | 9/2014 |
| WO | WO 2014/197039 A2 | 12/2014 |
| WO | WO 2015/017006 A1 | 2/2015 |
| WO | WO 2015/044099 A1 | 4/2015 |
| WO | WO 2015/047480 A2 | 4/2015 |

(56) References Cited

FOREIGN PATENT DOCUMENTS

| | | |
|---|---|---|
| WO | WO 2015/073537 A1 | 5/2015 |
| WO | WO 2015/088594 A1 | 6/2015 |
| WO | WO 2015/091794 A1 | 6/2015 |
| WO | WO 2015/095396 A1 | 6/2015 |
| WO | WO 2015/167630 A1 | 11/2015 |
| WO | WO 2015/188963 A1 | 12/2015 |
| WO | WO 2016/020414 A1 | 2/2016 |
| WO | WO 2016/048885 A1 | 3/2016 |
| WO | WO 2016/154089 A1 | 9/2016 |
| WO | WO 2016/193758 A1 | 12/2016 |
| WO | WO 2017/027598 A1 | 2/2017 |
| WO | WO 2017/048975 A1 | 3/2017 |
| WO | WO 2017/095810 A1 | 6/2017 |
| WO | WO 2017/103669 A1 | 6/2017 |
| WO | WO 2017/117083 A1 | 7/2017 |
| WO | WO 2017/117383 A1 | 7/2017 |
| WO | WO 2017/180387 A1 | 10/2017 |
| WO | WO 2017/207611 A1 | 12/2017 |
| WO | WO 2018/093520 A2 | 5/2018 |
| WO | WO 2018/132360 A1 | 7/2018 |
| WO | WO 2018/187186 A1 | 10/2018 |
| WO | WO 2019/031589 A1 | 2/2019 |
| WO | WO 2019/133463 A1 | 7/2019 |
| WO | WO 2019/203893 A2 | 10/2019 |
| WO | WO 2020/109342 A1 | 6/2020 |
| WO | WO 2020/214871 A1 | 10/2020 |

OTHER PUBLICATIONS

Han, Qigang, et al., "Experimental investigation on impact and bending properties of a novel dactyl-inspired sandwich honeycomb with carbon fiber", Construction and Building Materials, Aug. 30, 2020, vol. 253, No. 119161, 7 pages, Elsevier Ltd, UK.

International Searching Authority, International Search Report and Written Opinion received for International Application No. PCT/US2021/039399, mailed Mar. 18, 2022, 13 pages, United States Patent and Trademark Office, US.

Joubert Des Ouches, Pascal, "Windfoil Board: An Innovative carbon non-crimp fabric (NCF) for sports applications", JEC Composites Magazine (Sports and Leisure Feature), Jan.-Feb. 2018, pp. 40-41, No. 118, Centre de documentation du verre textile et des plastiques renforces, France.

International Preliminary Examining Authority, Preliminary Report on Patentability, Chapter II (including Applicant's Jan. 7, 2022 reply to the Oct. 13, 2021 Written Opinion), dated Apr. 19, 2022, 23 pages, United States Patent and Trademark Office, U.S.A.

Basalt Today, "A bio-metric disruptive technology boosting composites parts toughness and impact strength performances", Feb. 26, 2020, [article, online], retrieved from <URL: https://basalt.today/2020/02/41839/> on Jan. 27, 2022, 6 pages.

International Searching Authority, Invitation to Pay Additional Fees received for International Application No. PCT/US2021/039399, dated Jan. 13, 2022, 2 pages, United States Patent & Trademark Office, U.S.

United States Patent and Trademark Office, Notice of Allowance received for U.S. Appl. No. 17/247,603, dated Feb. 17, 2022, 9 pages, US.

United States Patent and Trademark Office, Non-Final Office Action received for U.S. Appl. No. 17/247,603, dated Nov. 10, 2021, 32 pages, U.S.

European Patent Office, Extended European Search Report received for Application No. 21792480.2, dated Mar. 15, 2024, 9 pages, Germany.

Japan Patent Office, Office Action, including Search Report, received for Application No. 2023-537108, mailed May 27, 2024, 36 pages, Japan.

Abir, M.R., et al., "On the improved ballistic performance of bio-inspired composites", Composites Part A, Applied Science and Manufacturing, Apr. 25, 2019, pp. 59-70, vol. 123, Elsevier Ltd., UK.

Abrate, S., "Impact on Laminated Composite Materials," Applied Mechanics Reviews, Apr. 1991, p. 155-190, vol. 44, No. 4, ASBE, US.

Al-Sawalmih, Ali, et al., "Microtexture and chitin/calcite orientation relationship in the mineralized exoskeleton of the american lobster," Advanced Functional Materials, 2008, pp. 3307-3314, vol. 18, No. 20, Whiley-VCH, Germany.

Amacher, R., et al., "Thin Ply Composites: Experimental Characterization and Modeling", Proceedings of 19th International Conference on Composite Materials, Jul. 28 to Aug. 2, 2013, 13 pages, Canada.

Apichattrabrut, T., et al., "Helicoidal composites," Mechanics of Advanced Materials and Structures, Aug. 20, 2006, pp. 61-76, vol. 13, No. 1, Taylor & Francis Group, UK.

ASTM International, "Astm D7136/D7136M-15 Standard Test Method for Measuring the Damage Resistance of a Fiber-Reinforced Polymer Matrix Composite to a Drop-Weight Impact Event," Mar. 2015, 16 pages, ASTM International, US.

Bouligand, Y, et al., "Twisted fibrous arrangements in biological materials and cholesteric mesophases," Tissue and Cell, Jan. 1972, pp. 189-217, vol. 4, No. 2, Elsevier, B.V., Netherlands.

Bullegas, Gianmaria, et al., "Towards quasi isotropic laminates with engineered fracture behaviour for industrial applications," Composites Science and Technology, Jul. 4, 2018, pp. 290-306, vol. 165, Elsevier Ltd., UK.

Campbell Jr, Flake C., "Manufacturing Technology for Aerospace Structural Materials," Jan. 2006, 600 pages, Elsevier (www.EngineeringEBooksPdf.com), US.

Campbell, F. C., "Manufacturing Processes for Advanced Composites," Elsevier Science Ltd, (2004): pp. 1-448, (ISBN: 1856174158).

Carlota V., "9T Labs raises $4.3 million to advance carbon fiber 3D printing", Feb. 1, 2020, [article, online], [retrieved on Feb. 5, 2021], retrieved from the Internet <URL:https://www.3dnatives.com/en/9t-labs-raises-4-3-million-010220205/>, (8 pages).

Chen, B., et al., "Spiry-layup model of Rutelidae cuticle," Computational Materials Science, Feb. 2004, pp. 517-522, vol. 30, Elsevier, B.V., Netherlands.

Chen, Liang, et al., "Mechanics-based analysis of selected features of the exoskeletal microstructure of Popillia japonica," Journal of Materials Research, Nov. 2009, pp. 3253-3267, vol. 24, No. 11, Mechanical Engineering Faculty Publications, US.

Cheng, Liang, et al., "Image analyses of two crustacean exoskeletons and implications of the exoskeletal microstructure on the mechanical behavior," Journal of Materials Research, Nov. 2008, pp. 2854-2872, vol. 23, No. 11, Mechanical Engineering Faculty Publications, US.

Cheng, Liang, et al., "Mechanical behavior of bio-inspired laminated composites," Composites: Part A: Applied Science and Manufacturing, Feb. 2011, pp. 211-220, vol. 42, No. 2, Elsevier Ltd., UK.

Chen, Po-Yu, et al., "Structure and mechanical properties of crab exoskeletons," Acta Biomaterialia, Jan. 2008, pp. 587-596, vol. 4, No. 3, Elsevier Ltd., UK.

Cugnoni, Joel, et al., "Thin ply technology advantages: An overview of the TPT-TECA project", May 2013, [slides, online], [retrieved on Feb. 4, 2021] retrieved from the Internet <http://www.thinplytechnology.com/mesimages/fichiers/TPTTECA-characterization-program-May 2013.pdf > (25 pages).

d3o.com, "D30 Impact Protection | Nothing protects better than D30", [retrieved Feb. 5, 2021] retrieved from the Internet, <URL:https://www.d3o.com/>, (6 pages).

Feilden, Ezra, et al., "3D Printing Bioinspired Ceramic Composites," Scientific Reports, Oct. 23, 2017, 9 pages, vol. 7, id. 13759, Nature Research, UK.

Fischer, F.D., et al., "Crack driving force in twisted plywood structures," Acta Biomater, Apr. 8, 2017, pp. 349-359, vol. 55, Elsevier Ltd., UK.

Foreman, Andrew, et al., "An integrated system for improved damage resistance and lighting strike protection in composite structures", 16th International Conference on Composite Materials, Jul. 8-13, 2007, [conference paper, online], [retrieved Feb. 5, 2021], retrieved from the Internet <URL:https://www.semanticscholar.org/paper/AN-INTEGRATED-SYSTEM-FOR-IMPROVED-DAMAGE-

(56) References Cited

OTHER PUBLICATIONS

RESISTANCE-Foreman-Nensi/e43ac413377e40a1a8b070cc160811cbee25d229#citing-papers>, (7 pages).

Gao, Yang, et al., "Spiral interface: A reinforcing mechanism for laminated composite materials learned from nature", Journal of the Mechanics and Physics of Solids, Sep. 6, 2017, pp. 252-263, vol. 109, Elsevier Ltd., UK.

Ginzburg, D., et al., "Damage tolerance of bio-inspired helicoidal composites under low velocity impact," Composite Structures, Feb. 2017, vol. 161, pp. 187-203, Elsevier Ltd., UK.

Gnoli, Daniel, et al., "Homogenization and Equivalent Beam Model for Fiber-Reinforced Tubular Profiles," Materials, Apr. 28, 2020, vol. 13, No. 2069, MDPI, Switzerland.

Green, P. A, et al. "Contests with deadly weapons: Telson sparring in mantis shrimp (*Stomatopoda*)," Sep. 1, 2015, 4 pages, Biology Letters, vol. 11, No. 9, The Royal Society Publishing, England.

Greenfeld, Israel, et al., "Nested helicoids in biological microstructures," Nature Communications, Jan. 13, 2020, pp. 1-12, vol. 11, No. 1, Springer Nature Ltd. UK.

Grunenfelder, L. K., et al., "Bio-inspired impact-resistant composites," Acta Biomaterialia, Mar. 27, 2014, pp. 3997-4008, vol. 10, No. 9., Elsevier Ltd., UK.

Grunenfelder, Lessa Kay, et al., "Crustacean-Derived Biomimetic Components and Nanostructured Composites", Small (Nano Micro), Aug. 27, 2014, pp. 3207-3232, vol. 10, No. 16, Wiley-VCH Verlag GmbH & Co. KGaA, Germany.

Guarín-Zapata, N., et al., "Bandgap tuning in bioinspired helicoidal composites", Journal of the Mechanics and Physics of Solids, Jul. 6, 2019, pp. 344-357, vol. 131, Elsevier Ltd., UK.

Guarín-Zapata, N., et al., "Shear wave filtering in naturally-occurring Bouligand structures", Acta Biomaterialia, May 14, 2015, pp. 11-20, vol. 23, Elsevier Ltd., UK.

Han, Qigang, et al., "Mechanical properties of a novel dactyl-inspired green-composite sandwich structures with basalt fiber," Journal of Sandwich Structures and Materials, May 2019, 11 pages, SAGE Publishing, US.

Han, Qigang, et al., "Study on impact resistance behaviors of a novel composite laminate with basalt fiber for helical-sinusoidal bionic structure of dactyl club of mantis shrimp," Composites Part B: Engineering, Jun. 15, 2020, 11 pages, vol. 191, id. 107976, Elsevier Ltd., UK.

Haufler Composites, "Glass Fibre Fabrics", 4 pages, retrieved from the Internet at <URL:https://www.haufler.com/en/14/Glass-filament-fabrics.html>, on Sep. 22, 2021.

Hazzard, M. K. et al., "Effect of fibre orientation on the low velocity impact response of thin Dyneema® composite laminates," International Journal of Impact Engineering, Feb. 2017, pp. 35-45, vol. 100, Elsevier Ltd., UK.

Hundley, J.M., et al., "Multi-Scale Modeling of Metal-Composite Interfaces in Titanium-Graphite Fiber Metal Laminates Part I: Molecular Scale", Open Journal of Composite Materials, Oct. 25, 2011, pp. 19-37, vol. 1, No. 1, Scientific Research Publishing, China.

JEC Group, "Printing continuous carbon fibre in true 3D", Oct. 14, 2020, [article, online], [retrieved Feb. 5, 2021], retrieved from the Internet <URL:http://www.jeccomposites.com/knowledge/international-composites-news/printing-continuous-carbon-fibre-true-3d>, (10 pages).

Jiang, H., et al., "Low-velocity impact resistance behaviors of bio-inspired helicoidal composite laminates with non-linear rotation angle based layups," Composite Structures, Apr. 2019, pp. 463-475, vol. 214, Elsevier Ltd., UK.

Karthikeyan, K., et al., "Optimal fibre architecture of soft-matrix ballistic laminates," International Journal of Impact Engineering, Feb. 2016, pp. 227-237, vol. 88, Elsevier Ltd., UK.

Li, Nanya, "Rapid Microwave Additive Manufacturing of Continuous Carbon Fiber Reinforced Bionic Plastics", Proceedings of JEC Group's Fibre & Nano-Reinforced Materials Fill Gaps in Additive Manufacturing, Jun. 17, 2020, 15 pages, Paris.

Lim, Samuel, W.Y., et al., "Comparison of Tensile and Impact Absorption properties of Bio-Inspired Helicoidal stacked with Cross-Ply Stacked Carbon Fiber Laminate", IOP Conf. Series: Materials Science and Engineering, Jan. 2020, vol. 744, No. 012018, IOP Publishing, UK.

Liu, J. L., et al., "Bio-Inspired Laminates of Different Material Systems," Journal of Applied Mechanics, Mar. 2020, pp. 031007-1 to 031007-7, vol. 87, Transactions of ASME, US.

Liu, J. L., et al., "Effects of inter-ply angles on the failure mechanisms in bioinspired helicoidal laminates," Composites Science and Technology, Jul. 9, 2018, pp. 282-289, vol. 165, Elsevier Ltd., UK.

Liu, J. L., et al., "Failure mechanisms in bioinspired helicoidal laminates," Composites Science and Technology, Feb. 3, 2018, pp. 99-106, vol. 157, Elsevier Ltd., UK.

Liu, J. L., et al., "Healable bio-inspired helicoidal laminates," Composites Part A: Applied Science and Manufacturing, Jun. 20, 2020, vol. 137, id. 106024, Elsevier Ltd., UK.

Liu, J. L., et al., "Improving laminates through non-uniform inter-ply angles," Composites: Part A: Applied Science and Manufacturing, Sep. 14, 2019, 9 pages, vol. 127, id. 105625, Elsevier Ltd., UK.

Liu, J. L., et al., "The Response of Bio-inspired Helicoidal Laminates to Small Projectile Impact," International Journal of Impact Engineering, Aug. 2020, 16 pages, vol. 142, id. 103608, Elsevier Ltd., UK.

Mencattelli, Lorenzo, et al., "Herringbone-Bouligand CFRP structures: A new tailorable damage-tolerant solution for damage containment and reduced delaminations," Composites Science and Technology, Feb. 3, 2020, vol. 190, id. 108047, Elsevier Ltd., UK.

Mencattelli, Lorenzo, et al., "Realising bio-inspired impact damage-tolerant thin-ply CFRP Bouligand structures via promoting diffused sub-critical helicoidal damage," Composites Science and Technology, Jun. 2019, 13 pages, vol. 182, Elsevier Ltd., UK.

Mencattelli, Lorenzo, et al., "Ultra-thin-ply CFRP Bouligand bio-inspired structures with enhanced load-bearing capacity, delayed catastrophic failure and high energy dissipation capability," Composites: Part A: Applied Science and Manufacturing, Feb. 2020, 15 pages, vol. 129, id. 105655, Elsevier Ltd., UK.

Milliron, Garrett, "Lightweight Impact-Resistant Composite Materials: Lessons from Mantis Shrimp," (Dissertation), University of California Riverside, Sep. 2012, retrieved from the Internet on Feb. 5, 2021, at <URL: https://escholarship.org/content/qt5zc2x10s/qt5zc2x10s.pdf>, (143 pages).

Miracle, D.B., "ASM Handbook vol. 21: Composites," ASM International, (2001): pp. 1-1201(portions missing), (ISBN: 0-87170-703-9).

Mo, Chengyang, et al., "Spatial programming of defect distributions to enhance material failure characteristics," Extreme Mechanics Letters, Jan. 2020, vol. 34, id. 100598, Elsevier Ltd., UK.

N12 NanoStitch™, NanoStitch Interlaminar Reinforcement, Mar. 3, 2015, YouTube, accessed on Feb. 5, 2021, <URL:https://www.youtube.com/watch?v=og67m9v0mkM&feature=emb_ogo>, (5 pages).

Patek, S. N., et al., "Extreme impact and cavitation forces of a biological hammer: strike forces of the peacock mantis shrimp *Odontodactylus scyllarus*," Journal of Experimental Biology, Nov. 2005, pp. 3655-3664, vol. 208, No. 19, The Company of Biologists, UK.

Pinto, F., et al., "Bioinspired twisted composites based on Bouligand structures," Proceedings of SPIE, Bioinspiration, Biomimetics, and Bioreplication 2016, Mar. 21-22, 2016, pp. 97970E-1 to 97970E-13, vol. 9797, Las Vegas, US.

Raabe, D., et al., "Microstructure and crystallographic texture of the chitin-protein network in the biological composite material of the exoskeleton of the lobster *Homarus americanus*," Materials Science and Engineering A, Apr. 15, 2006, pp. 143-153, vol. 421, No. 1-2, Elsevier, B.V., Netherlands.

Raabe, D., et al., "The crustacean exoskeleton as an example of a structurally and mechanically graded biological nanocomposite material," Acta Materialia, Jul. 14, 2005, pp. 4281-4292, vol. 53, No. 15, Elsevier Ltd., UK.

Raphel, George, et al., "Bioinspired designs for shock absorption, based upon nacre and Bouligand structures," SN Applied Sciences, Aug. 12, 2019, vol. 1, id. 1022, Springer Nature, UK.

(56) References Cited

OTHER PUBLICATIONS

Ribbans, B., et al., "A bioinspired study on the interlaminar shear resistance of helicoidal fiber structures," Journal of the Mechanical Behavior of Biomedical Materials, Mar. 2016, vol. 56, pp. 57-67, Elsevier Ltd., UK.

Shang, J. S., et al., "Crustacean-inspired helicoidal laminates," Composites Science and Technology, Apr. 7, 2016, pp. 222-232, vol. 128, Elsevier Ltd., UK.

Sloan, Jeff (editor), "Vitrimers: The reprocessable thermoset", Sep. 28, 2020, [article, online], [retrieved Feb. 4, 2021], retrieved from the Internet <URL:https://www.compositesworld.com/articles/vitrimers-the-reprocessable-thermoset> (5 pages).

Suksangpanya, N. et al., "Twisting cracks in Bouligand structures," Journal of the Mechanical Behavior of Biomedical Materials, Jun. 10, 2017, pp. 38-57, vol. 76, Elsevier Ltd., UK.

Suksangpanya, Nobphadon, et al., "Crack twisting and toughening strategies in Bouligand architectures," International Journal of Solids and Structures, Jun. 6, 2018, vol. 150, pp. 83-106, Elsevier Ltd., UK.

Tan, Ting, et al., "A bioinspired study on the compressive resistance of helicoidal fibre structures," Proceedings of the Royal Society A: Mathematical, Physical and Engineering Sciences, Oct. 11, 2017, 15 pages, vol. 473, No. 2206, The Royal Society Publishing, England.

Textreme, "+/−45 Woven Fabrics.", 6 pages, retrieved from the Internet at <URL:https://www.textreme.com/what-we-do/spread-tow-products/45-woven-fabrics/>, on Sep. 22, 2021.

Torres, J.P., et al., "Manufacture of Green-Composite Sandwich Structures with Basalt Fiber and Bioepoxy Resin", Advances in Materials Science and Engineering, Jun. 2013, 9 pages, vol. 2013, id. 214506, Hindawi Publishing Corporation, UK.

Trimech Blog, "3D Printing Composite Materials: Micro Automated Fiber Placement", Feb. 4, 2020, [blog, online], [retrieved Feb. 5, 2021], retrieved from the Internet <URL:https://blog.trimech.com/3d-printing-composite-materials-micro-automated-fiber-placement#:~:text=3D%20Printing%20Composite%20Materials%3A%20Micro%20Automated%20Fiber%20Placement,-By%20TriMech%20on&text=Automated%20Fiber%20Placement%20(AFP)%20is,also%20contains%20non%2Dmetallic%20fibers> (7 pages).

Vargas-Gonzalez, Lionel R., et al., "Examining the Relationship Between Ballistic and Structural Properties of Lightweight Thermoplastic Unidirectional Composite Laminates", Army Research Laboratory, Aug. 2011, 18 pages, ARL-RP-0329, US.

Vargas-Gonzalez, Lionel R., et al., "Hybridized composite architecture for mitigation of non-penetrating ballistic trauma", International Journal of Impact Engineering, Aug. 28, 2015, pp. 295-306, vol. 86, Elsevier Ltd., UK.

Vargas-Gonzalez, Lionel R., et al., "Impact and Ballistic Response of Hybridized Thermoplastic Laminates", Army Research Laboratory, Feb. 2011, 26 pages, ARL-MR-0769, US.

Weaver, James C., et al., "The stomatopod dactyl club: A formidable damage-tolerant biological hammer," Jun. 8, 2012, Science, vol. 336, pp. 1275-1280, American Association for the Advancement of Science, US.

Yang, Ruiguo, et al., "AFM Identification of Beetle Exocuticle: Bouligand Structure and Nanofiber Anisotropic Elastic Properties," Advanced Functional Materials, Feb. 10, 2017, pp. 1603993-1 to 1603993-8, vol. 27, Whiley-VCH, Germany.

Yaraghi, N. A., et al., "A Sinusoidally Architected Helicoidal Biocomposite," Advanced Materials, May 30, 2016, pp. 6835-6844, vol. 28, No. 32, Whiley-VCH, Germany.

Yaraghi, N. A., et al., "The Stomatopod Telson: Convergent Evolution in the Development of a Biological Shield," Advanced Functional Materials, Jun. 2019, pp. 1902238-1 to 1902238-13, vol. 29, No. 34, Whiley-VCH, Germany.

Yin, Sha, et al., "Toughening Mechanism of Coelacanth-Fish-Inspired Double-Helicoidal Composites", Composites Science and Technology, Jan. 8, 2021, 8 pages, vol. 205, No. 108650, Elsevier Ltd., UK.

Zaheri, Alireza, et al., "Revealing the Mechanics of Helicoidal Composites through Additive Manufacturing and Beetle Developmental Stage Analysis", Advanced Functional Materials, Aug. 15, 2018, 11 pages, vol. 28, No. 33, id. 1803073, Wiley-VCH Verlag GmbH & Co. KGaA, Germany.

Zhang, Timothy G., et al., "Ballistic Impact Response of Ultra-High-Molecular-Weight Polyethylene (UHMWPE)", Composite Structures, Jul. 18, 2015, pp. 191-201, Elsevier BV, Netherlands.

Zhang, Timothy G., et al., "Effects of Curvature and Architecture on Ballistic Performance of UHMWPE Helmets", Proceeding of the ASME 2019 International Mechanical Engineering Congress and Exposition, Nov. 11-24, 2019, 9 pages, Salt Lake City, Utah, US.

Zhang, Y., et al., "Uncovering three-dimensional gradients in fibrillar orientation in an impact-resistant biological armour," Scientific Reports, May 2016, pp. 26249-1 to 26249-13, vol. 6, Nature Research, UK.

Zorzetto, Laura, et al., "Wood-Inspired 3D-Printed Helical Composites with Tunable and Enhanced Mechanical Performance," Advanced Functional Materials, Jan. 4, 2019, pp. 1805888 1-9, vol. 29, No. 1, Whiley-VCH, Germany.

Zympeloudis, Evangelos, et al., "CMTS (Continuous Multi-Tow Shearing) for High-Volume Production of Complex Composite Parts", Jun. 10, 2016, [slides, online], [retrieved Feb. 5, 2021], retrieved from Internet <http://www.bristol.ac.uk/media-library/sites/composites/documents/cdt/conference/2016/evangelos-zympeloudis.pdf>, (10 pages).

International Searching Authority, International Search Report and Written Opinion received for International Application No. PCT/US2021/014848, dated Oct. 13, 2021, 10 pages, United States Patent & Trademark Office, U.S.

International Preliminary Examining Authority, Preliminary Report on Patentability, Chapter II (including Applicant's Jan. 7, 2022 reply to the Oct. 13, 2021 Written Opinion), received for International Application No. PCT/US2021/014848, dated Apr. 19, 2022, 23 pages, United States Patent and Trademark Office, U.S.A. (Document previously provided on May 10, 2022, correcting entry by adding the International Application No.).

Japan Patent Office, Notice of Reasons for Refusal received for Application No. 2022-549233, mailed Apr. 27, 2023, 6 pages, Japan.

European Patent Office, Partial Supplementary European Search Report received for Application No. 21907356.6, dated Nov. 25, 2024, 12 pages, Germany.

Japan Patent Office, Decision of Refusal received for Application No. 2023-537108, dated Nov. 28, 2024, 6 pages, Japan.

UNI-DIRECTIONAL

WOVEN

NON-CRIMPED MULTI-AXIAL

NET SHAPED PREFORM

ADHESIVELY BONDED METAL REINFORCEMENT LAYER

FIBER-REINFORCED POLYMER MATRIX COMPOSITE LAMINAE

HELICOID WITH CURVED PLIES

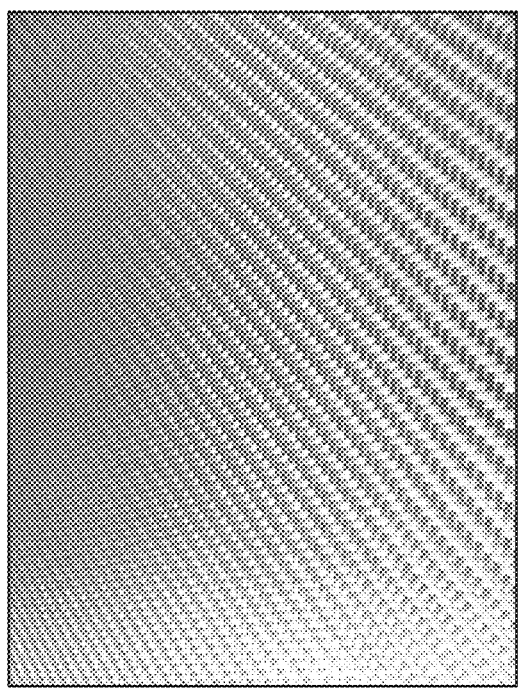
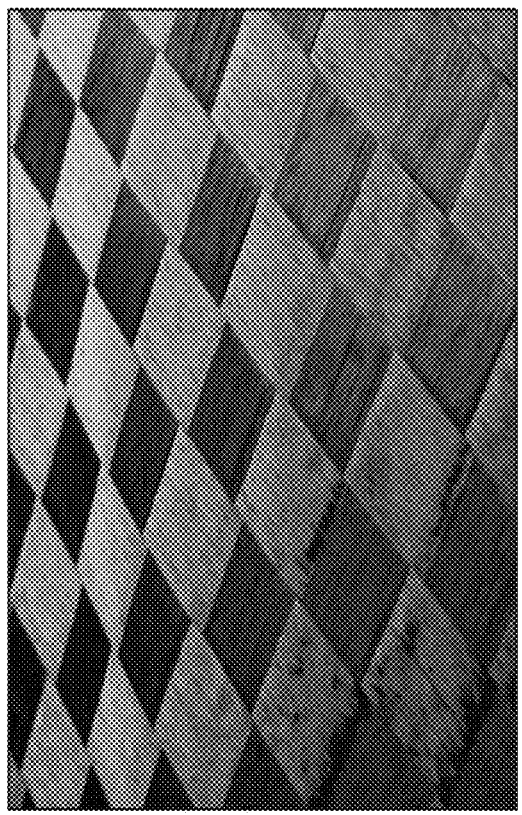
FIG. 19

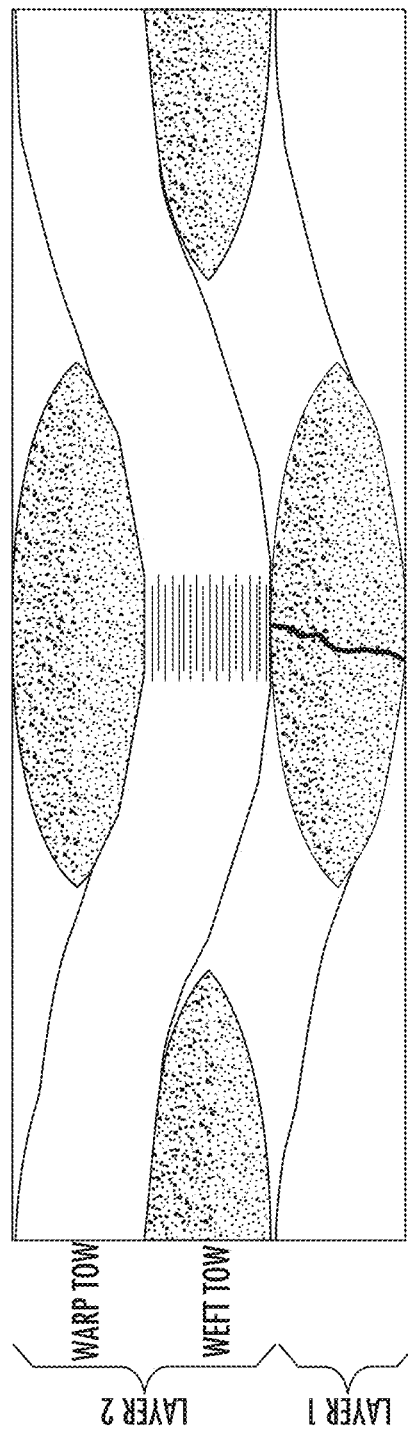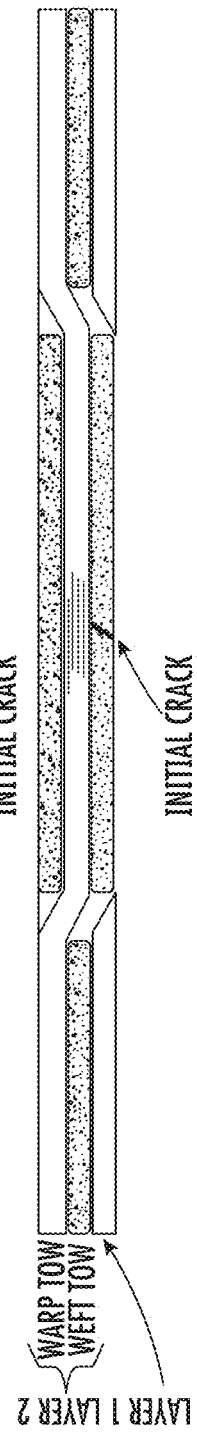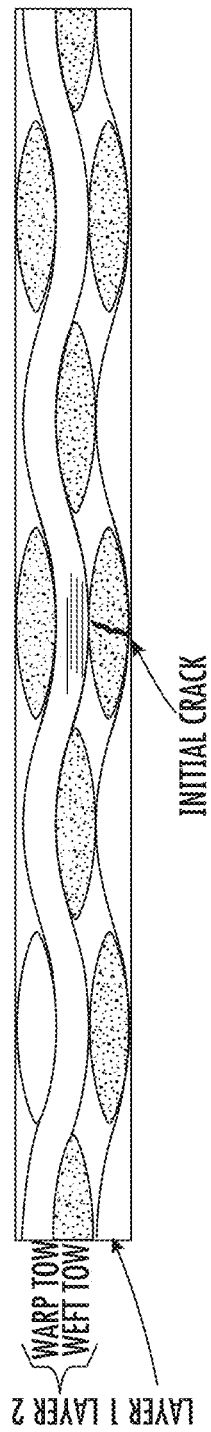

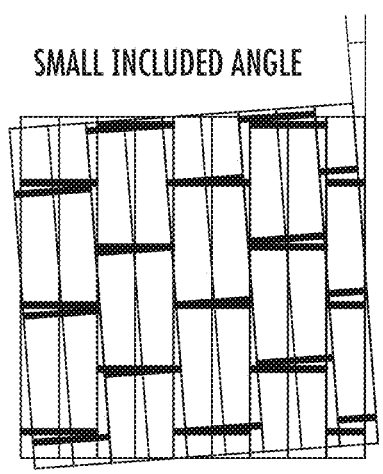 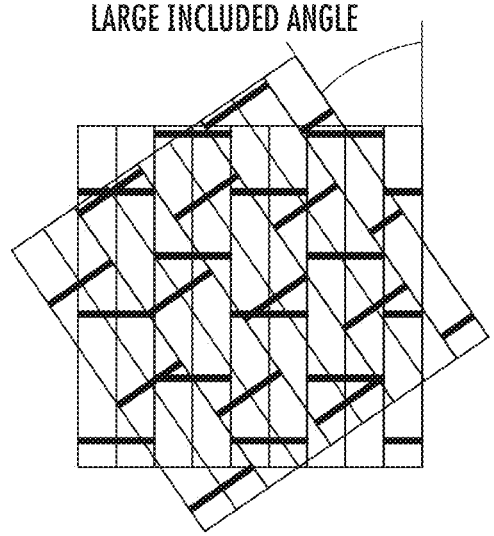
FIG. 22A
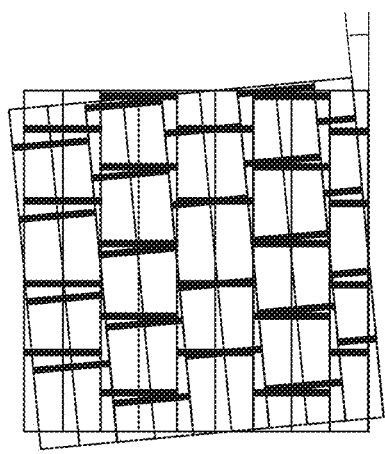 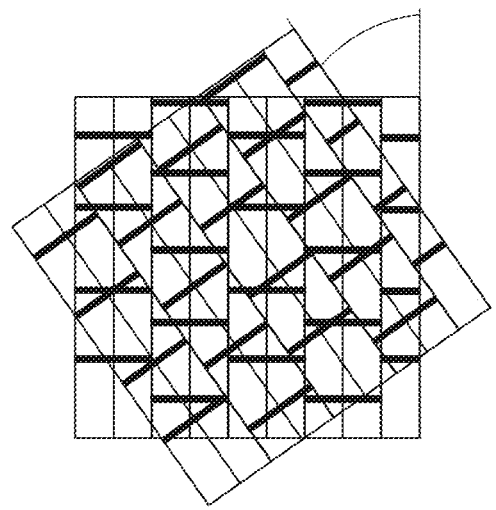
FIG. 22B

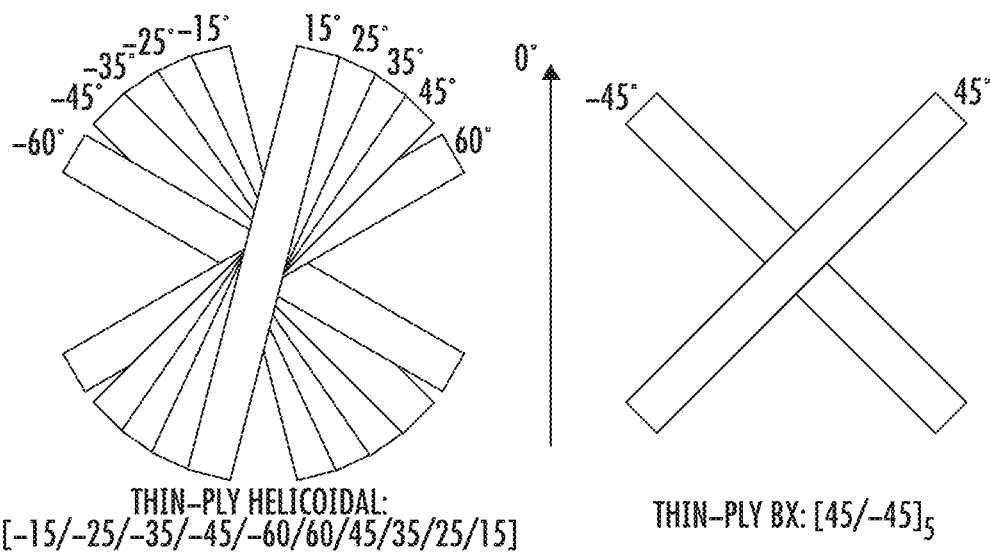
FIG. 23A
FIG. 23B
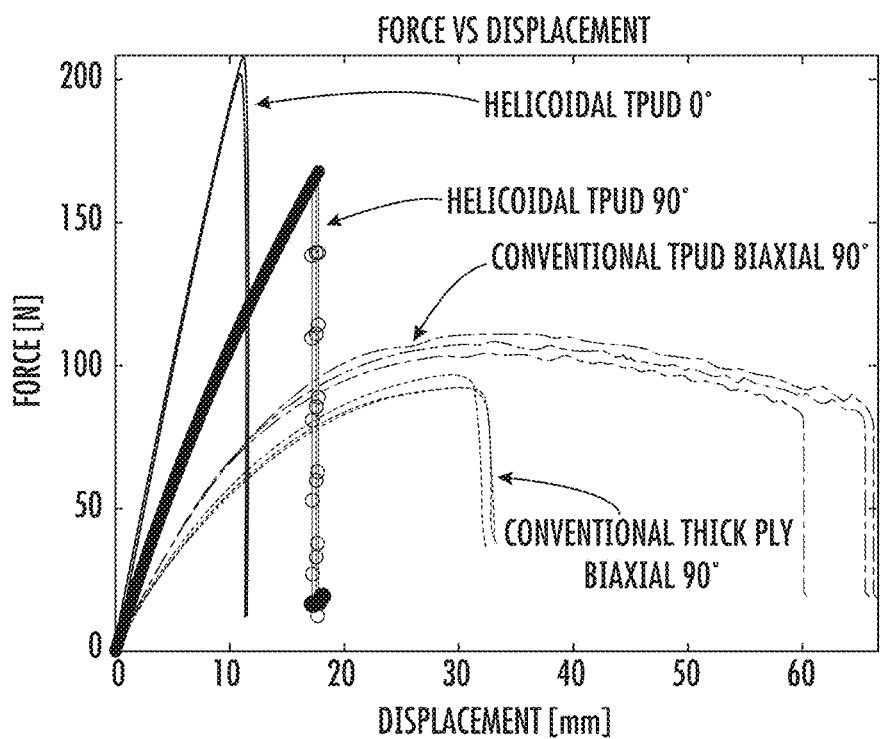
FIG. 24

COMPOSITE MATERIALS AND STRUCTURES

CROSS-REFERENCE TO RELATED APPLICATIONS

This application is a continuation-in-part of U.S. patent application Ser. No. 17/247,603 filed Dec. 17, 2020, which claims the benefit of U.S. Patent Application Ser. No. 63/033,835 filed Jun. 3, 2020 and U.S. Patent Application Ser. No. 62/972,830, filed Feb. 11, 2020. The aforementioned patent applications are each hereby incorporated by reference in their entirety for any purpose whatsoever.

STATEMENT OF GOVERNMENT INTERESTS

The disclosed embodiments were not made under any government support or contract. The Government has no rights in the invention.

FIELD

The present disclosure relates to shock and impact resistant structures. Particularly, the present disclosure is directed to embodiments of materials having a helicoidal architecture.

BACKGROUND

U.S. Pat. Nos. 6,641,893 and 9,452,587 each of which is hereby incorporated by reference herein in their entirety, describe a fiber reinforced elastic composite ply stacking approach in which the individual layers are rotated along the longitudinal or x-y axis at a predefined angle relative to the adjacent layers so as to create a z-direction helicoidal fiber oriented stack (i.e. laminate). This helicoidal clocking can be chosen to create a specific spiraling pitch or circular polarization. The spiral formed from the assembly of these pitched fibers can be tuned to a specific wavelength to dampen propagating shock waves initiated by ballistics, strike forces or foreign material impacts; can have matrix additives to toughen and arrest propagation of catastrophic fractures; and can be made to exploit the difference in elastic moduli between the fibers and matrix resin to further arrest fractures generated from blunt or sharp impacts.

SUMMARY OF THE DISCLOSURE

This disclosure describes details for designing and manufacturing shock and impact resistant structures from thin ply uni-directional (TPUD), thin-ply woven fabrics (TPW), quasi-uni-directional woven fabrics (QUDW) and hybrid fiber reinforced helicoidal materials, arranged, for example, as stacks of polymer based composite material. Also described are apparatuses that include the envisioned structures: consumer products, protective armor, sporting equipment, crash protection devices, wind turbine blades, cryogenic tanks, automotive/aerospace components, construction materials, and other composite products.

BRIEF DESCRIPTION OF THE DRAWINGS

Figure 1:
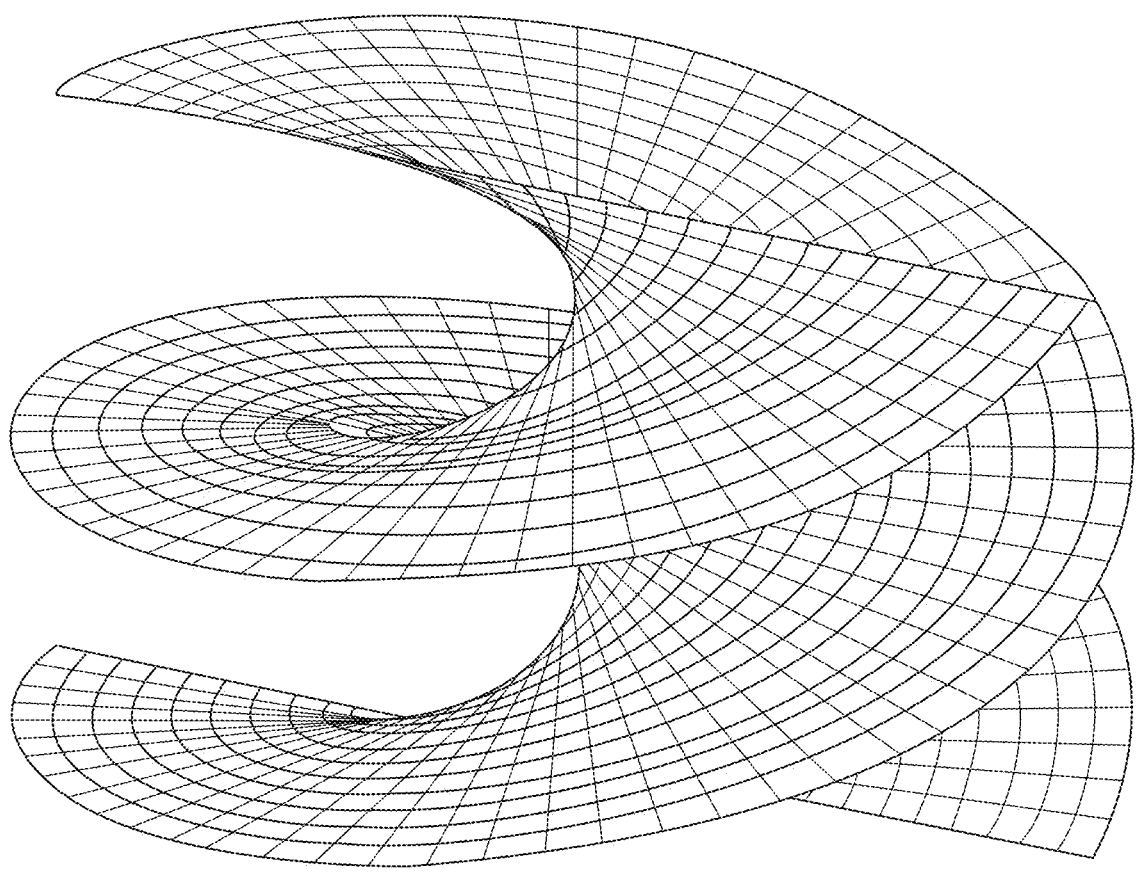

Having thus described the invention in general terms, reference will now be made to the accompanying drawings, which are not necessarily drawn to scale, and wherein some may represent background art, at least unless otherwise noted:

FIG. 1 is an illustration of an example of a helicoidal geometry.

Figure 2A:
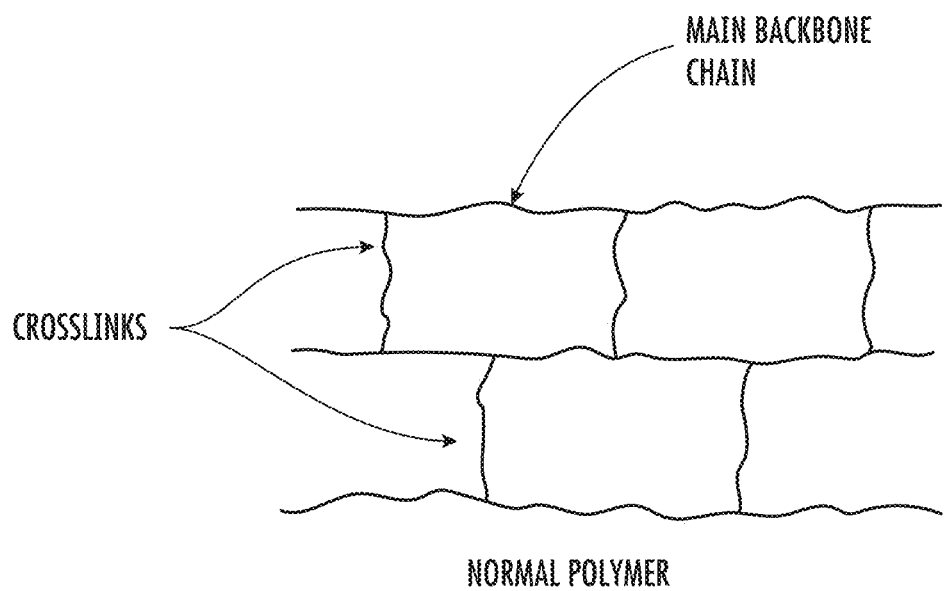
Figure 2B:
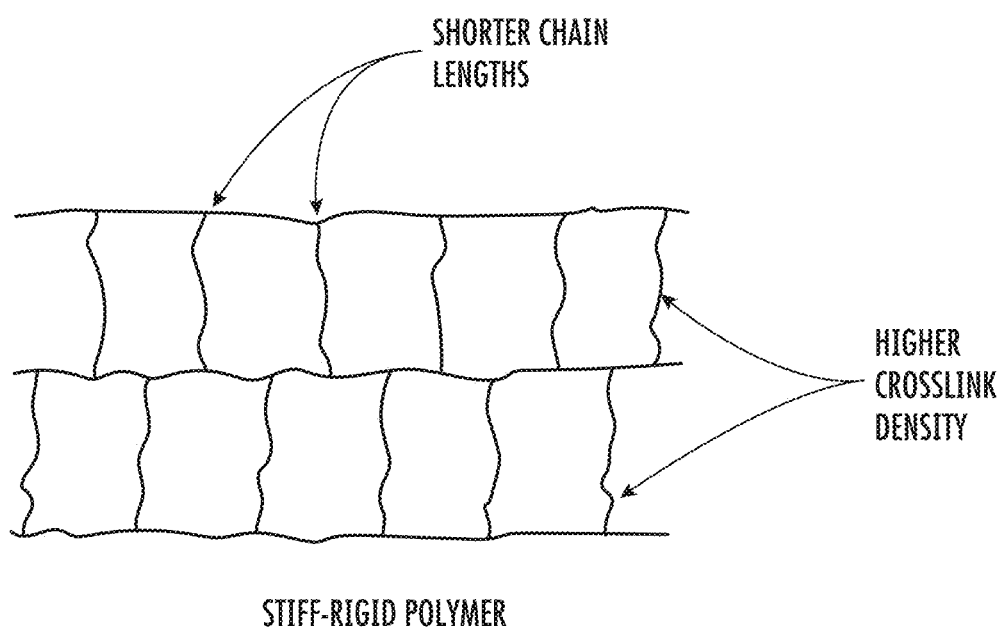

FIGS. 2A-2B illustrate examples of a matrix resin molecular structure.

Figure 3:
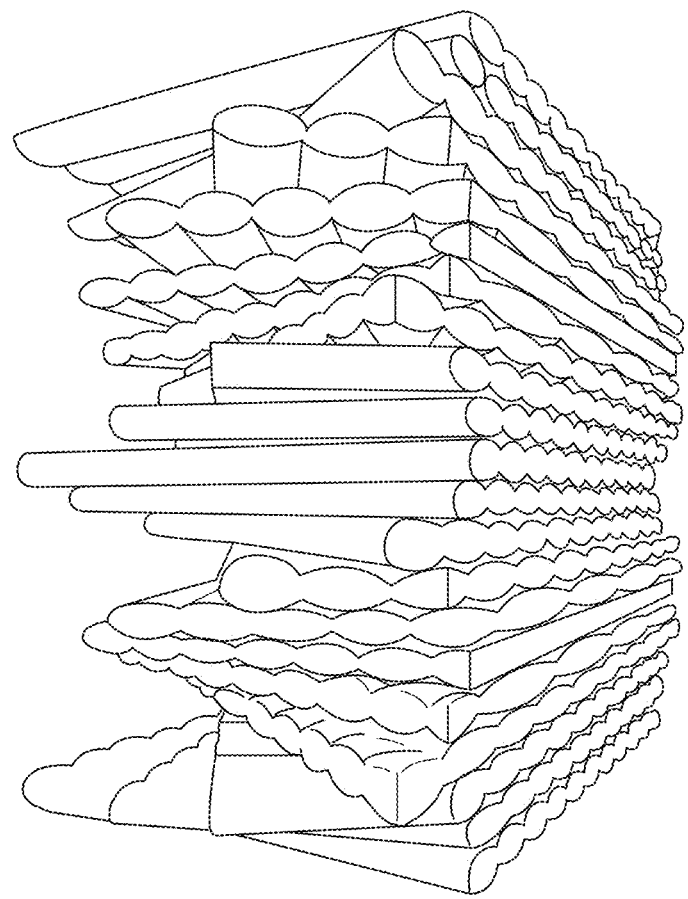

FIG. 3 illustrates a stack of fiber layers arranged into a helicoidal pattern according to embodiments of the invention.

Figure 4A:
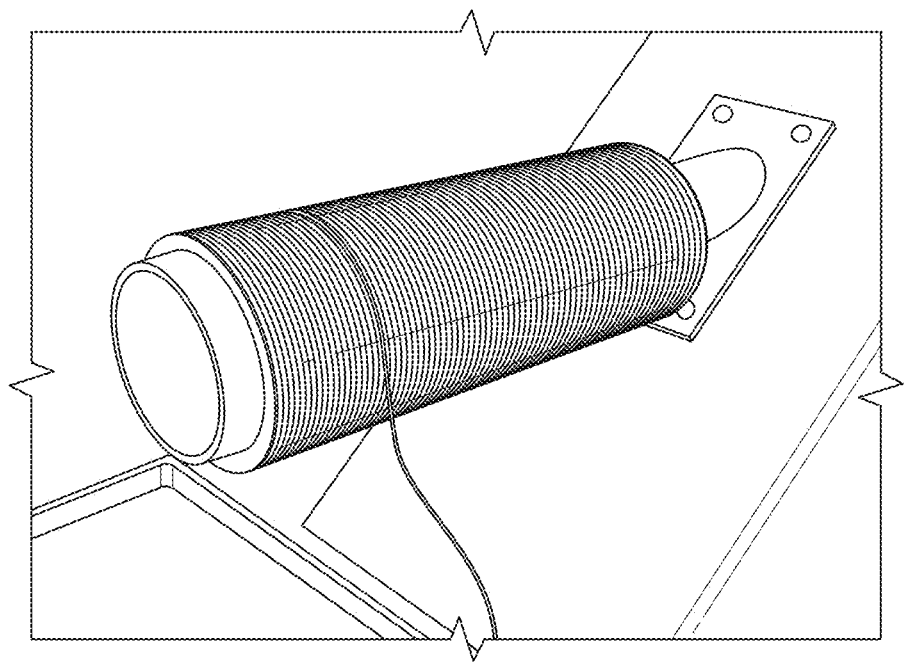
Figure 4B:
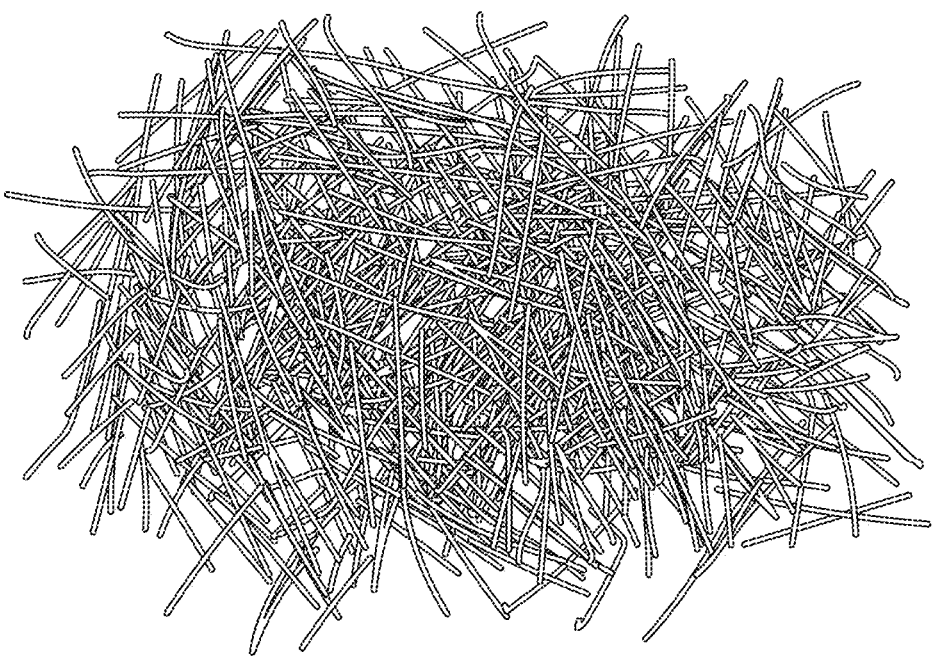

FIGS. 4A-4B illustrate discontinuous and continuous material forms.

FIGS. 5A-5H illustrate uni-directional and other material forms.

Figure 6:
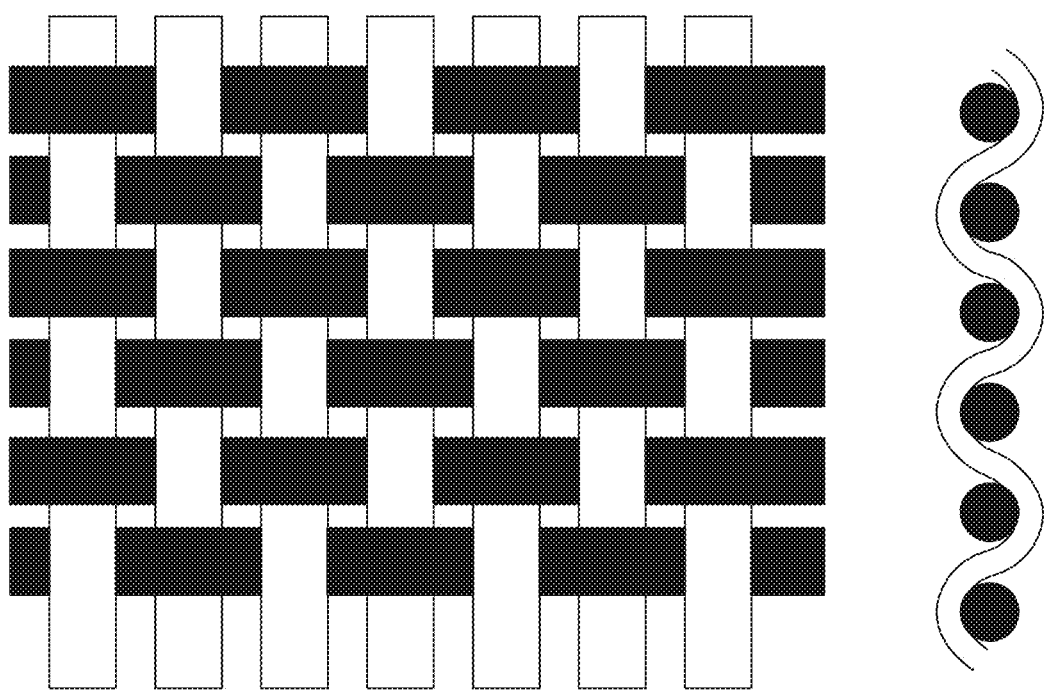

FIG. 6 illustrates fiber crimping arising from interlacing.

Figure 7A:
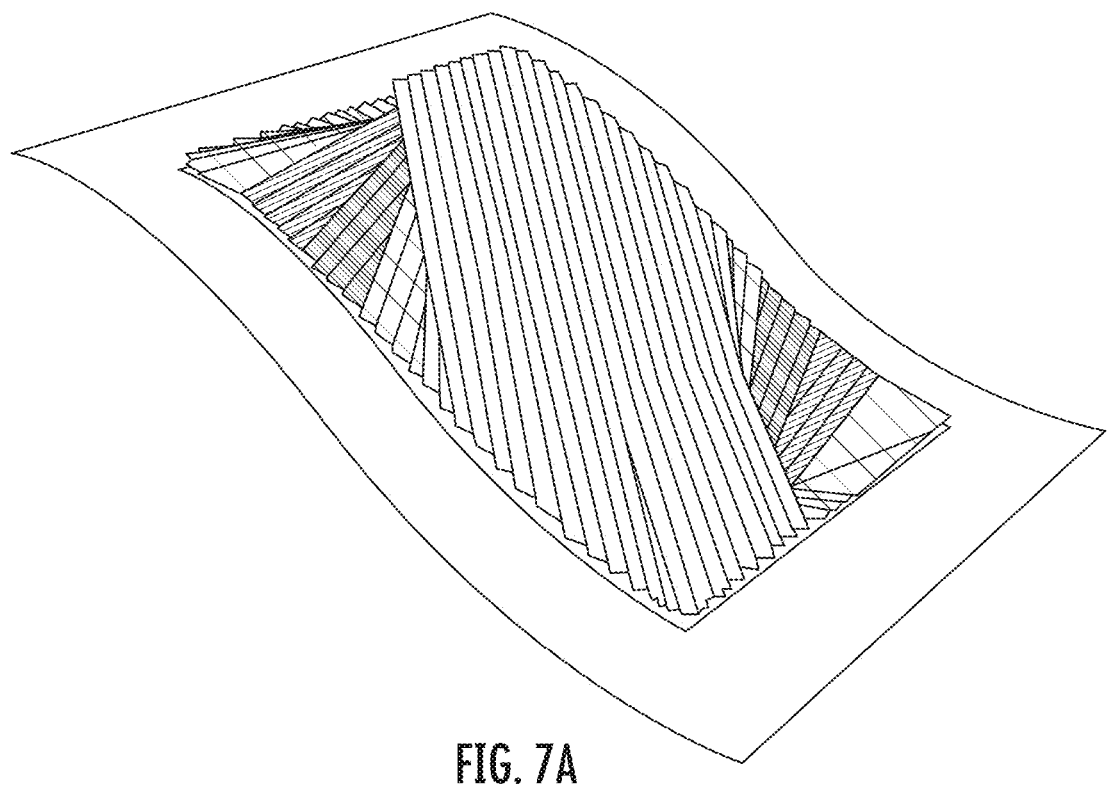

FIG. 7A illustrates a helicoidal preform made of straight fiber placement on a 3D curved shape according to embodiments of the invention.

Figure 7B:
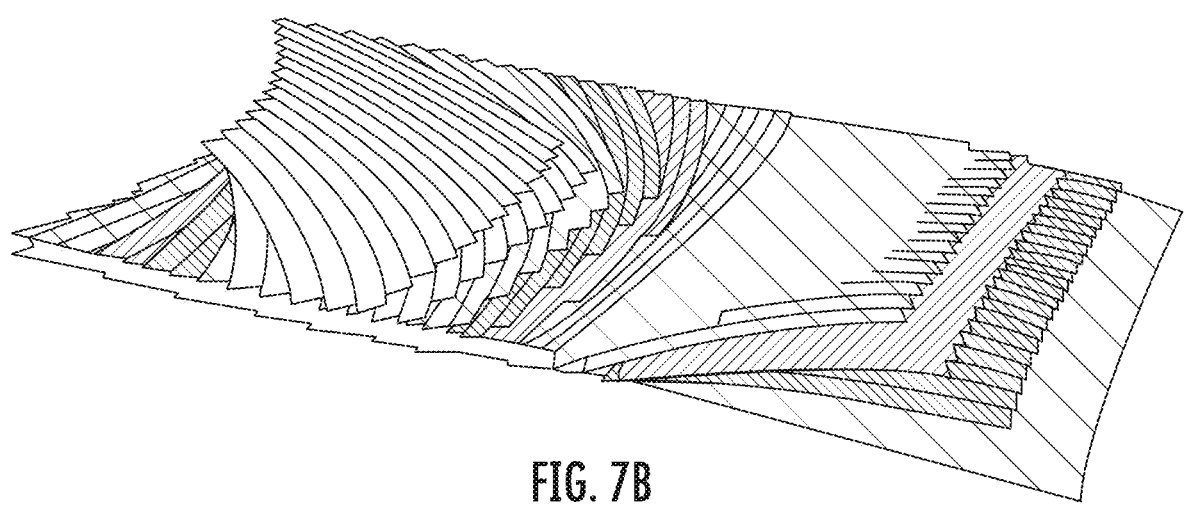

FIG. 7B illustrates a helicoidal preform made of curved fiber placement on a 2D shape according to embodiments of the invention.

Figure 8:
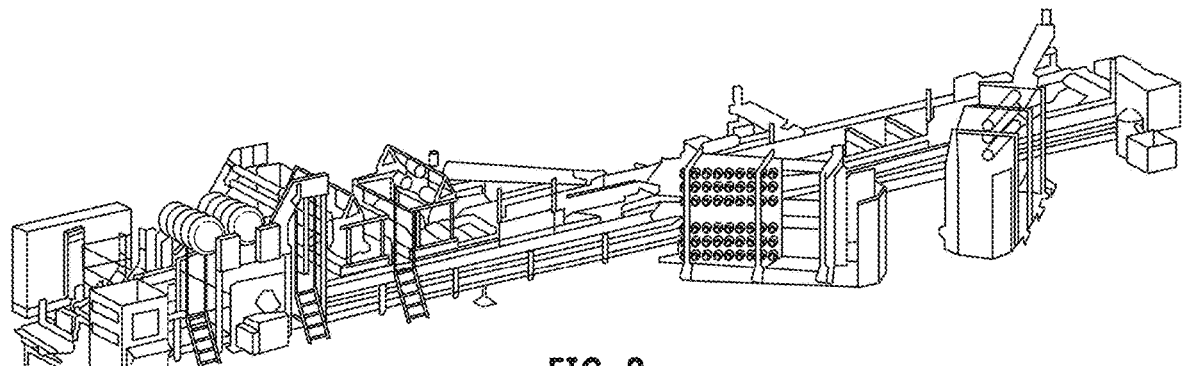

FIG. 8 is an illustration of an MX fabric machine.

Figure 9:
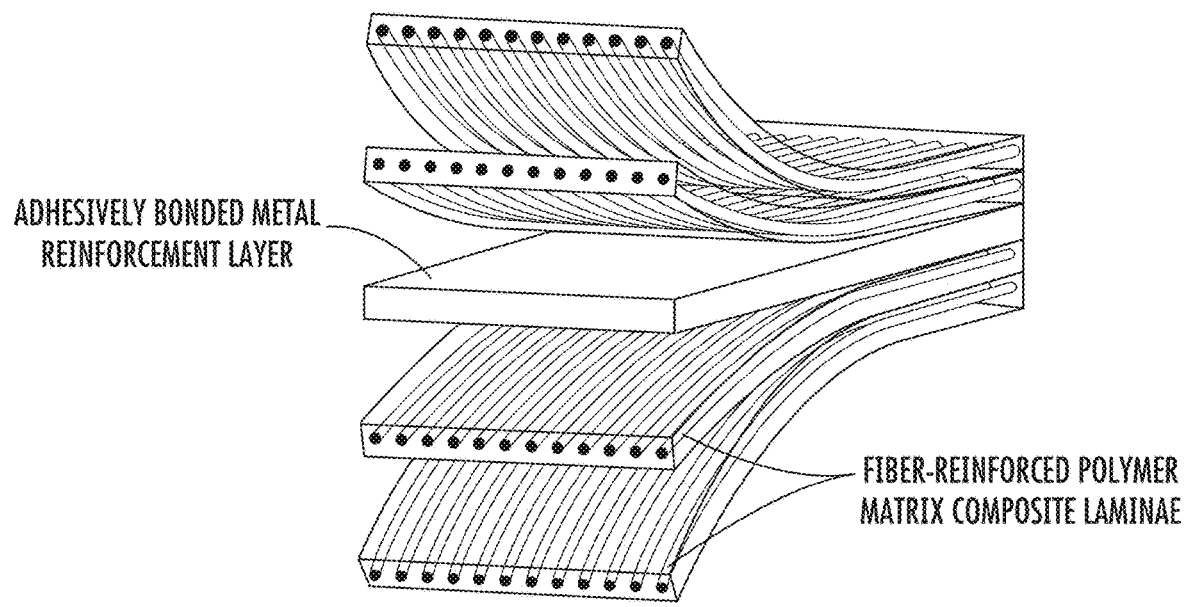

FIG. 9 is an illustration of a fiber metal laminate.

Figure 10A:
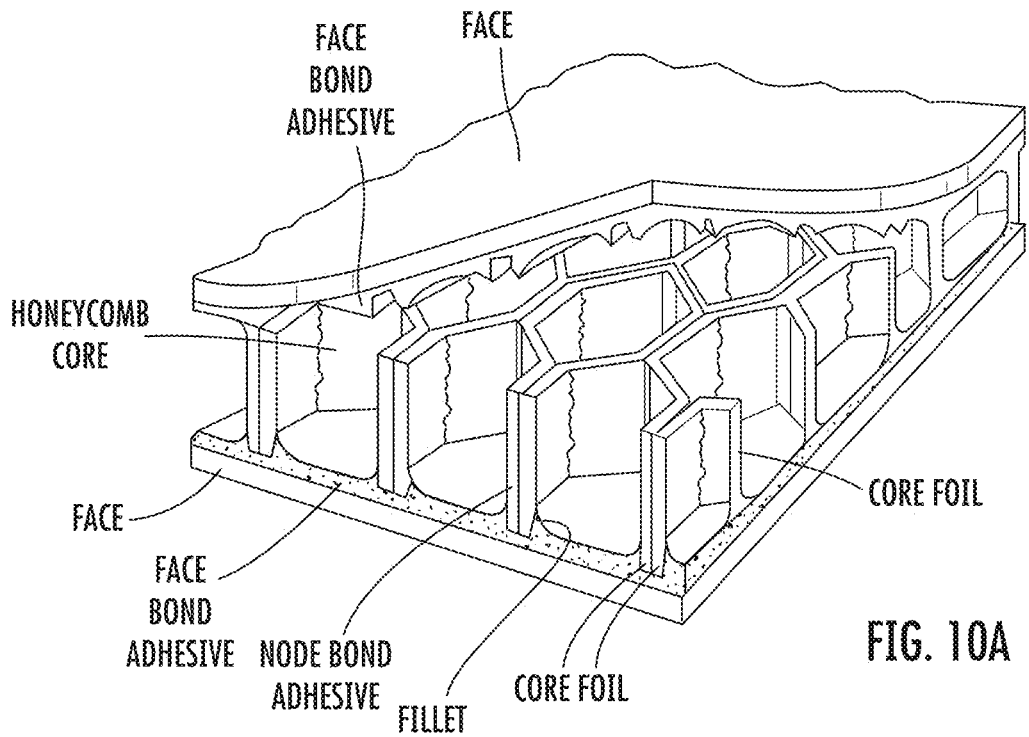
Figure 10B:
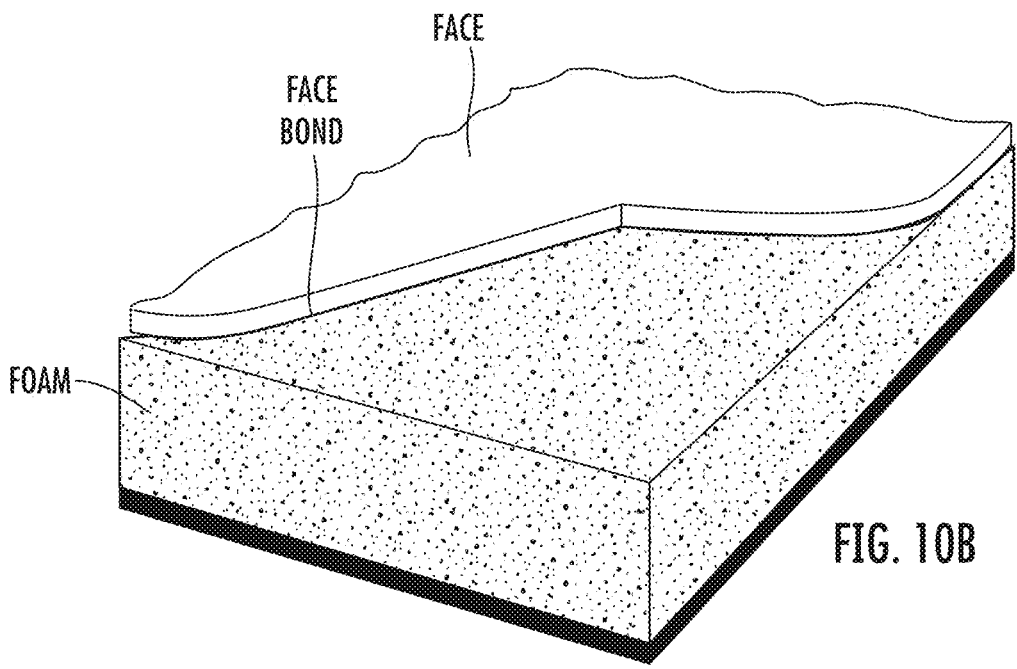

FIGS. 10A-10B are illustrations of composite sandwich structures.

Figure 11:
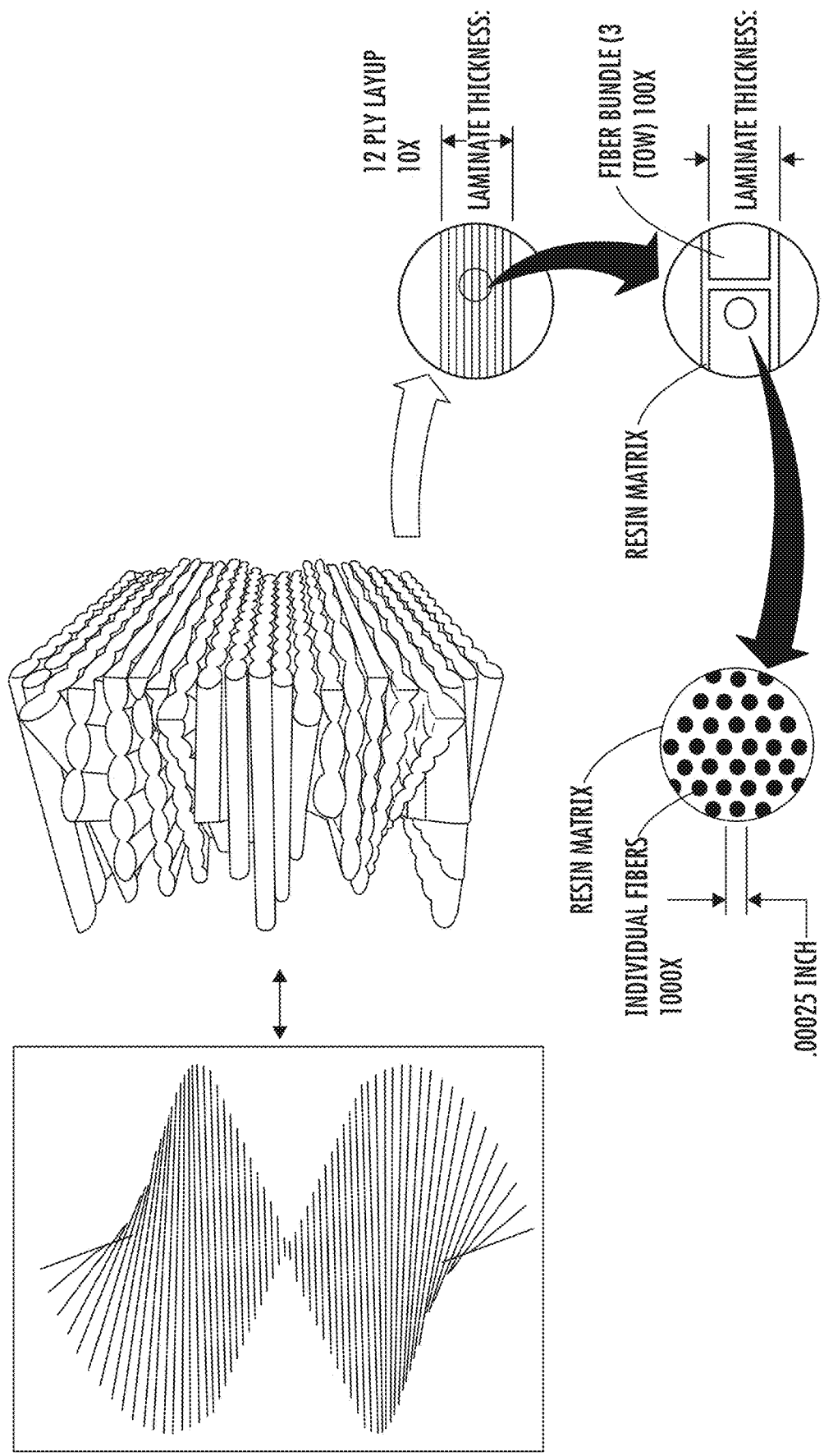

FIG. 11 depicts an illustration of a helicoidal laminate stack.

Figure 12:
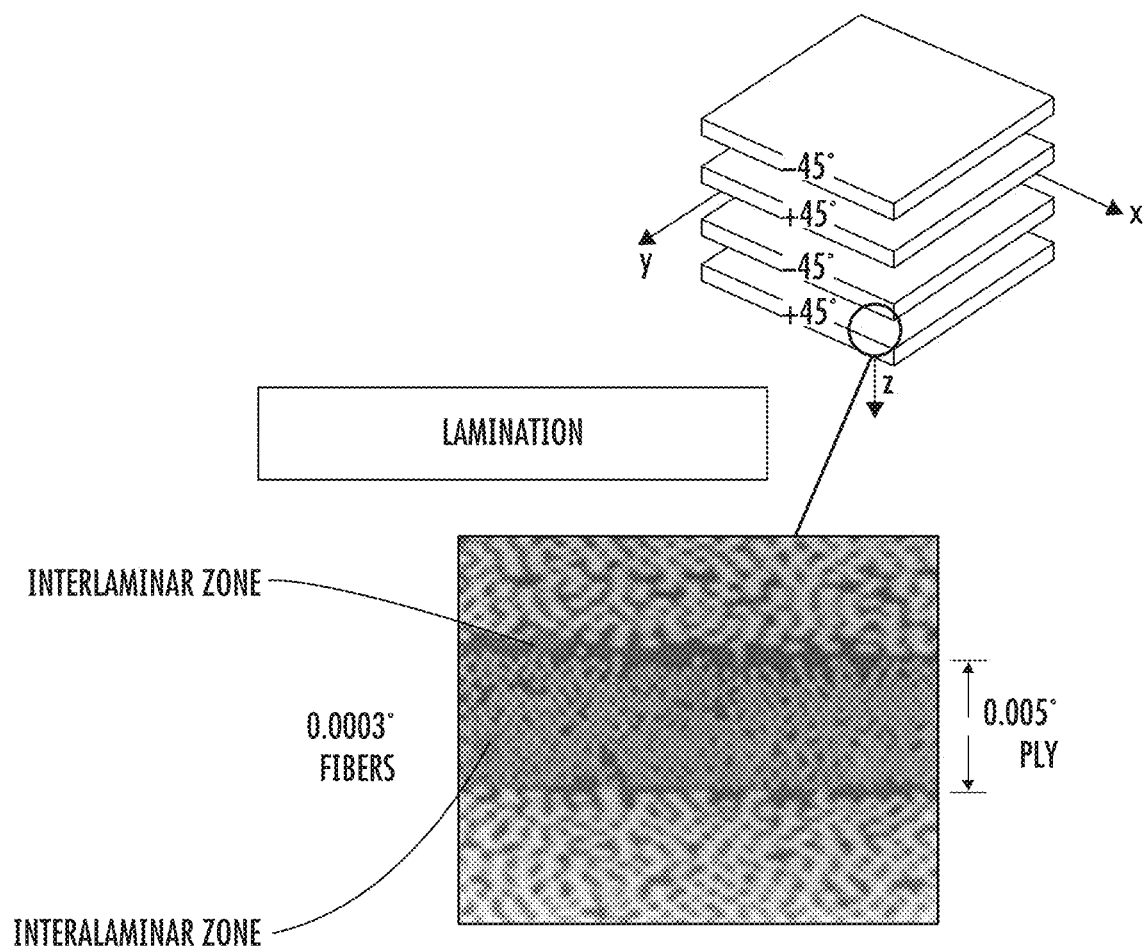

FIG. 12 depicts laminate intra and interlaminar zones.

Figure 13:
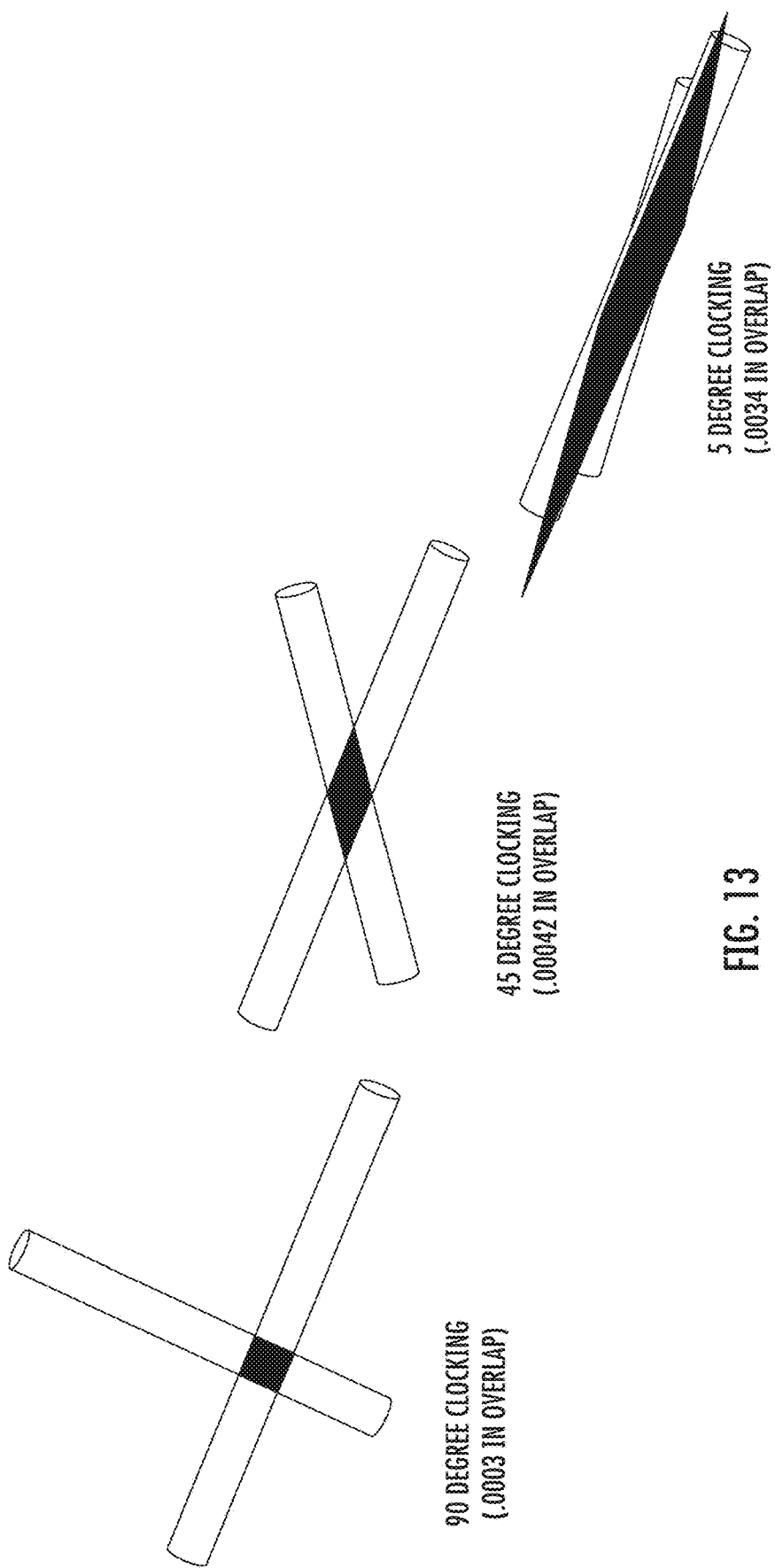

FIG. 13 depicts examples of individual fiber interlaminar contact lengths according to embodiments of the invention.

Figure 14A:
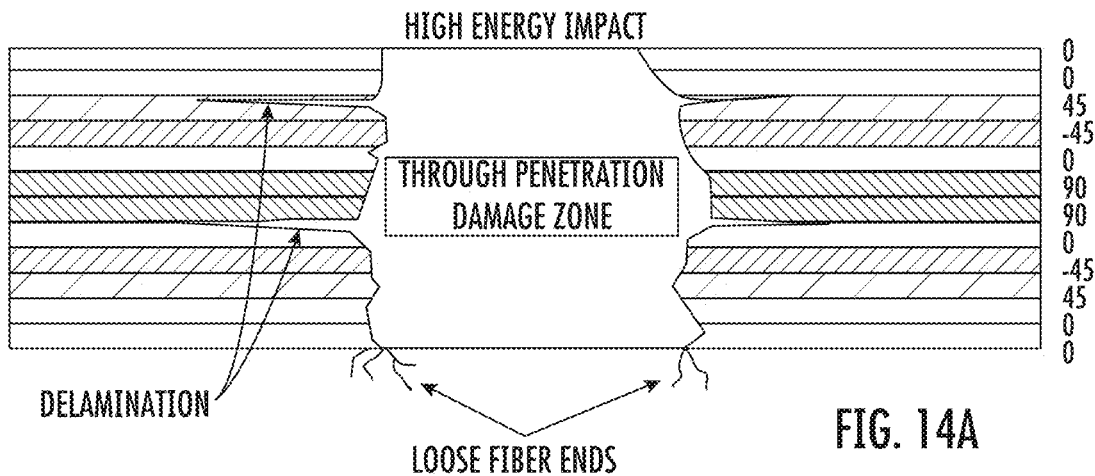
Figure 14B:
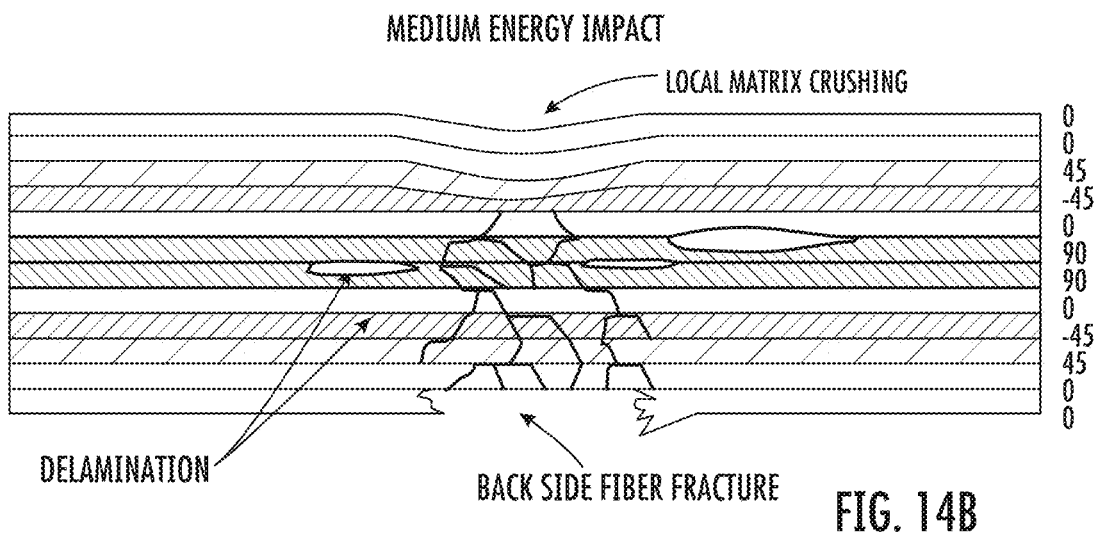
Figure 14C:
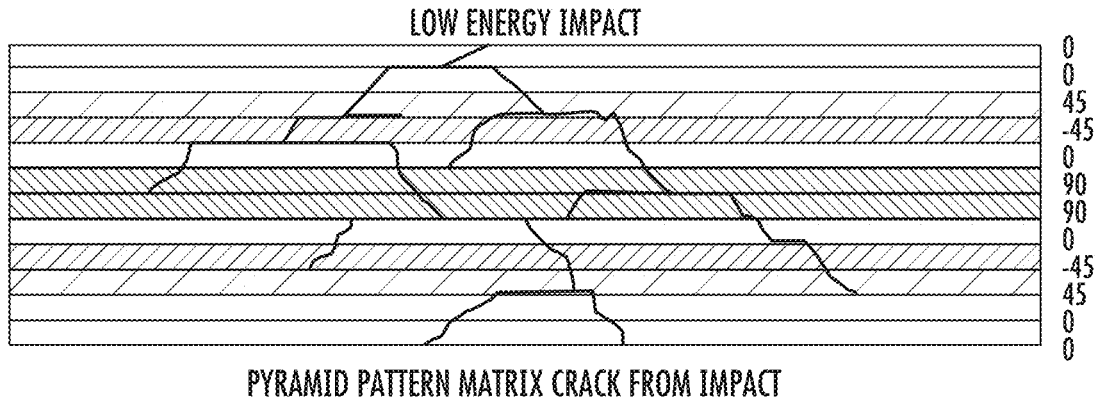

FIGS. 14A-14C depict typical composite impact damage.

Figures 15A, 15B:
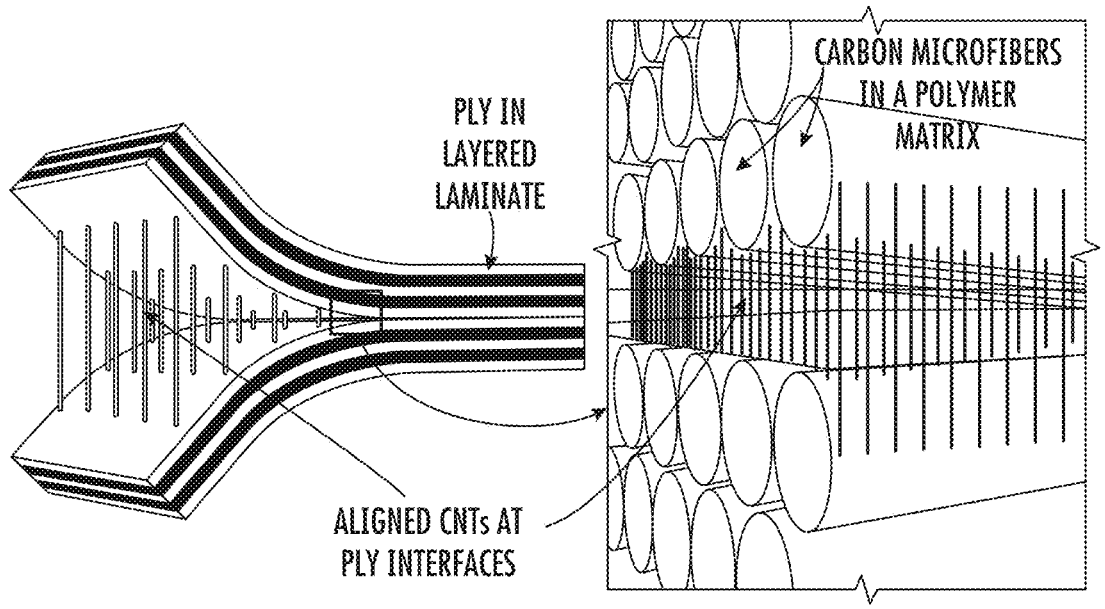
Figure 15C:
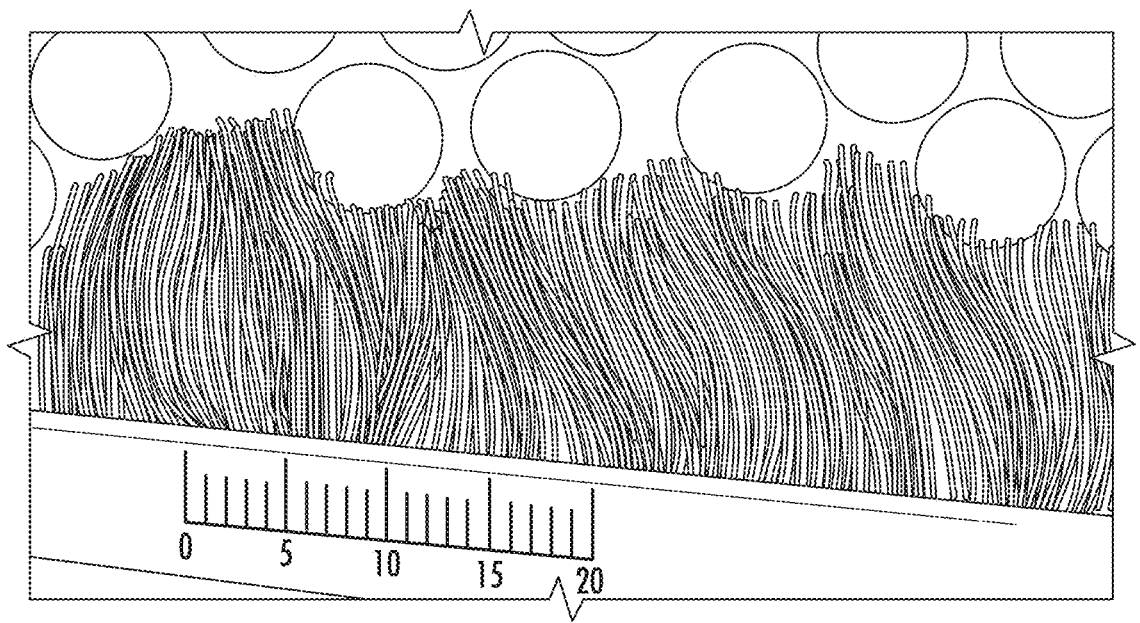

FIGS. 15A-15C depict typical composites where nano-materials bridge gaps and cracks between fibers.

Figure 16:
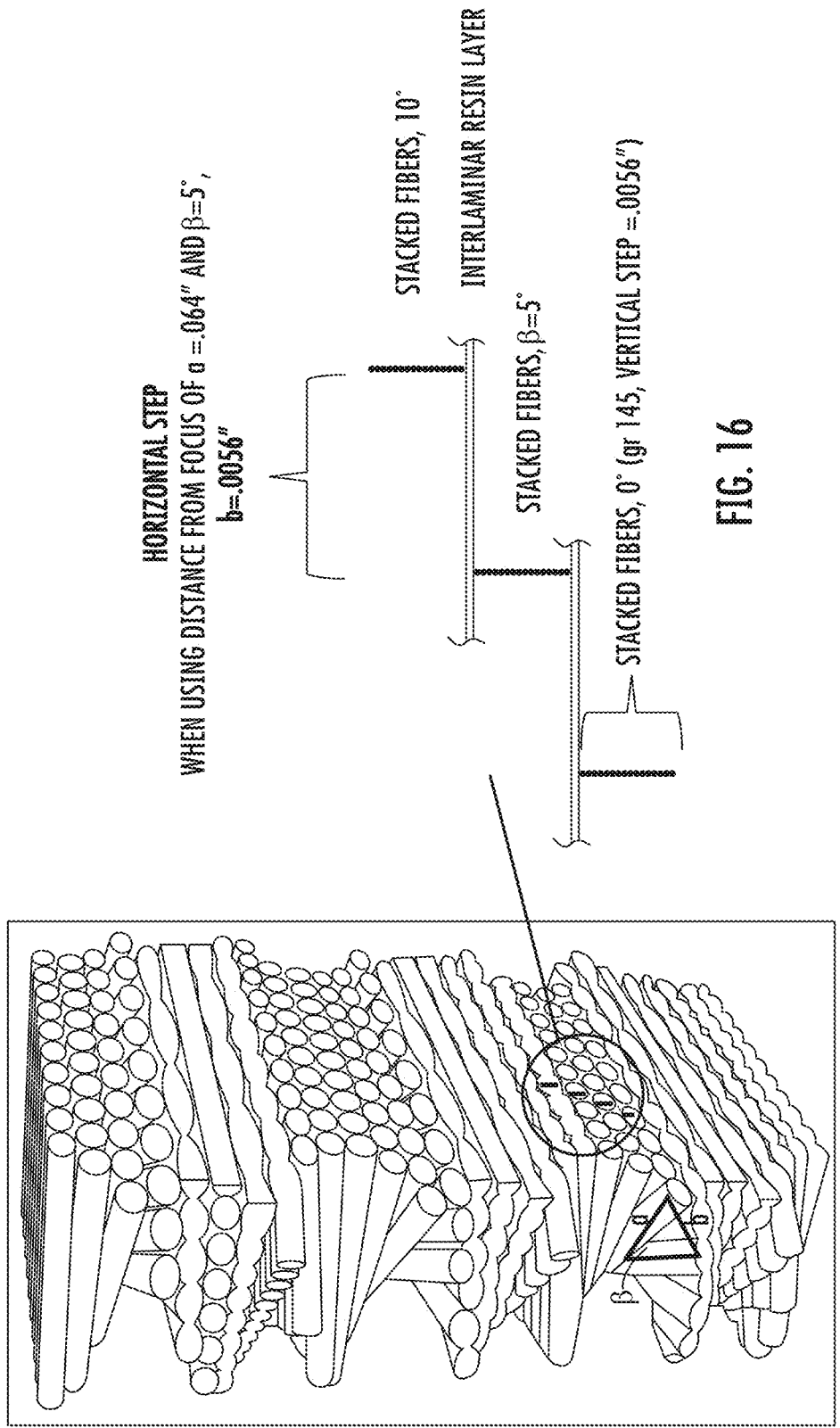

FIG. 16 depicts a stairstep shaped clocking spiral assembly according to embodiments of the invention.

Figure 17:
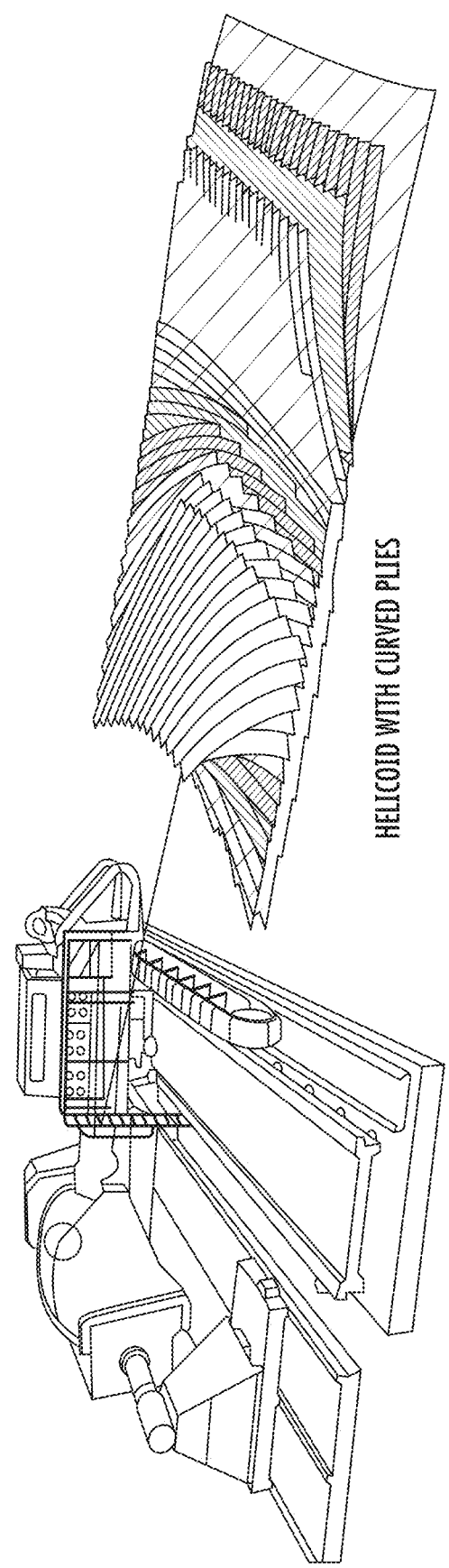

FIG. 17 depicts an illustration of fiber placement steering.

Figure 18A:
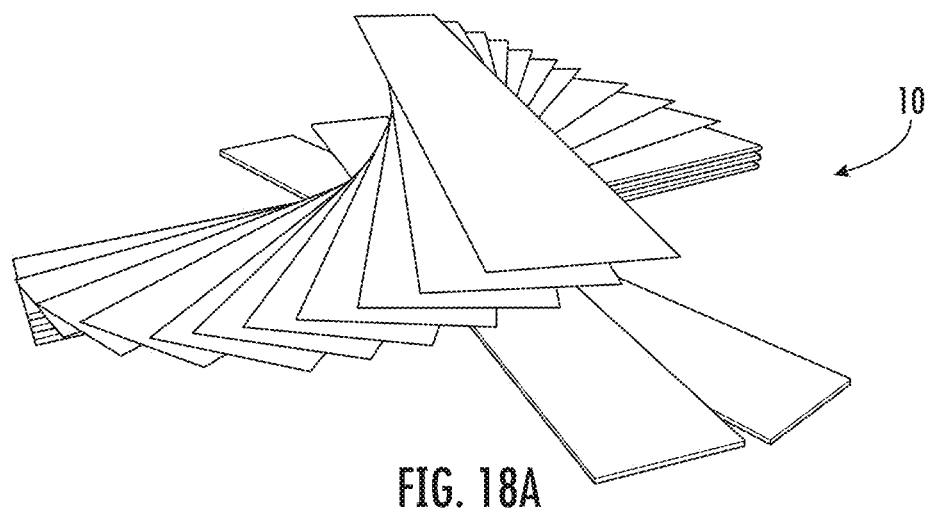
Figure 18B:
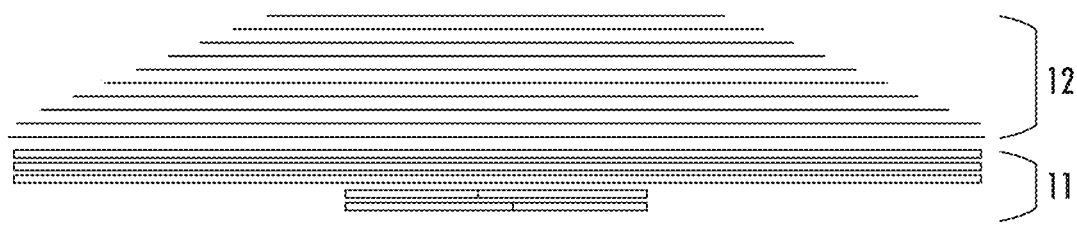
Figure 18C:
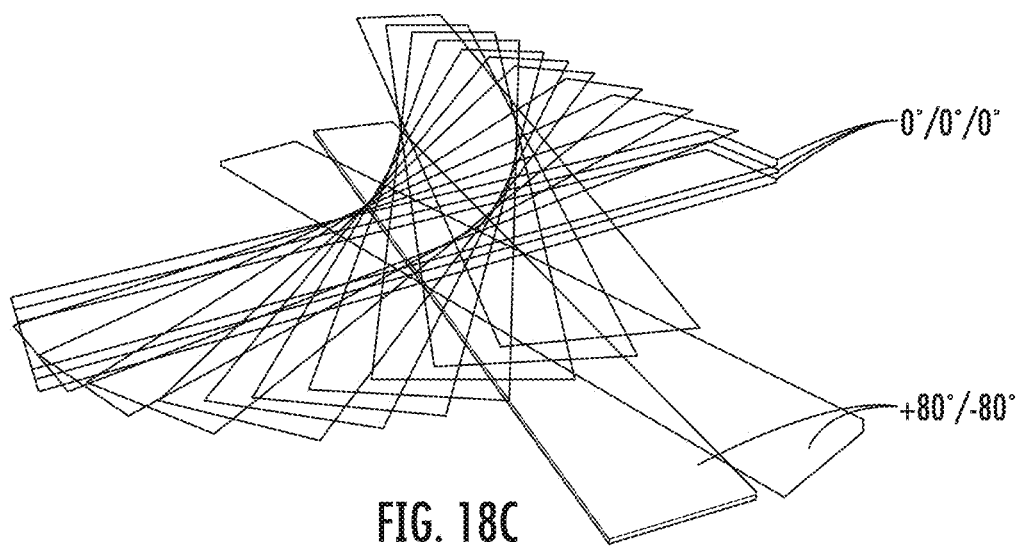

FIGS. 18A-C are schematic views of a structure that includes both impact resistance and load carrying strength according to embodiments of the invention.

FIG. 19 shows a spread tow woven fabric and a light-tow woven fabric.

FIGS. 20A-C show initial crack formation in woven fabric composites according to embodiments of the invention.

Figure 21B:
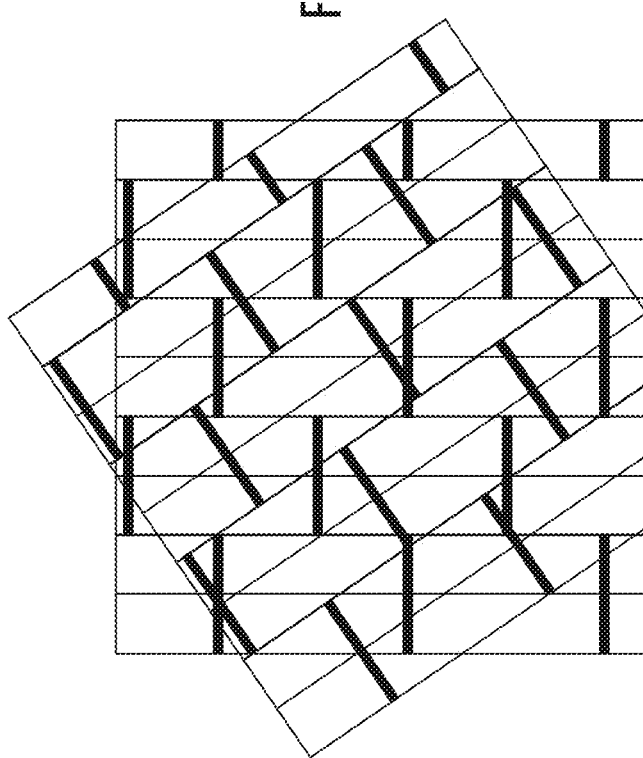
Figure 21C:
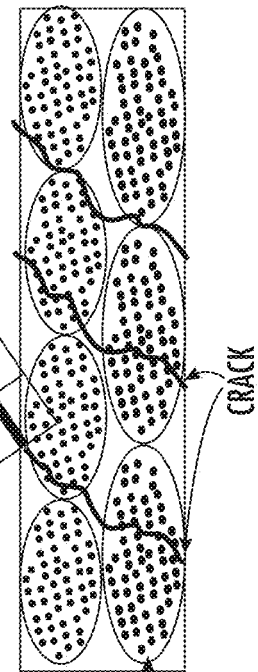
Figure 21A:
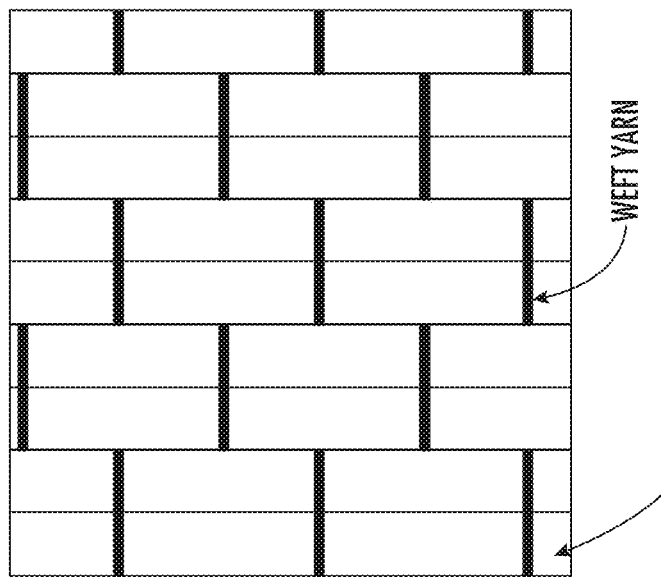

FIGS. 21A-C show QUDW fabric according to embodiments of the invention.

FIGS. 22A-B show QUDW fabrics with different included angles between plies according to embodiments of the invention.

FIG. 23A shows the ply orientations of a helicoidal layup according to embodiments of the invention.

FIG. 23B shows the ply orientations of a conventional thin-ply biaxial layup.

FIG. 24 shows force vs. displacement for various plies and arrangements according to embodiments of the invention.

DETAILED DESCRIPTION

The present inventions now will be described more fully hereinafter with reference the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present disclosure improves upon helicoidal material design and manufacturing approaches by modifying the spiraling pitch and construct beyond the embodiments of the prior art therein broadening and improving the mechanics involved in impact resistance. A helicoidal geometry is shown in FIG. 1. As used herein, the term "helicoidal" refers to a stacking arrangement of plies of fibers wherein the fibers of at least one ply define an orientation direction relative to an orientation direction of the fibers of an adjacent ply and that provide an included angle greater than 0° and less than about 30°. The stacking arrangement may include adjacent plies that define included angles outside of this range, and the stacking arrangement may comprise less than a full rotation of 360°, or may comprise more than one full rotation. The fiber orientation direction of one or more plies may be straight or curved.

The range of novel enhancements set forth herein include helicoidal materials including: (a) nanomaterials, (b) variable pitch and partial spirals, (c) TPUD lay-ups, (d) hybrid materials, (e) curved fibers within a ply, (f) automated fiber or tape or patch placement for 2D or 3D preforms, (g) non-crimped fabrics, (h) 3D woven fabrics, (i) 3D printed materials, and (j) filament wound materials, (l) TPW layups, (m) QUDW layups. These helicoidal materials can be laid up by hand, direct placed with automated machines, and/or pre-assembled in stacks using weaving/braiding/stitching equipment (e.g., non-crimp fabric machines). Additive (e.g., 3D printing) manufacturing techniques can be used to vary and mix material types. For example, polymeric and metallic fibers can be used together that are printed using additive manufacturing techniques in building the helicoidal stack. These enhancements allow for increased composite helicoidal material tailor-ability and extend its potential application to a broader range of product types.

Impact behavior of composite structures is a complex dynamic phenomenon that can involve elastic deformation, matrix resin cracking, fiber breakage and eventually intra-ply and/or inter-ply delamination. Component failure can occur at free edges, areas of concentrated bearing load or at the point of maximum stress induced by a foreign object impact. Impact damage is often worse on the side opposite the strike and can go visually unnoticed, requiring extensive non-destructive inspection (e.g., hand-held ultrasonics). Therefore, impact resistance and damage tolerance are often design limiting criteria. Impact damage can reduce, or limit in-plane load carrying capability and require a product to be removed from usage for repair or if the damage is extensive scrapped and replaced. Numerous material and design approaches have been conceived of to make composite components more impact resistant and/or to limit the extent of impact damage. Generally, these designs are aimed at increasing the laminates' ability to absorb or dissipate strain energy. Unfortunately, most such approaches modify fiber construction and/or incorporate foreign materials that adversely affect other properties like tensile and compression strength. Several of the more common approaches are discussed below:

Resin materials: The molecular structure of matrix resin in a composite consists of a backbone structure (polymer chain) with numerous and varying types of cross-links (i.e., network structures), See FIGS. 2A-B. Traditional thermosets (composites that go through a phase change curing reaction to reach final form) typically possess rigid, highly cross-linked, glassy polymeric structures. This molecular arrangement can make a composite susceptible to matrix cracking and/or delamination when impacted. Traditional approaches to obviate this shortcoming include the following: a) use of a thermoplastic resin (one that melts instead of cures and typically has a higher molecular weight and lower degree of cross-linking and/or is more amorphous than crystalline), (b) toughening of the thermoset resin via network alteration (e.g., lowering monomer functionality, increasing the backbone molecular weight, or incorporation of flexible sub-groups), (c) elastomer toughening by introducing discrete rubber or thermoplastic particles, and (d) interlayer toughening (incorporation of a thin thermoplastic veil, typically 0.001 in) between thermoset plies. Resin toughening is well known and utilized in the industry. Although resin toughening can increase impact resistance it can also adversely affect other physical properties like; glass transition temperature, hot-cold or dry-wet performance, and chemical resistance. Embodiments of the invention may also use vitrimers, which are reprocessable thermoset resins, in addition to or in replacement of nonreprocessable thermoset or thermoplastic resins.

The incorporation of microspheres and micropores into a helicoidal laminate, such as in the fiber structure illustrated in FIG. 3, is used in composite materials. However, in accordance with the present disclosure, it is further contemplated that nanovoids (e.g., formed by a laser or other mechanism) can further be employed to arrest crack propagation during a failure mode. Moreover, it is also possible to provide larger voids than this, as well as voids of varying shape. For example, voids or regions of weakness can be provided with a directional component so as to cause catastrophic failure to occur in a preferred location and/or along a preferred direction. Voids can have any desired average dimension (an average transverse dimension) between, for example, 0.1 nanometers and 500 microns, or any increment therebetween of 0.1 nanometers, or any subrange within that range having an extent between 10 nanometers and 50 microns, such as a subrange of 10 nanometers, 25 nanometers, 50 nanometers, 80 nanometers, 100 nanometers, 150 nanometers, 250 nanometers, 500 nanometers, and so on.

Nanomaterials: Incorporation of nanoparticles [e.g., carbon nanotubes (CNTs) and graphene] or elongated nanofibers, such as in the form fibers having an average diameter less than 100 nm, into a matrix resin which can also be combined with fiber reinforcements can improve mechanical properties and impact resistance over conventional composite laminates of identical thickness. This improvement can sometimes be attributed to whiskering (i.e., nanoscale whiskers interacting with the fibers to improve transverse and intralaminar shear properties).

Fiber materials: Fibers provide a composite with strength and stiffness. Fibers can be continuous or discontinuous, depending on the application and manufacturing process. Fibers can also be tailored (arranged in preferential orientations to suit the given application). Most prevalent in the industry, plies are clocked every 45 degrees using 0, +45, −45, and 90-degree orientations. The type and amount of fiber reinforcement in a composite can be varied for cost, manufacturing and performance reasons. Certain fiber types (i.e., carbon and graphite) are high in specific strength (properties like tensile and compression divided by density), but are inherently brittle while others, like fiberglass, have better impact strength but lower specific strength due to higher density. Aramid (an aromatic polyamide) fibers have excellent toughness and outstanding ballistic and impact resistance, but have reduced performance with temperature fluctuation, are susceptible to ultraviolet light, and tend to absorb moisture. In order to have the option of using a fiber type that provides the best combination of strength and impact properties, a wide variety of known fiber types can be used to make helicoidal structures, such as carbon, fiberglass, aramid, basalt, ultra-high molecular weight polyethylene (UHMWPE), ultra-high molecular weight polypropylene (UHMWPP) (e.g., Innegra®), self-reinforced polymeric fibers (e.g. Pure®, Tegris®, Curv®), natural fibers such as flax or hemp, metallic fibers, quartz fibers, ceramic fibers and recycled fibers of any of these types.

Material forms: Like resin and fiber selection, material form is generally driven by application, cost and manufacturing process. Broadly speaking, material form can include discontinuous or continuous fibers with random or oriented directionality as illustrated in FIGS. 4A and 4B.

Figure 5A:
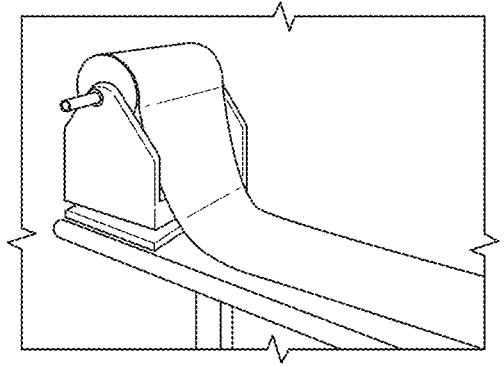
Figure 5B:
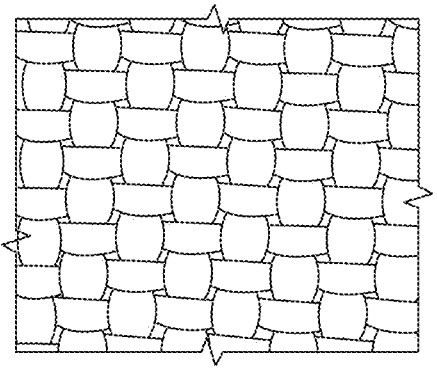
Figure 5C:
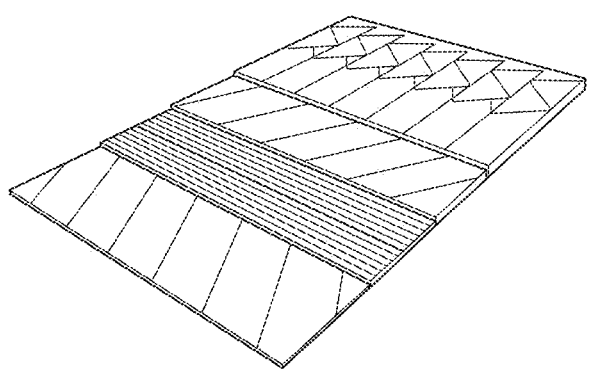
Figure 5D:
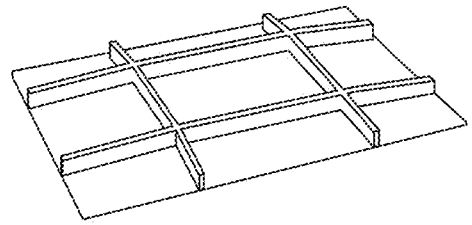
Figure 5E:
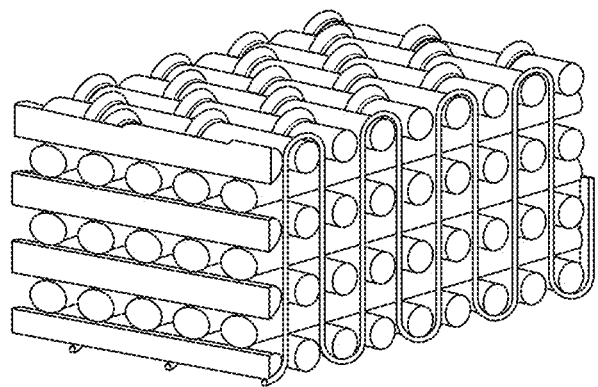
Figure 5F:
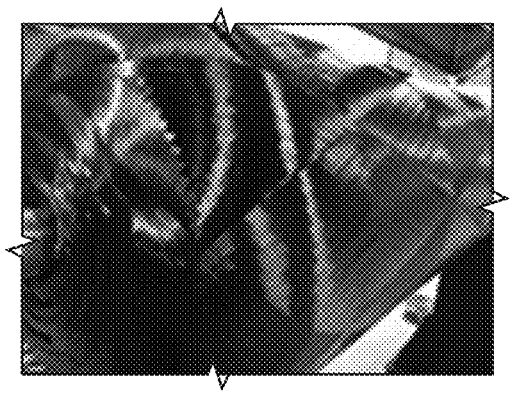
Figure 5G:
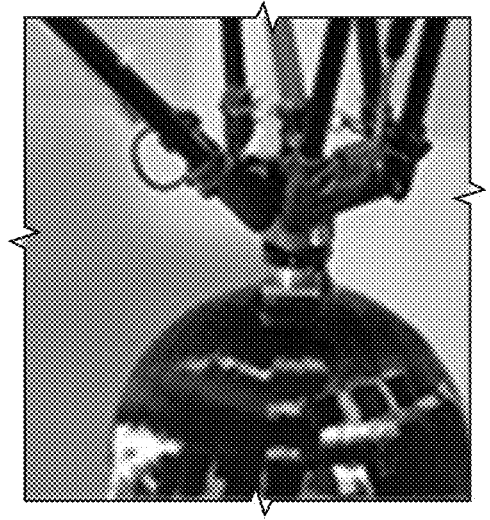
Figure 5H:
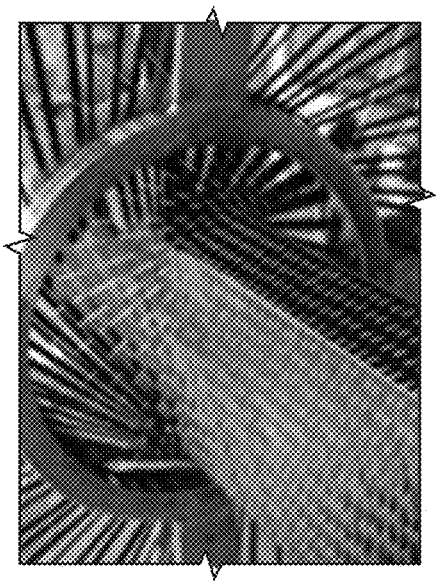

Continuous/oriented fiber forms in general have superior structural properties but are more costly to fabricate requiring manual or specialized methods (automated material placement (AMP) or weaving, braiding, ply stitching, 3D printing or winding equipment) versus plastic injection and compression molding of sheet molding compounds, prevalent with discontinuous fiber form manufacture. Two main categories of continuous material formation are uni-directional (UD) and woven (including 3D weaving & braiding). FIG. 5A illustrates uni-directional manufacturing, and FIG. 5B illustrates a woven structure. FIG. 5C presents an example of non-crimped multi-axial fabric, and FIG. 5D presents a net-shaped preform. FIG. 5E presents a schematic of a 3D woven fabric, FIG. 5F presents an example of filament winding, FIG. 5G presents an example of fiber patch placement, and FIG. 5H presents an example of braiding.

UD tapes in general provide better in-plane structural properties than woven fabrics due to the absence of fiber crimp (fibers being taken in and out of plain during interlacing), see FIG. 6. It will be appreciated that the figures are not necessarily to scale. Weaving can create z-direction fibers and interlocked non-planar fiber bundles that spread point loads and slow or arrest matrix cracking and laminate delamination. But weaving requires large complex machinery, hence the cost can be high and size limited. Further, in-plane properties are typically reduced due to fiber crimping when compared to UD composites. Transverse stitching has been used with UD composites to create z-direction load carrying capability and as a crack arrestor. This approach is expensive and of questionable value since the amount of stitching required to improve impact capability distorts in-plane fibers and reduces core properties like tensile, compression and fatigue strength. The current disclosure extends the helicoidal application/design to include specific materials (most prevalently TPUD tape, TPW and QUDW), as well as glass, carbon, aramid fibers, and the like, as well as novel fiber angle clocking combinations to help to overcome drawbacks and limitations of current impact resistant composite designs, as well as skins in sandwich applications where helicoid layups have never been explored due to the lack of design space to reproduce full helicoidal stacks.

Manufacturing Methods: Several prevalent methods for placing continuous composites material using dry or pre-impregnated fibers include: (a) hand lay-up, (b) automated material placement (AMP which includes continuous fiber placement but also fiber patch placement), and (c) weaving/braiding/ply stitching machines (e.g., multi-axial non-crimp fabric machines where fiber bundles are kept together with a knitting yarn) (d) Filament winding and Pull winding, (e) 3D weaving, (f) 3D printing, (g) heat press consolidation of organosheets. AMP, using either type of fiber (slit tape), has the ability to add and drop material on the fly, clock to any pre-programmed angle, and can therefore be used to place near net-shape stacks. Since helicoidal stacks require tight precise clocking, AMP is an exemplary low-cost method for placing them. Near net shaped 2-dimensional (2D) and 3-dimensional (3D) pre-forms (a mostly dry fiber lay-up that can later be infused with resin) can be made of UD tape or multi-directional tape (in which the plies are held together using a powder binder, inter-ply non-woven veil, and/or stitching). Pre-impregnated tape (typically 1½ in to 24 in wide), slit tape (typical ⅛ in to 1½ in wide), or "towpreg" can also be laid down directly to shape on contoured tooling using AMP equipment (e.g., contoured tape laminating machine (CTLM), automated fiber placement (AFP) or robotic fiber placement (RFP) and subsequently cured in an oven or autoclave).

AFP offers considerable flexibility to produce near net-shape helicoidal preforms with all possible angles and an unlimited number of plies or patches to produce any desired helicoidal preform stacking sequence. These helicoidal materials represent a near net shape to the part. 2D or 3D preform structures can be made of dry fiber or UD Tape or multi-directional tape, forming several plies held together by means of a powder binder, inter-ply non-woven thermoplastic veil, needle or pneumatic air punching, A "towpreg", or any kind of pre-impregnated fiber, UD Tape, multi-directional tape or a slit tape of thermoplastic matrix & fiber can be deposited with a robotic fiber placement head to produce a helicoidal near net shape 2D or 3D preform that can already be impregnated as set forth in FIGS. 7A-7B. FIG. 7A illustrates a helicoidal preform made of straight fiber placement on a 3D curved shape, and FIG. 7B illustrates a helicoidal preform made of curved fiber placement on a 2D shape. Continuous Tow Shearing (CTS) can be used to create in-plane curvilinear fiber orientations.

Industry standard MX fabric machines like those of Karl Mayer GMBH (see, e.g., FIG. 8) allow to manufacture Non-Crimp Fabric (NCF) with one ply per adjustable angular directional arm and it is usually limited to 5 plies: a 0 degree ply defined as the winding direction of the roll+4 off-axis plies having angles superior to 20 degree to limit the length of shallow angle directional arms and avoid slowing down machine output. Plies are usually stitched together but can be linked together by means of a powder binder or an interply non-woven thermoplastic veil that is slightly melted.

This technique is well-suited to mass production of Helicoidal Multiaxial (HMX) fabric rolls (e.g., [0°, 22.5°, 45°, 67.5°, 90°] or [80°, 60°, 40°, 20°, 0] or [39.4°, 28.2°, 16.9°, 5.6°]) But, it can be even more cost effective to produce a larger number of helicoidal plies by way of using additional adjustable arms and/or by producing several rolls separately then assembling their layers to form a helicoidal sequence of a larger number of plies. In one illustrative example, a roll of 5 helicoid plies forming a Helicoidal Multiaxial (HMX) fabric [0°, 22.5°, 45°, 67.5°, 90°] can be produced. This roll can then be folded around its 0° axis dividing its width by 2 or simply combined with another same roll flipped over to form a 10-plies HMX: [−90°, −67.5°, −45°, −22.5°, 0°, 0°, 22.5°, 45°, 67.5°, 90°]. In another example a first helicoidal MX fabric (e.g., [56°, 79°, −79°, −56°]) can be taken off a large continuous roll and rotated 90° (e.g., [−34°, −11°, 11°, 34°]) and placed on top of one another to create a 8-plies HMX fabric (e.g., 22° HMX with 8 plies [56°, 79°, −79°, −56°, −34°, −11°, 11°, 34°]). As with the individual plies, two HMX stacks can be joined using stitching or powder binder or heat laminated thermoplastic non-woven veil or any other suitable known technics such as air punch or needle punch.

This is an efficient and innovative way to offer an HMX embedding eight or more helicoid plies in a single HMX fabric roll to overcome machine limitations as commonly found in the composites industry. Such an HMX roll can then be pre-impregnated.

Hybrid construction: Composite components have been made that incorporate non-polymer and/or sandwich materials that can improve properties like bearing, stiffness and impact resistance. Examples of hybrid designs are provided below:

Metals: Composites typically have limited elastic capability to dissipate energy and therefore fail catastrophically when loaded beyond their ultimate capability. Alternatively, metals can deform plastically to dissipate impact energy. Metal foils, meshes and fibers (e.g., aluminum, titanium and steel) can be selectively incorporated into a laminate to provide fracture toughness, increased resistance to impact, lightning strike protection, and reduced surface erosion, see FIG. 9. Shape Memory Alloys (SMA) may be incorporated to provide impact resistance. Typical fiber metal laminate (FML) forms in use in industry include: ARALL (aramid/aluminum), GLARE (fiberglass/aluminum), CARALL (carbon/aluminum), and TiGr (titanium/graphite). Incorporation of metals typically requires a bond operation that adds weight (in the form of additional adhesive), is expensive, and requires hazardous, metal surface preparation techniques (e.g., vapor degreasing, alkaline cleaning and etching or anodizing). Additional metal/composite hybrid drawbacks include: (a) metals may have non-compatible coefficients of thermal expansion (CTE's) when incorporated into polymer-based composites, (b) metal foils, meshes and fibers are difficult to place to complex contours, and (c) metals are denser than the composite material they are displacing.

Sandwich structures: Placing a material including, for example a polymer layer on a honeycomb core or foam material between composite laminate face sheets, as shown in FIGS. 10A and 10B, creates a synergistic structural configuration in which the face sheets provide bending stiffness and the sandwich material provide shear rigidity and buckling resistance. Compared to monolithic laminate composites, sandwich panels can exhibit improved strength-to-weight ratios, sound deadening, fatigue capability, thermal insulation, and impact/damage resistance. Sandwich panel impact performance can be superior to laminates since some of the energy associated with a strike may dissipate as elastic deformation instead of matrix and/or fiber damage and/or the core may cushion inertial loads while the face sheet performs the energy absorption. Laminate face sheet configuration, core type/structural properties and boundary conditions control the impact behavior. Typically, in sandwich designs the face sheets are relatively thin and the core is bonded to the face sheets with an adhesive. Structural and failure mechanisms that make sandwich inappropriate for some applications include the following: a) because of limited bond area and strength the face sheets may prematurely separate from the core during impact, b) since the face sheets are thin relative to an equivalent laminate design fiber breakage, fiber matrix de-bonding and laminate delamination can initiate at lower impact levels, c) the core can crush or experience shear deformation and d) replacing laminate plies with sandwich material can degrade in-plane structural properties like compression, tension, strength and stiffness.

Thin ply: Composite laminates made from TPUD stacks have been shown to exhibit better mechanical properties and improved resistance to micro-cracking, delamination, and impact when compared to same thickness parts made using thicker plies. Typically, aerospace UD carbon/epoxy (C/E) pre-pregs are grade 190 (0.0073 in/ply) or grade 145 (0.0056 in/ply). TPUD is typically grade 75 (0.003 in/ply) or thinner. The grade specifies the nominal areal weight of carbon fiber in UD pre-preg measured in $g/m^2$. TPUD laminates allow for reduced minimum gauge and/or lighter weight equivalent performance structures. To avoid warping during cure cooldown, conventional lay-ups require ply stacks to be balanced (i.e., the laminate must have the same number of plus and minus orientation plies) and symmetric [i.e., each ply above the midplane of the lay-up must have an identical ply (same material, thickness, and orientation) at equal distance below the midplane].

Fiber orientation controls load carrying capability. Therefore, it is best to run the bulk of the fibers in the direction of primary loading. Balance/symmetry rules along with rules for minimum orientation to protect from unexpected loads (e.g., no less than 10% of the fibers in any one direction) limit stacking freedom and often dictate a lay-up thicker than that needed expressively to take a given load case. These constraints are particularly challenging when tapering (dropping plies) in part areas of reduced loading.

TPUD plies as a whole or in combination with normal thickness plies open lighter/thinner stacking options. Unfortunately, TPUD can be harder and more costly to pre-preg slit and re-roll and can suffer from more defects and be harder and/or more costly to lay down to a part shape using automated fiber placement equipment than traditional thicknesses pre-preg tape and therefore has seen limited usage in aerospace applications to date. In other applications, TPUD tape takes more time to lay down to part shape than traditional thickness pre-preg tape due to the higher number of plies being placed.

Depending on the environment, composite structures can be subjected to low and/or high velocity impacts from planned strikes, collisions, hail, rain, birds, tool drop, ballistics, random debris, shock waves, lightning strike or aero fluttering. A fiber reinforced elastic composite ply stacking approach in which the individual layers are rotated along the longitudinal or x-direction axis at a predefined angle relative to the adjacent layers so as to create a z-direction helicoidal fiber-oriented stack is depicted in FIG. 11. The left-hand image uses a single line to represent each ply layer (lamina), this view highlights the generated z direction helicoidal spiral. The right-hand image uses fiber bundles (tows typically consisting of 3000 to 50,000 fibers or more) to more realistically show the construction layers of a helicoidal lay-up. The subsequent blow ups show how the helicoidal laminate stack is formed of individual laminae layers that are formed of evenly dispersed spread fiber tow and resin.

Helicoidal clocking can be chosen to create a specific spiraling pitch or circular polarization z orientation fibers that are in close enough proximity as to exhibit significant intralaminar-like direct load sharing between laminate fibers. These left and right-handed chirality (a non-superimposable structure distinguishable from its mirror image) spirals are novel when compared to industry standard 0°, ±45°, 90° composite laminates (note: in some cases 22.5°, 30°, and 60° angles are used but in these cases large clocking angles and symmetry/balance rules are still typical). When stacking widely angular disparate 0°, ±45°, 90° laminae, a resin rich layer results between each ply in which load sharing between fibers rely on interlaminar shear through the matrix resin, see FIG. 12. For example, with traditional lay-up clocking, if two adjacent plies vary by 90 degrees and the individual fibers have a diameter of 0.0003 in (typical in the industry), the overlap/direct contact between adjacent interlaminar fibers is 9×10-8 $in^2$ And if the fibers vary by 45 degrees they only have only 0.000424 in of direct contact, see FIG. 13. Both such contact areas are insignificant and necessitate that most interlaminar load transfer is through resin shear. Conversely, in a helicoidal lay-up much larger contact areas result: (a) 30 degrees—0.0006 in (b) 22.5 degrees—0.000784 in, (c) 15 degrees—0.00116 in and (d) 5 degrees—0.00344 in. These helicoidal values (1.5 to 10 times greater than standard 0°, ±45°, 90° lay-ups) are significant enough for direct fiber load sharing to occur.

The ability of the fibers to load share directly between laminae plies is a significant contributor to a helicoidal laminate's ability to absorb and dissipate impact forces more efficiently than conventional composite lay-ups and minimize the effects of impact fatigue. Further, the spiral formed from the assembly of these pitched fibers can be tuned to a specific wavelength to dampen propagating shock waves initiated by ballistics, strike forces or foreign material impacts; can be filled with a matrix that contains microspheres or toughening particles to further prevent or arrest propagation of catastrophic fractures and can be made to exploit the difference in elastic moduli between the fibers and resin to further arrest fractures generated from blunt or sharp impacts.

The dynamic performance of a composite structure under load when subject to impact or shockwave is complex and difficult to predict even when using dynamic state-of-the art fine-grid finite element analysis (FEA). The extent of plastic deformation, matrix cracking, fiber breakage and ultimately delamination due to foreign object impact (planned or unplanned) can only be ascertained with any degree of certainty through controlled structural test and post-failure evaluation. The current disclosure details additional design and manufacturing options that extend the scope and capabilities of helicoidal stacks to a broader range of industrial applications (e.g., wind turbine blades, cryogenic tanks, hydrogen pressure vessels, aerospace primary structures, sporting goods, automotive components, consumer products, defense/space vehicles, soft or hard armor, construction materials, and other composite products). Certain disclosed enhancements include helicoidal materials containing: (a) nanomaterials, (b) variable pitch and partial spirals, (c) TPUD plies, (d) hybrid materials, (e) curved fiber within a ply, (f) automated fiber or tape or patch placement for 2D or 3D preforms, (g) non-crimped fabrics, (h) 3D woven fabrics, (i) 3D printed materials, and (j) filament wound parts, (l) TPW layups, (m) QUDW layups. Dry and/or pre-preg helicoidal lay-ups can be placed ply-by-ply by hand, direct placed on contoured tools with automated fiber placement machines, and/or pre-knitted in stacks using weaving/braiding/UD plies and woven fabric stitching equipment (e.g., non-crimp fabric machines).

Helicoidal materials containing nanomaterials: Nanomaterials are property enhancing particles having dimensions in the 1 and 1000 nanometers ($10^{-9}$ meter) range. Examples include carbon nanofibers (CNFs), carbon nanotubes (CNTs), single-wall nanotubes (SWNTs), multi-wall nanotubes (MWNTs), graphite platelets/graphene, organic spherical particles; copolymers, inorganic clays; silica, silicon carbide, alumina, metal oxides, and other known or yet to be evolved nano materials. Incorporation of nanomaterials into a resin in combination with fiber reinforcements has been shown to improve mechanical properties and impact resistance over conventional composite laminates of identical thickness. In some implementations, nanofibers (fibers having a diameter less than 100 nm) can be incorporated into the material.

FIGS. 14A-C show different types of impact damage (i.e., deformation, intralaminar resin cracking, interlaminar resin cracking, fiber breakage and delamination) arising from different impact levels (i.e., low, medium, and high). With nanomaterials, impact improvement can be attributed to whiskering (i.e., nanoscale bridging between fibers that improves transverse and intralaminar shear properties). FIGS. 15A-C show how nanoscale bridging (also known as stitching) is particularly effective between fibers of the same or similar orientation (i.e., same orientation intralaminar fibers or close orientation interlaminar fibers like the 5-degree helicoidal example shown in FIG. 13). In such cases, nanomaterials can reduce or even eliminate resin cracks arising from low and medium level impacts. Since helicoidal lay-ups' plies are clocked at shallow angles (e.g. 5 to 30 degrees), the direct contact length between individual interlaminar fibers is up to 10 times greater than with standard 0°, ±45°, 90° lay-ups. This longer contact length makes nanocomposite additives more effective on helicoidal lay-ups than industry standard lay-ups that are separated by angles of 45 or 90 degrees. Helicoidal lay-ups with nano additives can exhibit not only reduced/eliminated intralaminar vertical/horizontal resin cracking but also reduced/eliminated horizontal interlaminar resin cracking and even delamination (total ply separation) arrest, as shown in the FIG. 14B under medium impact. Nanomaterials can be added uniformly into the resin during pre-pregging, attached directly to the fibers or added as an interlaminar layer between ply stacks.

Variable pitch and partial helicoidal structures: The pitch of a helicoidal lay-up depends on the per ply laminae thickness and the angle the plies are clocked/stacked at. The resultant spiral can be tuned to a specific wavelength or strength in anticipation of expected impact type/level and/or required strength. To avoid warping during cure cooldown, conventional lay-ups (those using 0°, ±45°, 90° plies) require ply stacks to be balanced and symmetric. Certain prior art acknowledges that a helicoidal lay-up can be left hand, right hand or both direction spiraled. As originally envisioned, a helicoidal stack contains consistent angular offset throughout the entire lay-up. An example of a balanced and symmetric 18 degree offset helicoidal lay-up is (0°, 18°, 36°, 54°, 72°, 90°, −72°, −54°, −36°, −18°, 0°, −18°, −36°, −54°, −72° 90°, 72°, 54°, 36°, 18°, 0°). Because of shallow clocking angles (e.g. 30 degrees or less) helicoidal lay-ups have less propensity to warp than industry standard 0°, ±45°, 90° lay-ups, even when not balanced and/or symmetric. This ability to make non-standard helicoidal lay-ups allows for unique thinner laminate options that can be further tuned for specific applications. The current disclosure describes the additional helicoidal clocking options:

1. Lay-ups with variable clocking angles in a single laminate such as 5, 10, 15 and 30 degrees. One example would be (0°, 5°, 15°, 30, 45°, 75°, −75°, −45°, 30 −15°, −5°, 0°). This type of lay-up is good for tuning over variable wavelengths, arresting/dissipating impact forces at a zone/depth in the lay-up and/or balancing between impact capability and overall laminate strength.
2. Lay-ups with tight clocking on the (a) exterior, (b) middle, or (c) middle and exterior of the lay-up and broader clocking on the remainder of the lay-up. (0°, 5°, 10°, 15°, 45°, 75°, −75°, −45°, −15°, −10°, −5°, 0°), is an example of a lay-up with tight clocking on the middle and exterior surfaces of the laminate. This type of lay-up is good for dissipating impact loads within a certain thickness of the laminate while still allowing the freedom to tailor the orientation of other plies for strength in the load bearing direction.

3. Non-symmetric and/or non-balanced lay-ups that are only left or right hand spiraled such as: (0°, 30°, 60°, 90°, −60°, −30°, 0°) and (0°, −30°, −60°, 90°, 60°, 30°, 0°). These lay-ups allow one to take advantage of helicoidal clocking, hence impact capability, without having to make a thick balanced/symmetric lay-up. Because tighter helicoidal clocking angles are used (not the traditional 0°, ±45°, 90°), such lay-ups have less propensity to warp. Further, the tendency to warp can often be overcome by part shape or local stiffening.

4. Lay-ups that are only partially spiraled and do not clock through a full 360 degree, such as: (0°, 5°, 10°, 15°, 90°, 90°, 15°, 10°, 5°, 0°) or (−35°, −25°, −15°, −5°, 5°, 15°, 25°, 35°). Such lay-ups can isolate the impact benefit of the helicoidal arrangement in certain laminate zones while optimizing load carrying fibers in other zones. This clocking can be directional as to anticipate the nature and direction of impacts in service.

TPUD helicoidal materials: Industry typical UD carbon/epoxy (C/E) pre-preg grades include; 190 (0.0073 in/ply) and 145 (0.0056 in/ply). Thin ply pre-preg is typically grade 60 (0.0023 in/ply) or thinner. FIG. 16 depicts how helicoidal ply thickness and clocking creates stair step spirals of various height and width. For example, a grade 145 UD helicoidal lay-up would have ~15 to 20 carbon fibers stacked on top of each other per ply for a vertical step of 0.0056 in. For a clocking angle of ~$\beta$=5°, and using a standardized offset a=0.064 in., a horizontal step is calculated as b=0.0056 in., therein creating a roughly 1 to 1 (1:1) spiral. This 1:1 tightly clocked spiral with short interlaminar resin shear zone and substantial fiber to fiber direct contact is at the heart of helicoidal lay-ups' impact resistant, crack arresting and interlaminar load sharing between capabilities. A grade 190 (0.0073 in/ply) helicoidal lay-up with the same 5° clocking would have a roughly 2:1 stairstep. A typical grade 145 industry standard lay-up with 45° clocking would have a 0.056 in vertical resin step and therein a relatively long 1:10 spiral. This long resin shear zone, when compared to a helicoidal lay-up, limits interlaminar direct fiber load sharing and, in some instances, can account for reduced impact resistance. 90° clocking creates an interlaminar step of infinity (i.e., an undisturbed interlaminar resin zone).

In sum, and with continuing reference to FIG. 16, it can be noted that the tighter the "spiral stairstep" the better the potential impact resistance, all other criteria being similar. However, very shallow angles within the 1° to 5° range can be expected to promote a dominant failure mechanism described as spiraling matrix cracks while larger shallow angles in the 15° to 30° range can be expected to promote a dominant failure mechanism described as intra and inter ply delamination and fiber breakage. Applicant appreciates that there is a preferred range spot of angular values for a given fiber type and ply thickness where both of the aforementioned failure mechanisms co-operate to maximize the impact energy dissipation and impact strength. This preferred range, and any optimum value, within that range, can depend on a number of variables including resin properties, fiber properties, tow size, and interlaminar resin thickness in addition to the clocking angles of the fiber layers. TPUD lay-ups have been shown to have improved strength and impact capability when compared to similar thickness traditional lay-ups.

As a new embodiment described by this disclosure, a TPUD grade 60 (0.0023 in/ply) helicoidal lay-up with 5° clocking would create an exemplary ½:1 stairstep. Such a pre-preg clocking arrangement has been shown to have up to a 50% impact improvement versus traditional (thickness and clocking) lay-ups. In addition, thin ply lay-ups have been shown to have up to a 30% strength improvement when compared to traditional lay-up of similar total thickness and orientation. Further, it should be noted that with small clocking angles the adjacent plies are still divergent enough as to help arrest intralaminar vertical resin cracks. Conversely, when stacking two or more plies of identical orientation it has been found that intralaminar cracks spread relatively easily from one ply into the next. Resin intralaminar micro-cracking can also occur in extreme cold (e.g., −200° F. to −415° F.) environments (e.g., space and cryogenic tanks). In accordance with the present disclosure, improved impact and microcrack arresting results can be expected for any of the helicoidal structures previously known if constructed with TPUD pre-preg. Microcrack arrestment will not only help maintain load carrying capability, but it will also reduce permeation of liquids and/or gases in containment vessels. The following TPUD variants are exceptional embodiments of the art:

1. TPUD helicoidal stacks exhibit improved strength, impact and interlaminar microcrack arresting versus standard ply thickness traditional clocking lay-ups. These capabilities can be attributed to tighter aspect ratio spiraling and therein improved interlaminar load sharing.

2. TPUD helicoidal stacks of continuously clocked spirals have strength as good or better than highly oriented traditional stacks (extra plies in the primary load carrying direction) while having improved impact characteristics. This is attributable to the fact that although the helicoidal lay-up may have fewer total fibers in the primary load direction, the thinner plies and slightly clocked off-angle fibers promote efficient interlaminar load sharing. Additionally, since identical angle fibers are not being stacked directly on top of each other in the helicoidal stack, there is less of a propensity for vertical resin microcracks to propagate between laminae during high loading and/or impact events and/or in cold weather environments. Microcrack arrestment will not only help maintain load carrying capability, but it will also reduce permeation of liquids and/or gases in containment vessels.

3. TPUD helicoidal stacks of less total thickness may have similar or better impact strength than thicker traditional laminates. Therein, it is possible to make thinner and lighter laminates when using TPUD helicoidal stacks than when using industry non-helicoidal standard balanced, symmetric, and minimum direction orientation laminates.

4. Thinner minimum gauge TPUD helicoidal stacks can possess desired properties while adhering to tradition lay-up symmetry, balance and minimum orientation rules. For example, an aircraft skin may require 8-plies of grade 190 UD tape or 0.058 in total thickness for hail strike when using standard 0°, ±45°, 90° lay-ups rules, (0°, +45°, −45°, 90°, 90°, −45°, +45°, 0°). But for the same application a TPUD helicoidal lay-up (one using plies of 0.0023 in or less) might meet impact requirements and lay-up rules using a 16-ply 0.037 in laminate.

5. Helicoidal stacks can combine TPUD and thick plies to create uniquely tuned and strength/impact laminates that are superior to traditional lay-ups. One drawback of TPUD is that it may require more time to lay-up a laminate when compared to a thick ply material part because more layers are needed. This drawback can partially be obviated by using a combination of thin and thick plies. In the exemplary case suggested by this disclosure, thin helicoidal plies can be used for a portion of the lay-up to tune the lay-up and increase overall impact capability, while thick plies can be used to reduce lay-up time and create overall strength. In one preferred example, helicoidal plies could be used near the outer surface of the laminate to improve impact strength and thick plies on the remainder or middle of the lay-up as the primary load carrying mechanism. For example, in the example of a wind turbine blade, it is possible to have a thick inner layer that uses unidirectional fibers, and this can be wrapped, or encapsulated, within a layer of helicoidal material. By way of a further example, helicoidal material can be used on an inner layer of a pressure vessel to prevent cracks from propagating to an outer layer of the pressure vessel. If desired, a helicoidal material can be used for an intermediate or outer layer of a pressure vessel in addition to or instead of an inner layer of the pressure vessel.

An example of this can be seen in FIGS. 18A-C, which show schematic views of a ply arrangement for a fiber-reinforced composite structure 10 according to embodiments of the invention. FIG. 18B represents a cross section of the structure shown in perspective in FIGS. 18A and 18C. The composite structure 10 has a first plurality of plies 11 of reinforcing fibers defining a first region of the fiber reinforced composite structure, the plies comprising parallel fibers, and wherein the plies are arranged to provide load-carrying strength for the reinforced composite structure. In the example shown, the first plurality 11 includes five plies. The two plies at the bottom are arranged at +80°/−80°, and the three plies above those are both arranged at 0°. In this example, the 0° plies are arranged along the axis of an axisymmetric part, such as a tubular structure, and provide strength in the direction of primary loading. The +80°/−80° plies serve to reinforce the 0° plies and resist buckling of the axisymmetric part, such as might be advantageous in long, thin tubular structures.

A second plurality of plies of reinforcing fibers 12 define a second region of the fiber reinforced composite structure and are arranged in a helicoidal relationship, and wherein an included angle between the orientation directions of at least two adjacent plies is more than 0° and less than about 30° to provide impact resistance for the reinforced composite structure. In the illustrated example, the plies (starting from the top and working down) are arranged at 70°, 65°, 60°, 55°, 50°, 45°, 40°, 30°, 20°, and 10°. As described elsewhere herein, this helicoidal relationship provides impact resistance to the underlying structure.

A third plurality of plies of reinforcing fibers may be positioned opposite the second plurality of plies of reinforcing fibers so as to provide impact resistance to both sides of the first plurality positioned in the middle of the second and third plies. Although shown with TPUD plies for the second plurality of helicoidal plies and thick plies for the other plies, which provides advantages in terms of impact resistance, primary load carrying ability and reduced lay-up time, the thickness of the plies could be the same for each of the plies.

6. TPUD helicoidal stacks can be made with variable clocking to create uniquely tuned laminates that still possess strength and impact properties that are superior to traditional lay-ups. For example, instead of using a standard clocking of 45 and 90 degrees, as is typical in industry, or using a consistent 5-degree clocking, as can be done on a basic helicoidal lay-up, one could create a helicoidal lay-up where the clocking shifts a few degrees with each subsequent lamina. The resultant laminate could therein possess a predetermined pitch and tuning that uniquely meets the demands of the products environment (as an example thermal, impact, and strength requirements) while minimizing part weight.

7. Helicoidal arrangements created using tight clocking and thin plies have been shown to have less of a propensity to warp than traditional lay-ups using standard clocking and standard ply thicknesses. Further, what warpage does remain in a TPUD non-symmetric/non-balanced stack can often be overcome by part shape or local stiffening effects. Therein, left hand only and right hand only TPUD helicoidal lay-ups allow for helicoidal TPUD lay-ups to contain exemplary strength and impact properties while having a minimal gauge and the lowest possible weight.

8. Combined TPUD and thick ply helicoidal stacks can be made with variable clocking to create uniquely tuned and strength/impact capable laminates that are superior to traditional lay-ups. Therein, thin and thick plies can be used to minimize lay-up cost and optimize strength/spiral tuning capabilities while variable clocking pitch can be used to maximize properties to a further degree or of a different nature. For example, the thin and thick ply selection can be driven primarily from a lay-up cost standpoint while the variable clocking can be chosen to arrest vertical intralaminar resin microcracking. Other combinations of cost to strength, cost to impact resistance, and cost to weight tuning to improve cost-performance can be envisioned.

One of the primary benefits of composite components is that they can be tailored by adding and dropping plies, therein increasing strength and impact resistance in areas of higher loading while maintaining minimal thickness and weight in other areas. Often parts are padded up around openings in the structure such as fastener locations and conduit pass-throughs and in bond zones to locally stiffen a component and/or improve bearing and/or structural strength like aerospace structural assembly with rivets, or a bicycle rim around spoke attachment points. In other cases, parts are thickened in areas of expected high impact, like the leading edge of a wing or wind turbine blade, golf club, striking area of bats and clubs, protective helmets, etc. In other cases, parts can be made to flex in one area and be stiff in other areas such as is the case with fishing poles, golf clubs, pole vault poles, sailing masts, skis & snowboards, running shoes etc. As another special case described by this disclosure, the pad-up regions of a component can consist of any of the helicoidal variants discussed in this disclosure. This pad-up can be incorporated with a base traditional lay-up or a base helicoidal lay-up of the same or different construction. As detailed in the eight previously listed exemplary cases, TPUD helicoidal laminates allow for reduced minimum gauge and/or lighter weight better or equivalent performing structures. Balance/symmetry rules along with rules for minimum orientation to protect for unexpected loading (e.g., no less than 10% of the fibers in any one direction) that limit stacking freedom and often dictate lay-ups thicker than needed expressively to take a given load case can be used more sparingly or in some cases ignored with TPUD helicoidal layups.

Hybrid material helicoidal structures: Helicoidal laminates including nanomaterials, variable pitch and partial spirals, and TPUD can be combined with hybrid materials (e.g., woven composites, non-polymers, metals, foams, sandwich materials, and/or other materials known or to be evolved in the industry) to improve properties like overall weight, fabrication cost, bearing, stiffness and impact resistance. These combinations can be done globally (e.g., nanomaterial combined throughout a matrix resin) or judiciously (e.g., a layer of titanium foil replacing four plies of traditional thickness pre-preg in a thin-thick helicoidal spiral) so as to dial in specific strength and impact characteristics while minimizing cost, weight and/or thickness. Specific exemplary examples of hybrid helicoidal structures are listed below:

1. A helicoidal structure with woven fabric composites plies distributed in the stack or on the inner and outer surfaces can be created with unique clocking arrangements chosen to improve impact capability. Woven plies can be useful on the inner and outer surface to minimize fiber breakout when drilling or trimming and can improve erosion and impact capability. Within the lay-up, fabric can be used to create unique clocking/spiraling and tuning combinations that help absorb and dissipate impact forces and minimize the effects of impact fatigue. Fabric plies can also contain metal foils, fibers or meshes to help dissipate lightning strikes, transmit current, shield electrical components or change thermal conductivity.
2. A helicoidal structure with metal foil on the inner and outer surfaces can be created to improve erosion and impact capability. Therein, the metal foil can obviate bearing failure, reduce or delay erosion, and/or yield under impact while allowing the helicoidal structure to remain intact for further impact resistance and load carrying.
3. Placing a layer of dampening foam or sandwich material in the center of a helicoidal stack can be done to increase shear rigidity, cushion inertial loads, dissipate strike energy, and/or improve buckling resistance. Such construction can improve component strength-to-weight ratios, sound deadening, fatigue capability, thermal insulation, and impact/damage resistance.
4. Using helicoidal TPUD skins in a sandwich construction replacing traditional skin structures made of Biaxial (e.g., [+x°/−x°]), Tri-axial (e.g., [0°, +x°, −x°]) or Quadriaxial (i.e., [0°, ±45°, 90°]), or Woven Fabric allows for the improvement of through-thickness impact strength of the skin and to delay skin buckling under in-plane compression. This results from smaller interply angles and a larger number of plies which leads to weight savings. In such a structure the helicoidal stacking delivers higher through-thickness impact strength and complements and counterbalances weaknesses typical of thin ply laminates in out-of-plane strength. Thus, helicoidal stacking of thin plies permits improvement of in-plane properties of thin plies for increased weight reduction.
5. Nanomaterials can be incorporated into a matrix resin to improve the bond between helicoidal plies themselves and hybrid materials (e.g., metals and sandwich) and therein improve interlaminar strength and properties relying on such (e.g., strength shear, bending tensile, compression and impact).

For sandwich structures, the use of face sheets or skins in combination with a core can provide the advantages noted above. However, the conventional wisdom in the field of composites is to form composite layups that are both balanced and symmetric. This in turn leads to skins that have a relatively large minimum thickness in order to accommodate all of the ply layers needed to provide the balance and symmetry. It is known to use unbalanced layups for certain applications, but these are limited in terms of impact resistance. Embodiments of the invention herein provide a composite skin sandwich structure with impact resistance wherein at least one of the skins comprises a plurality of plies of reinforcing fibers arranged in a helicoidal relationship, which are not necessarily balanced and/or symmetric.

The thickness or weight of a skin can relate to the ultimate intended application for the sandwich structure. For example, according to embodiments of the invention, a skin has a total fabric fiber areal weight of lower than about 1,600 gsm. This weight of fabric may be used for surfboards, for example. As another example according to embodiments of the invention, the skin has a total fabric fiber areal weight of lower than about 5,000 gsm. This weight of fabric may be used for wind turbine blades made from E-glass fibers, for example. According to embodiments, the skin has a thickness of less than about 4 mm. For carbon fibers, the weight of the skin may be lower than about 3,000 gsm according to embodiments. The skin of the composite sandwich structure may have a partially directional (or quasi-isotropic) strength profile and with improved impact resistance.

In addition, the helicoidal arrangement of the skin has superior in-plane compression resistance. For conventional multiaxial laminated skins of sandwich structures under compression, the off-axis plies (i.e. plies which fiber direction is not aligned along the loading direction) usually are the first one to fail with the formation of matrix cracks. These matrix cracks often begin in a direction parallel to the off-axis plies such that they are aligned within and/or adjacent to the tows of an off-axis ply. From there, the matrix cracks propagate into interface damage between plies, which causes delamination, and can lead to early catastrophic failure. This is particularly evident in conventional skins with off-axis plies oriented along medium to large orientations, e.g. ±30°, ±45° and ±60° and 90° orientations.

The presence of a helicoidal fiber arrangement provides a better load redistribution along the off-axis plies, making it more difficult for a crack to form and propagate. This is due to one or both of at least two reasons. First, a helicoidal fiber arrangement typically has fewer off-axis plies and/or off-axis plies positioned at smaller angles relative to the reference direction (0°) as compared to conventional skins and thus providing fewer sites for matrix cracks to initiate.

Second, the propagation of interlaminar cracks at the interface between two plies is determined at least in part by the interlaminar shear stress, which in turn is driven at least in part by the difference in directional elasticity from one ply to the next. A larger change in elasticity from one ply to the next along a common reference direction is more likely to lead to interlaminar matrix cracks. The smooth transition in fiber orientation between adjacent plies in helicoid structures reduces the difference in elasticity from one ply to the next (relative to conventional skins), which in turn reduces the interlaminar stresses at the interface between plies and delays crack propagation and delamination under an increasing compressive load. These delaminations can lead to local decrease in the stiffness of the skin which can result in early buckling of the skins. Hence, for helicoid fiber arrangements, even in the occurrence of a matrix crack in the off-axis plies, the formation of delaminations would be delayed, leading to better compression strength.

The in-plane compression resistance of a helicoidal skin is especially advantageous in sandwich structures because the bending or flexural resistance (as determined by the industry-known three-point bending test) of composite structures is often limited by the skin of the sandwich that is subjected to the compressive load (as opposed to an opposite skin that is subjected to the tensile load).

According to embodiments of the invention, the sandwich structure can have a three-layer construction with two helicoidal skins and a core material therebetween. However, embodiments of the invention also include three-layer constructions where only one of the skins is a helicoidal skin, and an opposing skin can comprise, for example, a conventional composite material. Such a construction is well adapted to design environments where the sandwich structure will be subjected to bending forces in only one direction, and/or where only one surface of the sandwich structure will be expected to receive impact forces. Similarly, the core may comprise more than one layer of material and/or be formed of more than one type of core material. Additional layers of composite material may also be included to provide stiffening or other structural properties.

Curved fibers within a ply can be created using traditional or robotic fiber placement equipment. In this case, relatively narrow strips of slit tape or tow (e.g. ¼ in) can be arranged side-by-side into a wider band (e.g., 4 in) and placed simultaneously. The placement head can alter heat, placement pressure and angular shear laydown forces in a manner so that the band can be steered in an arc (e.g., 200 mm radius), s-shape or any desired contour instead of the traditional straight line orientation used when placing most composites, see FIG. 17. This curvature can add more degrees of freedom to a helicoidal stack and can be used with any of the alternative designs discussed within this disclosure. In-plane curving within a 2D or 3D shape combined with helicoidal ply stacking can further enhance wavelength tuning and impact capabilities.

Thin-ply woven (TPW) fabrics are an emerging class of high-performance fiber reinforced materials to provide high strength and abrasion resistance. TPW fabrics are typically found in two forms: 1) spread tow fabrics, where a tow is spread into a thin and flat uni-directional tape (with fiber areal weight similar to the ones of TPUD) and then the various tapes are woven to form a fabric; and 2) fabrics made using light tows, as shown in FIG. 19. Light tows are defined herein as tows having 1 k-12 k filaments per tow in the case of carbon filaments and having a weight of less than about 300 tex for glass. Light tow TPW fibers according to embodiments of the invention can also comprise natural fibers (≤320 tex), aramid fibers (≤300 tex), UHMWPE fibers (≤300 tex), polypropylene fibers ((≤200 tex), and other typical fibers commonly used in composites and mixtures thereof.

According to embodiments of the invention, TPW fabrics are laid-up helicoidally and offer superior impact performance compared to conventional thick tows. Helicoidal lay-ups of woven fabrics as used herein (including both TPW and QUDW) refers to helicoidal lay-ups wherein the included angle between two corresponding tow directions of abutting fabric layers are offset by a helicoidal angle. For example, the warp tows of two overlaid woven fabrics can be offset by 5° [so as to define a 0°/5°/ . . . arrangement], and thus the weft tows would be offset by 90° accordingly [in 90°/95°/ . . . directions].

The superior impact performance of helicoidal TPW layups as disclosed herein lies in the ability of sub-critical matrix splits (as caused by an impact) to more progressively grow and nest within the laminate in a spiral cracking pattern. When any woven composite is subjected to an impact, the failure mechanism typically starts with a split in the matrix, which has a lower tensile strength (in isolation) than the fiber material. This split may start at a portion of the matrix between the tows, or it may start through the tow (and parallel to its fiber orientation direction) as shown in FIGS. 20A-C. FIG. 20A shows two layers of conventional woven fabrics with intersecting warp tows and weft tows, FIG. 20B shows two layers of spread tow TPW fabrics, and FIG. 20C shows two layers of light-tow TPW fabrics. In order to progress and further absorb an impact, however, the split will need to cross the fibers of the next tow in the direction of the split. In the case of woven fabrics, this next tow is generally orthogonal to the split tow, and thus the split will need to break the fibers of the next tow (in their tensile direction) as shown for layers 1 and 2 for FIGS. 20A-C.

The translaminar fracture toughness in fiber reinforced composites increases with the ply thickness. However, contrary to what might be expected, the translaminar fracture toughness does not increase linearly with increased ply thickness. As an example, doubling the ply thickness or tow count requires more than double the energy required for the crack to propagate. This is related to the activation of additional energy dissipation mechanisms such as splitting, delamination, kink bands (compression) and fiber pull-outs (tension) that contribute to the energy dissipation process.

If the energy released upon the translaminar fracture of the orthogonal tows is too high for the fracture to arrest at the interface with the adjacent woven layer, this can lead to unstable crack propagation and consequent catastrophic failure. Using TPW fabrics with lower tow count and/or spread tow layers greatly reduces the amount of energy required to break the weft thin-tow/spread tow (on a relative basis) hence allowing the failure mechanisms of helicoidal structures to activate without instability. As an example embodiment, a composite structure having TPW fabric layers stacked in a helicoidal arrangement can exhibit a spiral cracking pattern and thus superior impact resistance as compared to conventional thick ply woven fabric composites that might fail in an unstable fashion. Example uses for TPW fabric composites include sporting goods, automotive/motorsports components (including wings, splitters, diffusers, body panels) and marine components (including hulls, masts, decks). Other example uses include consumer goods, such as suitcases and luggage. Suitcases and luggage made from polypropylene fibers according to embodiments of the invention provide impact protection and toughness at a reasonable cost.

According to embodiments of the invention, Quasi-Uni-Directional Woven (QUDW) fabrics can be provided in standard, thick, and thin woven fabrics and arranged helicoidally to provide enhanced impact performance. QUDW fabrics are highly unbalanced fabrics where more than >80% of the fibers are aligned along the warp direction and the complementary percentage (<20%) is aligned along the weft direction with the function of providing stability and drapability to the fabric as shown in FIGS. 21A-C. The fibers of the weft can be different from the fibers of the warp to maximize the difference in elastic properties with the warp fibers (i.e. load carrying fibers). Such difference in elastic properties could be useful to create a woven fabric that has orthotropic elastic properties similar to the ones of a unidirectional ply where the elastic properties orthogonal to the fiber direction are dominated by the matrix properties. In another embodiment, the fibers along the warp direction (>80%), hence forming the bulk of the fabric, could be made with glass fiber to provide the bulk of the stiffness and strength to the ply using a relatively low-price fiber type. The fibers of the weft tows (<20%) could be made of carbon fiber, which is more expensive but better performing than glass, to provide a stiffening effect to the direction orthogonal to the warp.

The unbalancing of the fabrics and relative spacing between the dispersed weft yarns is advantageous to achieve enhanced impact performance when the QUDW fabrics are arranged helicoidally to achieve the failure mechanisms of helicoid layups according to embodiments of the invention. As explained above with regards to TPW fabrics, a matrix split that forms along the warp can propagate in the neighboring ply-fabric without being halted by a weft yarn crossing over the warp yarn. Hence, fibers are not required to break to allow for the helicoidal crack to form and grow to take advantage of the helicoidal layup failure mechanisms.

As is shown in FIGS. 22A-B, embodiments of the invention include larger included angles for QUDW fabrics. The regions where the weft yarns of two adjacent plies overlap cause a higher resistance to the propagation of helicoidal cracks because the energy required for a crack to propagate helicoidally will require it to break the fibers of the weft yarns. This might lead to unstable catastrophic failure.

By increasing the frequency (decreasing the spacing) between weft yarns the laminate becomes more balanced. FIG. 22A shows two QUDW plies with 95% warp fibers and 5% weft fibers, whereas FIG. 22B shows two QUDW plies with 75% warp fibers and 25% weft fibers. Decreasing the spacing of the weft yarns increases the total area of overlapping adjacent weft yarns in small included angle layups. But for larger included angle layups, a smoother increase in the total area of overlapping weft yarns is achieved by decreasing the spacing of the weft yarns. Hence, for larger pitch angle helicoid laminates it is possible to increase the number/frequency of weft yarns (and thus improve the balance) without leading to excessive increase of overlapping weft yarns. As a result, the length of the splits will be reduced compared to helicoid QUDW laminates with smaller pitch angles. This promotes more crack nesting and damage diffusion, hence further stabilizing the failure process.

QUDW fabrics can be made of carbon fibers and other fiber types typically used in composites. According to embodiments of the invention, the warp and/or weft yarns can be formed from glass fibers. Example uses for QUDW fabric composites include sporting goods, automotive/motorsports components (including body panels, chassis components, battery casings, skid plates), wind turbine blades, pipes and marine components (including hulls, masts, decks).

Thus, the present disclosure details a range of novel helicoidal design and manufacturing enhancements that are beyond the prior art. This disclosure teaches modifications to spiraling pitch and construction material/alternatives in specific including: (a) nanomaterials, (b) variable pitch and partial spirals, (c) TPUD, (d) hybrid materials, (e) curved fibers within a ply, (f) automated fiber or tape placement for 2D or 3D preforms, (g) non-crimped fabrics, (h) 3D woven fabrics, (i) 3D printed materials, and (j) filament wound parts, (l) TPW, and (m) QUDW.

Thus, in accordance with the present disclosure, the following examples illustrate aspects of the disclosure. However, it will be appreciated that these examples are non-limiting and are intended to be illustrative.

Example 1: Helicoidal structures containing nanomaterials including but not limited to CNFs, CNTs, SWNTs, MWNTs, graphite platelets/graphene, organic spherical particles, copolymers, inorganic clays, silica, silicon carbide, alumina, metal oxides, and other known or yet to be evolved nano materials. Incorporation of nanomaterials into a resin in combination with fiber reinforcements has been shown to improve mechanical properties and impact resistance over conventional composite laminates of identical thickness. If desired, it is possible to incorporate nanofibers (fibers having a diameter less than 100 nm) into the material. Nanomaterial whiskering between fibers can improve transverse and intralaminar shear properties and reduce or even eliminate resin cracks arising from low and medium level impacts. Helicoidal lay-ups with shallow clocking angles that increase direct contact length between interlaminar fibers can improve whiskering effects. This lengthening of the contact length, resultant from tight helicoidal clocking, makes nanocomposite additives more effective when incorporated into helicoidal lay-ups than when used in industry standard lay-ups. Helicoidal lay-ups with nano-additives can exhibit not only reduced/eliminated intralaminar vertical/horizontal resin cracking but also reduced/eliminated horizontal interlaminar resin cracks and forestalled onset of delamination.

Example 2: TPUD helicoidal structures create tightly clocked spirals with short interlaminar resin shear zones and substantial fiber to fiber direct contact. Such lay-ups are impact resistant, crack arresting (both from impact and low temperatures) and have improved interlaminar load sharing capabilities. TPUD helicoidal laminates allow for reduced minimum gauge and/or lighter weight better or equivalent performing structures. Balance/symmetry rules along with rules for minimum orientation to protect for unexpected loading (e.g., no less than 10% of the fibers in any one direction) that limit stacking freedom and often dictate lay-ups thicker than needed expressively to take a given load case can be used more sparingly with TPUD helicoidal structures or in some cases ignored. Specific variants of this example include the following:

1. Helicoidal stacks wherein all layers are TPUD plies.
2. TPUD helicoidal stacks of continuously clocked spirals.
3. TPUD helicoidal stacks adhering to industry standard balance, symmetric, and minimum direction orientation rules that are thinner than traditional lay-ups but have similar or better strength and impact.
4. Thinner minimum gauge TPUD helicoidal stacks that possess desired properties while adhering to tradition lay-up symmetry, balance and minimum orientation rules.
5. Helicoidal stacks that combine TPUD and thick plies to create uniquely tuned and strength/impact laminates that are superior to traditional lay-ups. For example, thin helicoidal plies can be used for a portion of the lay-up to tune the lay-up and increase overall impact capability, while thick plies can be used to reduce lay-up time and create overall strength.
6. TPUD helicoidal stacks with variable clocking to create uniquely tuned laminates that still possess strength and impact properties that are superior to traditional lay-ups.
7. Helicoidal stacks with tight clocking and thin plies that have less of a propensity to warp than traditional lay-ups using standard clocking and standard ply thicknesses. This allows for helicoidal TPUD lay-ups to contain exemplary strength and impact properties while having a minimal gauge and lowest possible weight.

8. Combined TPUD and thick ply helicoidal stacks with variable clocking to create uniquely tuned and strength/impact laminates that are superior to traditional lay-ups. For example, the thin and thick ply selection can be driven primarily from a lay-up cost standpoint while the variable clocking can be chosen to arrest vertical intralaminar resin microcracking.

9. Pad-up regions of a component can include any of the helicoidal variants discussed in this disclosure. This pad-up can be incorporated with a base traditional lay-up or a base helicoidal lay-up of the same or different construction.

Example 3: Hybrid material helicoidal structures can be created using any of the previously mentioned nanomaterials, variable pitch and partial spirals, and TPUD plies in combination with hybrid materials (e.g., non-polymer, metals, foams and/or sandwich materials) to improve strength, bearing, stiffness and impact resistance. These combinations can be done globally or just in selected regions to dial in specific strength and impact characteristics while minimizing cost, weight and/or thickness. Specific variants of this example include the following:

1. Helicoidal variants with woven fabric composite plies distributed in the stack or on the inner and outer surfaces to create unique clocking arrangements chosen to absorb and dissipate impact forces, minimize fiber breakout when drilling or trimming, and improve erosion capability. Fabric plies can also contain metal foils, fibers or meshes to help dissipate lightning strikes, transmit current, shield electrical components or change thermal conductivity.

2. Helicoidal variants with metal foil on the inner and outer surfaces to improve erosion and impact capability.

3. Helicoidal variants with dampening foam or sandwich material in the center of the lay-up to increase shear rigidity, cushion inertial loads, dissipate strike energy, and/or improve buckling resistance. Additionally, to improve component strength-to-weight ratios, sound dampening, fatigue capability, thermal insulation, and impact/damage resistance.

4. Helicoidal materials can be made using thin ply unidirectional (TPUD) materials assembled in a sandwich construction replacing the traditional skin structure made of Non-Crimp Fabrics or Woven Fabrics. This structure permits a corresponding improvement of impact strength and also can help delay skin buckling under in-plane compression. In such a structure the helicoidal TPUD stacking can be expected to deliver relatively higher through-thickness impact strength and complement and counterbalance the weakness of thin ply laminates in out of plane strength. Thus, in this example, helicoidal stacking of TPUD permits enhancement of in-plane properties of thin plies that can in turn permit weight reduction of parts.

5. Helicoidal variants that use nanomaterials in the resin to improve the bond between helicoidal plies themselves and hybrid materials (e.g., metals and sandwich) and therein improve interlaminar strength and properties relying on such (e.g., strength shear, bending tensile, compression and impact).

Example 4: Automated material placement equipment for deposition of continuous fiber, tape or fiber patches can be used to create any of the previously mentioned helicoidal designs with the added enhancement of curving the fibers within a given ply. This curvature can add more degrees of freedom to a 2D or 3D shape helicoidal stack and can be used to further enhance wavelength tuning and impact capabilities.

Example 5: Helicoidal Multiaxial (HMX) non-crimp fabric [0°, 22.5°, 45°, 67.5°, 90°] can be produced. This roll can then be folded around its 0° axis dividing its width by 2 or simply combined with another same roll flipped over to form a 10-plies HMX: [−90°, −67.5°, −45°, −22.5°, 0°, 0°, 22.5°, 45°, 67.5°, 90°]. In another example a first helicoidal MX fabric (e.g., [56°, 79°, −79°, −56°]) can be taken off a large continuous roll and rotated 90° (e.g., [−34°, −11°, 11°, 34°]) and placed on top of one another to create a 8-plies HMX fabric (e.g., 22° HMX with 8 plies [56°, 79°, −79°, −56°, −34°, −11°, 11°, 34°]). As with the individual plies, two HMX stacks can be joined using stitching or powder binder or heat laminated thermoplastic non-woven veil or any other suitable known technics such as air punch or needle punch.

This is an efficient and innovative way to offer an HMX embedding eight or more helicoidal plies in a single HMX fabric roll to overcome machine limitations as commonly found in the composites industry. Such an HMX roll can then be pre-impregnated.

Example 6. Filament Winding can be used to create structures based on a helicoidal architecture for various kinds of axisymmetric parts such as pipes, tapered tubes, as well as tanks and pressure vessels (typically in form of a sphere or a cylinder which may have domes on one or both ends). For some applications, these filament winded parts need to be highly resistant to external impact and are crash and drop tested (such as a hydrogen pressure vessel in the form of a fuel tank in a vehicle) so as to withstand major crashes and avoid exploding. Such structures can be made using full or partial helicoidal laminates to enhance impact strength and to also have more diffused crack propagation to avoid gas leakage and extend operational life cycle.

Filament winding techniques can be used to interlace helicoidally formed unidirectional fiber band or tapes, for example, by winding from one end to the other end over a mandrel. Such an interlaced helicoidal pattern (as illustrated, for example, in FIG. 5H) can complete the mandrel coverage with a bi-angle $+X^+/-X°$ double layer. This angle can be measured from the mandrel rotational axis which accounts for the 0° angular reference. With this technique the relative angle between two adjacent plies within this double layer can be 2X° for X<45° (e.g., 14° for X=7°) or 180°−2X° for X≥45° (e.g., −10° for X=85'). With this filament winding technique, it is therefore possible to create successive interlaced helicoidal double layers with a small shallow clocking angle therebetween (e.g. 5° to 10°) around the 0° or the 90° orientations. Around the 45° direction, fibers will cross nearly orthogonally.

In a further implementation, a structure having a helicoidal architecture can be manufactured with filament winding by winding a layer of fibers all having same angle, or variable angles within the layer/ply. This can be accomplished by programming a robotic filament winding machine accordingly to wind the desired pattern or by adjusting the setup of the roving dispenser. This technique permits winding several full surface plies of fibers with a small variation of clocking angle between plies to obtain the benefit of a helicoid architecture. As an example, winding successive circumferential plies at relative angles close to 90° (in increments of 4°, such as 88°, 84°, 80°, 76°, 72°) will provide a product, such as a pressure vessel, with much higher impact strength and more diffuse crack propagation.

Such a helicoidal architecture can also be used as an internal layer to enhance the safety factor in regard to gas leakage through cracks within a partially damaged laminate structure. Pull-winding processes can combine pultrusion of a profile with a 0° main direction of fiber reinforcement with wound fibers or tapes to bring further resistance to a transverse load. These wound plies can also be adjacent with a small variation of their angle to from a structure having a helicoidal architecture and deliver higher transverse impact resistance properties.

Example 7. Braids and Skewed Fabrics. Braids produced using 2D or 3D techniques offer an interesting property of diameter variation associated with fiber angle variation. As fibers can slip within a tubular braid, this allows to expand or reduce the diameter of such braid. This property can be advantageous to create a structure having a helicoidal architecture with several layers effectively sleeved over one another so as to progressively expand the diameter of the structure and to slightly vary the fiber angle between and/or along layers to create a very small clocking angle variation between two adjacent braided layers, Such braided fiber reinforcing structures can also be provided in the form of a flat braided tape obtained from a tubular braid cut along a longitudinal direction and then laid open flat. The fiber angular orientation also varies with the width of the tape. Such braided tape can also be used to stack different layers of the same tape with slightly different fiber angle to create a structure having a helicoidal architecture. This property can also be found in woven fabrics which are skewed to modify the initial 90° angle between warp and weft which can be tuned to create a series of warp/weft angles with small angular variations from one fabric layer to the next one (such as a 5° clocking angle to align layers at 90°, 85°, 80°, 75° degrees, etc.) thus creating a structure having a helicoidal architecture.

Example 8: Additive Manufacturing. Many of the aforementioned techniques use existing sets of fabrics, pre-pregs, and the like. In this example, an alternative method for forming helicoidal architectures is provided. There are multiple routes to additive manufacturing, including stereolithography (SLA) that uses lasers to cure layer by layer photopolymer resins, fused deposition modeling (FDM) that uses 3D printers to deposit thermoplastic materials, multijet modeling (MJM) that can build materials via a printer head depositing materials in 3 dimensions, and selective laser sintering (SLS), which uses a high powered laser to fuse small polymer, metallic, or ceramic/glass particles together. In all of these aforementioned techniques, a helicoidal structure can be constructed. The methodology used will depend, in part, by the material used and the length scale of features required for the specific application. As such, this presents numerous opportunities for making not only helicoidal materials, but enabling multifunctionality via printing of materials not available for purchase in fiber or pre-preg form, z-pinned structures, etc.

In one example, using multijet modeling (MJM), multiple printer jets can be used to print, simultaneously, two or more materials that can both have the helicoidal structure, but be offset by a specific angle (e.g., a double helicoid), or have one material act as the in-plane helicoid and another material be printed out of plane, acting as a z-pinned structure. Furthermore, materials do not have to be printed in a solid fibrous form. For example, during printing, a "core-shell" print head can be used to print core-shell materials, where the shell is the desired final material and the core is used as a sacrificial template. In one example, a hydrophobic polymer such as polypropylene (PP) can be co-printed with polyvinyl alcohol (PVA) as the core. After printing, the structure can be placed in an aqueous bath that will subsequently remove the PVA, yielding hollow PP fibers/tubes. In another example, the materials do not have to be printed as polymers, but as ceramic-based precursors (e.g., SiC, $B_4C$, etc.). Here, a ceramic precursor (e.g., polycarbosilane, a precursor to SiC) can be printed as the shell with PVA as a core. Upon annealing at a low temperature (e.g., 200° C.), the ceramic precursor will solidify (not yet transform to SiC). After this, the PVA can be safely removed without collapsing the tubes and then the resulting structures can be annealed to completely transform the ceramic precursor to a given material (e.g., SiC). The resulting fibers can be micro or nano-tubes, which can act as transport channels for fluids (air, water, self-healing resin, thermal cooling material, etc.).

With many additive manufacturing methods, there is an ability to tune which printing material is used in real time that will enable gradient structures to be built, with precision. This may be applied in a variety of manners, including but not limited to the following:
 1. The stiffness or hardness (or any other material property that depends on material composition, particle size, etc.) of the material being deposited can be graded by continuously changing the material in the print reservoir.
 2. The rotational angle of the helicoid can further be tuned to form a graded helicoidal composite material, which may also provide additional mechanical benefit.

In another implementation, existing templated structures can be placed on the print stage as a scaffold or sacrificial structure that will yield an architecture that goes beyond just a helicoidal architecture. For example, a 2D or even 3D array of pins, tubes or other structures (composed of multiple types of materials that can either be kept or dissolved away, for example) can be placed on the build plate of a SLA printer. The helicoidal architecture can be printed around this scaffold and subsequently the scaffold can be removed, yielding a multi-structure with helicoidal architecture that maintains impact resistance, but offers additional benefits (for example, mechanical benefits such as z-pinning and thermal: cooling). In another implementation, the 3D printing technology can be used to print curved structures with ease. In this case, a simple CAD model can be constructed to enable an FDM printer (for example) to place fibers in a helicoidal array, but in a curved macrostructural part.

Example 9: TPW and QUDW fabrics helicoidal structures brings together the benefits of the superior impact resistance of helicoidal architectures with the class of woven fabrics for improved drapability, reduced layup time, improved abrasion and visuals. Such lay-ups are impact resistant, crack arresting (both from impact and low temperatures) and have improved interlaminar load sharing capabilities. TPW and QUDW helicoidal laminates allow for structural weight reduction, by improving the impact performances of conventional woven laminates while reducing manufacturing costs of helicoidal structures. The presence of weft and warp fibers eliminates the problem of using balanced/unbalanced layups delivering helicoid solutions with a much wider design space. Specific variants of this example include the following:
 1. Helicoidal stacks wherein all layers are TPW plies.
 2. Helicoidal stacks wherein all layers are QUDW plies.
 3. TPW helicoidal stacks of continuously clocked spirals.
 4. QUDW helicoidal stacks of continuously clocked spirals.
 5. TPW and/or QUDW Helicoidal stacks that combine TPUD, thick plies and thick woven plies to create uniquely tuned and strength/impact laminates that are superior to traditional lay-ups. For example, TPW helicoidal plies, according to embodiments of the invention, are used for the top portion of the lay-up to locally improve abrasion resistance, visuals and impact resistance, while TPUD or thick UD plies can be used to provide tailored stiffness and in-plane strength.

6. TPW and/or QUDW helicoidal stacks with variable clocking to create uniquely tuned laminates that still possess strength and impact properties that are superior to traditional lay-ups.

7. Combined TPW and/or QUDW with thick woven, TPUD and thick UD ply helicoidal stacks with variable clocking to create uniquely tuned and strength/impact laminates that are superior to traditional lay-ups.

Example 10: Conventional lightweight sandwich structures comprise a core, usually PVC, EPS, Honeycomb, Aramid fiber Honeycomb, shear thickening foam cores (D30®), metamaterial cores (MetaCORE™, MetaCORE-LD™, MetaTHERM™) and similar to provide stiffness, acoustic impedance, reduced weight and other structural and mechanical properties. Lightweight fiber-reinforced composite skins with a total fiber areal weight of 5000 gsm and lower and/or with a skin thickness of 4 mm and lower are used to provide strength and stiffness to the sandwich structure in lightweight sandwich applications. The use of TPUD, QUDW, TPW, NCF, UD as a single material or hybridized with thick plies and standard woven layers offer the capability of introducing helicoidal skins in such applications where a limited number of layers can be used to create the helicoid lay-up.

In one example embodiment shown in FIG. 23A, a sandwich application includes 200 gsm skins for application to a 5 mm thick PVC core. A skin is formed using 10 layers of 20 gsm carbon filament TPUD arranged with the parallel fibers of each ply defining orientation directions as [−15/−25/−35/−45/−60/60/45/35/25/15] to create a helicoidal relationship. FIG. 23B on the other hand shows a conventional TPUD biaxial with a [+45/−45]$_5$ relationship.

FIG. 24 shows the results of a three-point bending flexural test pursuant to ASTM D7249. When compared to an equivalent TPUD biaxial [+45/−45]$_5$, the helicoid TPUD layup showed increased flexural strength of 88% and 54% when tested along the longitudinal (0°) and transverse (90°) direction, respectively (note that with conventional biaxial, the 0° and 90° properties are expected to be equivalent). As compared to an equivalent standard thick biaxial [+45°/−45°] layer of equal weight, the helicoid TPUD layup according to this example showed increased flexural strength of 118% and 77%, tested along the longitudinal and transverse direction, respectively. The resultant innovative sandwich with directional helicoid skins thus offers superior compressive strength of the skins in both the longitudinal and orthogonal loading direction. In fact, given the directionality of the helicoidal fiber arrangement, it is expected to achieve higher compressive strength along the longitudinal direction. However, the helicoidal arrangement achieves higher stiffness and strength also along the orthogonal direction which, in the helicoidal is characterized by a lower percentage of fiber components aligned to the load than the reference [+45/−45].

Other embodiments include the following:
1. Helicoidal skins wherein all layers are TPW plies, or QUDW plies or TPUD, or NCF, or UD plies.
2. TPW or QUDW or TPUD or NCF or UD helicoidal skins of continuously clocked spirals.
3. TPW or QUDW or TPUD or NCF or UD helicoidal stacks of partially clocked spirals with either continuous or variable pitch angles.
4. TPW or QUDW or TPUD or NCF or UD Helicoidal skins that combine TPUD, NCF, thick plies and thick woven plies to create uniquely tuned and strength/impact skins that are superior to traditional skins. For example, one layer of TPW can be used as top skins to improve visual appeal and anti-abrasion resistance while TPUD helicoidal plies can be used for the rest of the skin to provide tailored impact resistance, stiffness, and in-plane strength.
5. Sandwich applications with only the top (impact-facing) helicoidal skin. This is to offer an impact resistant mechanism where the overall stiffness is offered by geometrical features of the structures, such as in applications with a double curvature or complex shapes. Such architecture confers higher stress redistribution during impact, further improving impact performances.
6. Sandwich applications with both a top (impact facing) and bottom helicoidal skins.
7. Sandwich applications where either the top or bottom skins are helicoidal or partial helicoidal lay-up.
8. Sandwich applications where the top skins and the bottom skins are symmetrical.
9. Sandwich applications where the top and bottom helicoidal skins are not symmetrical
10. Sandwich applications where the top skin is helicoidal and the bottom skin is non-helicoidal and where the top and bottom skins can have similar or different weights. For instance, a thicker top helicoidal skin to provide compression strength and impact resistance, while a bottom non-helicoid skin to provide flexural tensile strength and stiffness.

It will be appreciated by those of skill in the art, that virtually any fabric can be used and assembled into a helicoidal structure, whether it be carbon fiber or another material. The methods, systems, and products of the present disclosure, as described above and shown in the drawings, among other things, provide for improved composite materials and methods for forming the same. It will be apparent to those skilled in the art that various modifications and variations can be made in the devices and methods of the present disclosure without departing from the spirit or scope of the disclosure. Thus, it is intended that the present disclosure include modifications and variations that are within the scope of the subject disclosure and equivalents. The following aspects of the invention represent inventive features according to the embodiments of the invention discussed above:

1. A helicoidal composite ply clocking/stacking design and methodology in which composite plies are stacked in a tight spiral to specific pitches in order to create a z-direction fiber arrangement that will dampen and absorb shockwave propagation, dissipate strain energy, minimize the effects of impact fatigue, and minimize and/or arrest damage associated with impacts.

2. The helicoidal system in aspect 1, that is laid up by hand, direct placed with automated machines, and/or pre-knitted in stacks using weaving/braiding/stitching equipment (e.g., non-crimp fabric machines). When placed as a pre-knitted stack (e.g. 4, 6, 10, or more specifically clocked helicoidal plies chosen for strength and impact resistance), the stack can be dry and later liquid molded or made from pre-preg. This stack can be the entire part or a specific area of the component chosen for helicoidal enhancement using any of the variants disclosed in this disclosure.

3. The helicoidal system in aspect 1, where automated placement equipment is used to curve the fibers within a given ply.

4. The helicoidal system in aspect 1, where the pitched fibers are tuned to a specific wavelength to dampen propagating shock waves initiated by ballistics, strike forces or foreign material impacts.

5. The helicoidal system in aspect 1, where the clocking is chosen to create a specific spiraling pitch or circular polarization z orientation wherein the fibers are in close enough proximity as to exhibit significant intralaminar direct load sharing between plies.

6. The helicoidal system in aspect 1, where matrix resin alteration (e.g., lowering monomer functionality, increasing the backbone molecular weight, or incorporation of flexible subgroups) and/or additives (e.g., microspheres, discrete rubber, thermoplastic particle or veils) are used to toughen the laminate and further arrest propagation of catastrophic fractures.

7. The helicoidal system in aspect 1, where the resin and fibers are specifically chosen to exploit the difference in elastic moduli between the fiber and resin.

8. The helicoidal system in aspect 1, where the type [e.g., carbon, fiberglass, aramid, ultra-high molecular weight polyolefin fibers, PBO fibers and natural fibers such as flax and hemp], amount, and form of fiber reinforcement is selected to best match cost, manufacturing and performance requirements.

9. The helicoidal system in aspect 1, where the pad-up regions of a component can include any of the helicoidal variants discussed in this disclosure with a base traditional lay-up or a base helicoidal lay-up of the same or different construction.

10. A helicoidal system in aspects 1 through 7, with nanomaterials (e.g., CNFs, CNTs, SWNTs, MWNTs, graphite platelets/graphene, organic spherical particles, copolymers, inorganic clays, silica, silicon carbide, alumina, metal oxides, and other known or yet to be evolved nano materials) added into the resin, attached directly to the fibers or placed as an interlaminar layer. Wherein, the resultant helicoidal/nanomaterial hybrid has nanoscale whiskers/connections that bridge and allow for sharing between the fibers, improve overall laminate mechanical properties, improve impact resistance and have crack arresting characteristics.

11. A helicoidal system as in aspect 8, in which the nanomaterial addition improves transverse and intralaminar shear properties in relation to helicoidal clocking angle (i.e., tighter clocking angles yields longer contact length and more fiber to fiber interaction).

12. A helicoidal system as in aspect 8, in which the helicoidal/nanomaterial hybrid exhibits reduced and/or eliminated (a) intralaminar vertical and/or horizontal resin cracking, (h) horizontal interlaminar resin cracks, and/or (c) delamination when subjected to impacts.

13. A helicoidal system in aspects 1 through 7, containing variable pitch and/or partial spirals that are tuned to a specific wavelength and/or orientation in anticipation of expected impact type, level, and source and/or are tailored to meet specific loading requirements.

14. A helicoidal system in aspect 11, with variable clocking angles (i.e., 5°, 10°, 15°) in a single laminate that are tuned over variable wavelengths, arrest/dissipate impact forces at a particular zone/depth and can be optimized for a preferred combination of impact capability and overall laminate strength.

15. A helicoidal system in aspect 11, with tight clocking (i.e., 5°) on the (a) exterior, (b) middle, (c) interior, or (d) one or more of interior, middle and exterior of the lay-up and broader clocking on the remainder of the lay-up in order to dissipate impact loads within a certain thickness zone of the laminate while still allowing the freedom to tailor the orientation of the majority of plies for in-plane strength.

16. A helicoidal system in aspect 11, with non-symmetric and/or non-balanced ply stacking that for example could be only left or right hand spiraled. Such lay-ups can take advantage of helicoidal clocking benefits without having to increase thickness to adhere to balance and symmetry rules of thumb. Components made with shallow helicoidal clocking angles have less propensity to warp than traditional 0°, ±45°, 90° lay-ups. Further, any tendency to warp can often be overcome by part shape or local stiffening effects.

17. A helicoidal system in aspect 11, where the lay-up is only partially spiraled and does not clock through a full 360 degree. Such lay-ups can isolate the helicoidal structures' impact benefit in certain laminate zones while optimizing load carrying fibers in other zones.

17.1 A helicoidal system in aspects 1 through 7, that uses TPW and/or QUDW plies arranged in a helicoid spiral. The specific construction of such woven fabrics, characterized by either low translaminar fracture toughness of the weft yarns (TPW) and large spacing between weft yarns (QUDW) can be tailored to allow for the highly dissipative failure mechanisms of helicoidal structure to activate and lead to enhanced impact performances. The use of woven fabrics allows to improve drapability of helicoid stack to complex shapes and reduce layup costs.

18. A helicoidal system in aspects 1 through 7, that uses TPUD plies (typically 0.0023 in/ply or thinner) arranged in a helicoid spiral. The resultant tightly clocked helicoidal spirals have relatively short interlaminar resin shear zones hence substantial fiber to fiber direct contact/load sharing (i.e., tight aspect ratios) which make them impact resistant and crack arresting capable. Further, TPUD lay-ups have been shown to have improved strength when compared to similar thickness traditional lay-ups.

19, The helicoidal system in aspect 16, that not only has superior resin crack arrest capability from impact events but also exhibits the capability to minimize intra and inter laminar cracking due to extreme environments (e.g., −200 to 415° F. temperatures) such as would be experienced during space and cryogenic tank applications.

20. The helicoidal system in aspect 16, with continuously clocked spirals that exhibit strength as good or better than highly oriented traditional stacks (extra plies in the primary load carrying direction) while having improved impact characteristics. In such applications, even though the helicoidal lay-up has fewer total fibers in the primary load direction, the combination of thinner plies and slightly clocked off-angle fibers combine to make efficient interlaminar load sharing that results in superior in-plane strength capabilities.

21. The helicoidal system in aspect 16, while having less total thickness than a comparable traditional laminate stack, may have similar or better strength and impact capability. Therein, it is possible to make thinner and lighter TPUD helicoidal laminates than is possible when adhering to industry standard balance, symmetry, and minimum direction orientation rules.

22. The helicoidal system in aspect 16, of a thinner or minimum gauge (a thickness that will take critical load case such as hail or bird strike) while still possessing desired properties and adhering to traditional lay-up symmetry, balance and minimum orientation rules.

23. The helicoidal system in aspect 16, that can combine TPUD and thick plies to create uniquely tuned, strength and impact capability components. For example, thin helicoidal plies can be used for a portion of the lay-up to tune the lay-up and increase impact capability, while thick plies can be used to reduce lay-up time and create overall in-plane strength.

24. The helicoidal system in aspect 16, with variable clocking to create uniquely tuned laminates that still possess strength and impact properties that are superior to traditional lay-ups.

25. The helicoidal system in aspect 16, that uses tight clocking and thin plies and has less of a propensity to warp than traditional lay-ups using standard clocking and standard ply thicknesses. Therefore, a helicoidal TPUD non-symmetric/non-balanced stack can have a minimal gauge and low weight.

26. The system in aspect 16, with combined TPUD and thick ply helicoidal stacks and variable clocking to create uniquely tuned and strength/impact laminates that are superior to traditional lay-ups. Therein, the thin and thick plies can be used to minimize lay-up cost and optimize strength/spiral tuning variables to a certain degree while the variable clocking pitch can be used to optimize properties.

27. The helicoidal system in aspect 16, where the pad-up regions of a component can include any of the TPUD variants described in 17 through 24 with a base traditional lay-up or a base helicoidal lay-up of the same or different construction.

28. The helicoidal systems in aspects 1 through 25, combined with hybrid materials (e.g., non-polymer, metals, foams and/or sandwich materials) to improve strength, bearing, stiffness and/or impact resistance. Such combinations can be done globally (e.g., nanomaterial combined throughout a matrix resin) or selectively (e.g., a layer of titanium foil) as dictated to meet specific strength, erosion, and impact characteristics while minimizing cost, weight and/or thickness.

29. The helicoidal system in aspect 26, in which nanomaterials are incorporated into the resin to improve the bond between helicoidal plies and hybrid material (e.g., metals and sandwich) and therein improve interlaminar strength and properties relying on such (e.g., strength, shear, bending, tensile, compression, and impact).

30. The helicoidal system in aspect 26, with fabric composite plies selectively placed in the stack or on the inner and outer surfaces to create unique clocking arrangements specifically chosen to absorb and dissipate impact forces. Also, when used on the outer plies, to minimize fiber breakout during drilling or trimming. Fabric plies can also contain metal foils, fibers or meshes to help dissipate lightning strikes, transmit current, shield electrical components or change thermal conductivity.

31. The helicoidal system in aspect 26, with metal foil on the inner and outer surfaces to improve strength, erosion, bearing and impact capability. In such helicoidal/hybrid cases the metal foil can yield, and the helicoidal plies can absorb/dampen energy during impact.

32. The helicoidal systems in aspect 17 and 18, with a dampening foam or sandwich material in the center of a helicoidal stack to increase shear rigidity, cushion inertial loads, dissipate strike energy, and/or improve buckling resistance.

33. The helicoidal systems in aspects 1 through 30, incorporated into consumer products, protective armor, sporting equipment, crash protection devices, wind turbine blades, automotive/aerospace components, hydrogen pressure vessels, construction materials, and other composite products in order to dampen and absorb shockwave propagation, minimize the effects of impact fatigue, dissipate strain energy, and minimize and/or arrest cracks and damage associated with impacts 34. The helicoidal systems in aspects 1 through 30, incorporated into, composite structures to minimize the effect of low, medium and high energy impacts from planned strikes, collisions, hail, tool drop, ballistics, random debris, shock waves, lightning strike, cavitation and aero fluttering.

35. A method of making a helicoidal structure from a non-crimp fabric using a multiaxial fabric machine.

36. The method of aspect 35, wherein a plurality of helicoidal plies are made by producing a plurality of rolls of material and assembling the layers of the rolls of material to form a helicoidal sequence of a larger number of plies.

37. The method of aspect 36, wherein a roll of 4 or 5 helicoid plies forming a Multiaxial Helicoid Non-Crimp Fabric (HMX) (e.g., H-NCF12°:[48°, 60°, 72°, 84°] or H-NCF22.5°:[0, 22.5, 45, 67.5, 90]) are produced.

38. The method of aspect 37, further comprising flipped over material from the roll of material to form an eight or ten plies roll of material HMX (e.g., H-NCF12°: [48°, 60°, 72°, 84λ, −84°, −72°, −60°, −48°] or H-NCF22.5°:[90, −67.5, −45, −22.5, 0, 0, 22.5, 45, 67.5, 90]).

39. The method of aspect 38, further comprising folding material from the roll of material about its 0° axis to divide its width by 2 to form an eight or ten plies roll of material HMX: (e.g., H-NCF12°: [48°, 60°, 72°, 84°, −84°, −72°, −60°, −48°] or H-NCF22.5°:[90, −67.5, −45, −22.5, 0, 0, 22.5; 45, 67.5, 90]).

40. The method of aspect 38, further comprising rotated plus or minus 90° material from the roll of material to form an eight or ten plies roll of material HMX (e.g., [56.3°, 78.8°, −78.8°, −56.3°] rotated −90°: [−33.8°, −11.3°, 11.3°, 33.8°] combined to form H-NCF22.5°:[56.3°, 78.8°, −78.8°, −56.3°, −33.8°, −11.3°, 11.3°, 33.8°]).

41. The method of aspects 38-40 where flipping over, folding and rotation of initial HMX roll can be combined movements to create a much larger number of plies roll with continuous helicoidal.

42. The method of aspects 35-41, wherein layers of fabric are combined by stitching machines or a heat laminated thermoplastic veil, powder binder or an air or needle punch.

43. The method of aspects 35-42, wherein variable clocking angles are applied as described in aspects 13-15.

That which is claimed is:

1. A composite skin sandwich structure, the composite skin sandwich structure comprising:
   a core formed from at least one core material, and,
   at least one skin affixed to the core, wherein the skin comprises;
   a plurality of plies of reinforcing fibers arranged in a helicoidal relationship, the plies comprising parallel fibers defining an orientation direction, wherein an included angle between the orientation directions of at least two adjacent plies is more than 0° and less than about 30°,
   wherein the core comprises at least one core material other than plies of reinforcing fibers.

2. A composite skin sandwich structure according to claim 1 wherein the plies arranged in the helicoidal relationship are partially spiraled.

3. A composite skin sandwich structure according to claim 2 wherein the plies are arranged as [−15°/−25°/−35°/−45°/−60°/60°/45°/35°/25°/15°].

4. A composite skin sandwich structure according to claim 1 and further comprising at least one second skin affixed to an opposite side of the core from the at least one skin.

5. A composite skin sandwich structure according to claim 4 wherein the at least one second skin comprises:
a plurality of plies of reinforcing fibers arranged in a helicoidal relationship, the plies comprising parallel fibers defining an orientation direction, wherein an included angle between the orientation directions of at least two adjacent plies is more than 0° and less than about 30°.

6. A composite skin sandwich structure according to claim 4 wherein the at least one second skin comprises:
a plurality of plies of reinforcing fibers not arranged in a helicoidal relationship, the plies comprising parallel fibers defining an orientation direction, wherein an included angle between the orientation directions of a first pair of adjacent plies is 30° or more, and further wherein an included angle between the orientation directions of at least one other pair of adjacent plies is 30° or more.

7. A composite skin sandwich structure according to claim 1 wherein the sandwich structure is arranged to form the shape of aero structures including wind turbine blades, automotive components and wings.

8. A composite skin sandwich structure according to claim 1 wherein the sandwich structure is arranged to form the shape of a sporting good.

9. A composite skin sandwich structure according to claim 1 wherein the at least one skin comprises carbon fibers and has a weight of lower than about 3,000 gsm.

10. A composite skin sandwich structure according to claim 1 wherein the at least one skin comprises glass fibers and has a weight of lower than about 5,000 gsm.

11. A composite skin sandwich structure according to claim 1 wherein the plurality of plies of reinforcing fibers arranged in a helicoidal relationship further comprises at least a third ply, and the third ply comprises parallel fibers defining an orientation direction, wherein an included angle between the orientation directions of the third ply and at least one adjacent ply is more than 0° and less than about 30°.

12. A composite skin sandwich structure, the composite skin sandwich structure comprising:
a core formed from at least one core material, and,
at least one skin affixed to the core, wherein the skin comprises;
a plurality of plies of reinforcing fibers arranged in a helicoidal relationship, the plies comprising parallel fibers defining an orientation direction, wherein an included angle between the orientation directions of at least two adjacent plies is more than 0° and less than about 30°,
wherein the core material comprises PVC foam.

13. A composite skin sandwich structure, the composite skin sandwich structure comprising:
a core formed from at least one core material, and,
at least one skin affixed to the core, wherein the skin comprises;
a plurality of plies of reinforcing fibers arranged in a helicoidal relationship, the plies comprising parallel fibers defining an orientation direction, wherein an included angle between the orientation directions of at least two adjacent plies is more than 0° and less than about 30°,
wherein the core material comprises a honeycomb structure.

14. A composite skin sandwich structure, the composite skin sandwich structure comprising:
a core formed from at least one core material, and,
at least one skin affixed to the core, wherein the skin comprises;
a plurality of plies of reinforcing fibers arranged in a helicoidal relationship, the plies comprising parallel fibers defining an orientation direction, wherein an included angle between the orientation directions of at least two adjacent plies is more than 0° and less than about 30°,
wherein the plurality of plies comprises at least one of UD tows, TPUD tows, QUDW fabric, TPW fabric and NCF fabric.

15. A fiber reinforced composite material having impact resistance, the composite material comprising:
a first TPW fabric layer, the first TPW fabric layer comprising a plurality of weft tows and a plurality of warp tows, wherein at least one of the plurality of tows defines an orientation direction, and
a second TPW fabric layer, the second TPW fabric layer comprising a plurality of weft tows and a plurality of warp tows, wherein at least one of the plurality of tows defines an orientation direction, wherein,
the first and second TPW fabrics layers are arranged in a helicoidal relationship and wherein an included angle between the orientation direction of the tows of the first TPW fabric layer and the orientation direction of the tows of the second TPW fabric layer is more than 0° and less than about 30° to provide impact resistance for the reinforced composite material.

16. A fiber reinforced composite material having impact resistance according to claim 15, wherein at least one of the TPW fabric layers comprises spread warp tows and/or spread weft tows.

17. A fiber reinforced composite material having impact resistance according to claim 15, wherein at least one of the TPW fabric layers comprises light warp tows and/or light weft tows.

18. A fiber reinforced composite material having impact resistance according to claim 15, wherein at least one of the tows of at least one of the TPW fabric layers comprises carbon fibers.

19. A fiber reinforced composite material having impact resistance according to claim 15 wherein at least one of the tows of at least one of the TPW fabric layers comprises glass fibers.

20. A fiber reinforced composite material having impact resistance according to claim 15 wherein at least one of the tows of at least one of the TPW fabric layers comprises aramid fibers.

21. A fiber reinforced composite material having impact resistance according to claim 15 wherein at least one of the tows of at least one of the TPW fabric layers comprises UHMWPE fibers.

22. A fiber reinforced composite material having impact resistance according to claim 15 wherein at least one of the tows of at least one of the TPW fabric layers comprises polypropylene fibers.

23. A fiber reinforced composite material according to claim 15, where the fiber reinforced composite material is formed into the shape of at least one of sporting goods, automotive/motorsports components, consumer goods including luggage, and marine components.

24. A fiber reinforced composite material having impact resistance, the composite material comprising:
  a first QUDW fabric layer, the first QUDW fabric layer comprising a plurality of weft tows and a plurality of warp tows, wherein the plurality of warp tows defines an orientation direction, and
  a second QUDW fabric layer, the second QUDW fabric layer comprising a plurality of weft tows and a plurality of warp tows, wherein the plurality of warp tows defines an orientation direction, wherein
  the first and second QUDW fabrics layers are arranged in a helicoidal relationship and wherein an included angle between the orientation direction of the warp tows of the first QUDW fabric layer and the orientation direction of the warp tows of the second QUDW fabric layer is more than 0° and less than about 30° to provide impact resistance for the reinforced composite material.

25. A fiber reinforced composite material having impact resistance according to claim 24, wherein more than 80% of the fibers for the composite material are arranged in the warp tows.

26. A fiber reinforced composite material having impact resistance according to claim 24, wherein at least one of the tows of at least one of the QUDW fabric layers comprises carbon fibers.

27. A fiber reinforced composite material having impact resistance according to claim 24, wherein at least one of the tows of at least one of the QUDW fabric layers comprises glass fibers.

28. A fiber reinforced composite material having impact resistance according to claim 24, wherein the warp tows of at least one of the QUDW fabric layers comprises glass fibers, and wherein the weft tows of at least one of the QUDW fabric layers comprises carbon fibers.

29. A fiber reinforced composite material according to claim 24, where the fiber reinforced composite material is formed into the shape of at least one of sporting goods, automotive/motorsports components, consumer goods including luggage, and marine components.

* * * * *

UNITED STATES PATENT AND TRADEMARK OFFICE
CERTIFICATE OF CORRECTION

| | | |
|---|---|---|
| PATENT NO. | : 12,275,227 B2 | Page 1 of 1 |
| APPLICATION NO. | : 17/304902 | |
| DATED | : April 15, 2025 | |
| INVENTOR(S) | : Mencattelli et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 962 days.

Signed and Sealed this
Third Day of February, 2026

John A. Squires
*Director of the United States Patent and Trademark Office*